United States Patent
Wang et al.

(10) Patent No.: US 11,178,538 B2
(45) Date of Patent: Nov. 16, 2021

(54) TRANSMISSION METHOD AND NETWORK DEVICE

(71) Applicant: HUAWEI TECHNOLOGIES CO., LTD., Guangdong (CN)

(72) Inventors: Rui Wang, Shanghai (CN); Mingzeng Dai, Shanghai (CN); Haiyan Luo, Shanghai (CN); Xiaoying Xu, Shanghai (CN); Tingting Geng, Shanghai (CN); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/449,709

(22) Filed: Jun. 24, 2019

(65) Prior Publication Data

US 2019/0313244 A1 Oct. 10, 2019

Related U.S. Application Data

(63) Continuation of application No. PCT/CN2018/099819, filed on Aug. 10, 2018.

(30) Foreign Application Priority Data

Aug. 11, 2017 (CN) .......................... 201710685352.2

(51) Int. Cl.
*H04W 4/00* (2018.01)
*H04W 8/24* (2009.01)
(Continued)

(52) U.S. Cl.
CPC ............. *H04W 8/24* (2013.01); *H04W 24/02* (2013.01); *H04W 74/0833* (2013.01)

(58) Field of Classification Search
CPC ... H04W 8/24; H04W 74/0833; H04W 24/02; H04W 8/26; H04W 36/0033; H04W 76/11
(Continued)

(56) References Cited

U.S. PATENT DOCUMENTS

2012/0250498 A1* 10/2012 Johansson ........... H04L 41/0604
370/221
2015/0126198 A1* 5/2015 Wang .................... H04W 76/18
455/437
(Continued)

FOREIGN PATENT DOCUMENTS

| CN | 1496139 A | 5/2004 |
|---|---|---|
| CN | 102340886 A | 2/2012 |

(Continued)

OTHER PUBLICATIONS

LG Electronics, "Consideration on C-RNTI during initial UE access", R3-172342, Jun. 27, 2017. (From Application's IDS filed on Dec. 23, 2019) (Year: 2017).*

(Continued)

*Primary Examiner* — Mang Hang Yeung
(74) *Attorney, Agent, or Firm* — Fish & Richardson P.C.

(57) ABSTRACT

This application provides a transmission method for retrieving old context of a terminal device, the method includes: a first network node sends a first message to a first system, where the first message is received from a terminal device and includes CRNTI allocated previously by the first network node for the terminal device; the first system sends a second message to the first network node, the second message comprises identification information of the terminal device which is in association with old context information of the terminal device that is stored at the first network node, (Continued)

and is used by the first network node to retrieve the old context information of the terminal device.

10 Claims, 25 Drawing Sheets

(51) Int. Cl.
*H04W 74/08* (2009.01)
*H04W 24/02* (2009.01)
(58) Field of Classification Search
USPC .......................................................... 370/329
See application file for complete search history.

(56) References Cited

U.S. PATENT DOCUMENTS

| | | | |
|---|---|---|---|
| 2016/0007243 A1* | 1/2016 | Park | H04W 36/0033 370/331 |
| 2017/0171784 A1* | 6/2017 | Mitsui | H04W 76/18 |

FOREIGN PATENT DOCUMENTS

| | | |
|---|---|---|
| CN | 103634930 A | 3/2014 |
| CN | 104105219 A | 10/2014 |
| CN | 106102106 A | 11/2016 |
| CN | 106162730 A | 11/2016 |
| CN | 106793169 A | 5/2017 |
| CN | 107027153 A | 8/2017 |
| WO | 2013023678 A1 | 2/2013 |
| WO | 2016074211 A1 | 5/2016 |
| WO | 2017045149 A1 | 3/2017 |
| WO | 2017127440 A1 | 7/2017 |

OTHER PUBLICATIONS

Ericsson, "TP Idle to Connected state transition in a disaggregation gNB", R3-172552, Jun. 27, 2017. (From Applicant's IDS field on Dec. 23, 2019.) (Year: 2017).*
LG Electronics (LG 11),"Issue on C-RNTI allocation for RRC connection resume", R3-172266, Jun. 27-29, 2017 (From Applicant's IDS field on Apr. 3, 2020) (Year: 2017).*
3GPP TS 38.401 V0.1.0 (May 2017), 3rd Generation Partnership Project;Technical Specification Group Radio Access Network;NG-RAN; Architecture description(Release 15), May 2017, 18 pages.
3GPP TS 38.473 V0.1.0, 3rd Generation Partnership Project;Technical Specification Group Radio Access Network; NG-RAN; F1 application protocol (Release 15), 19 pages.
Nokia et al.,"F1-C UE associated functions" Abstract, Presented at R3-172330 3GPP TSG RAN WG3 AdHoc NR, Qingdao, China, Jun. 27-29, 2017, 3 pages.
PCT International Search Report and Written Opinion in International Application No. PCT/CN2018/099819, dated Nov. 5, 2018, 12 pages. (With partial English translation).
Extended European Search Report issued in European Application No. 18844764.3 dated Dec. 16, 2019, 11 pages.
R3-172342—LG Electronics INQ: "Consideration on C-RNTI during initial UE access," 3GPP Draft; 3GPP TSG RAN WG3 Meeting NR Adhoc, Jun. 27-29, 2017, XP051302288, 5 pages.
R3-172552—Ericsson, "TP Idle to Connected state transitions in a disaggregated gNB," 3GPP Draft; 3GPP TSG-RAN WG3 AH #2, Jun. 27-29, 2017, XP051302492, 3 pages.
R3-174477—Huawei, "RRC connection reestablishment procedure for CU-DU," 3GPP Draft; 3GPP TSG RAN WG3 meeting #98, Nov. 27-Dec. 1, 2017, XP051373373, 10 pages.
LG Electronics Inc., "Issue on C-RNTI allocation for RRC connection resume," 3GPP TSG-RAN WG3 Meeting #NR AdHoc, R3-172266; Qingdao, P. R. China, Jun. 27-29, 2017, 4 pages.
Office Action issued in Chinese Application No. 201880013339.1 dated Mar. 20, 2020, 9 pages.
Nokia et al., "E1 General functions and procedures," 3GPP TSG-RAN WG3 Meeting #98, R3-174370, Reno, NV, USA, Nov. 27-Dec. 1, 2017, 12 pages.
Office Action issued in Chinese Application No. 201910772289.1 dated Jan. 28, 2021, 7 pages.
Samsung, "Inactivity-based transition to a power efficient state," 3GPP TSG-RAN WG2 NR Ad-hoc #2, R2-1706449, Qingdao, China, Jun. 27-29, 2017, 3 pages.
Office Action issued in Chinese Application No. 201710685352.9 dated Mar. 24, 2021, 15 pages.
3GPP TS 38.211 V0.1.0 (Jun. 2017), "3rd Generation Partnership Project; Technical Specification Group Radio Access Network; NR; Physical channels and modulation(Release 15)," Jun. 2017, 22 pages.
3GPP TS 38.212 V0.0.0 (May 2017), "3rd Generation Partnership Project;Technical Specification Group Radio Access Network; NR; Multiplexing and channel coding(Release 15)," May 2017, 10 pages.
3GPP TS 38.300 V0.6.0 (Aug. 2017), "3rd Generation Partnership Project; Technical Specification Group Radio Access Network; NR; NR and NG-RAN Overall Description; Stage 2(Release 15)," Aug. 2017, 58 pages.
3GPP TS 38.321 V0.2.0 (Aug. 2017), "3rd Generation Partnership Project; Technical Specification Group Radio Access Network; NR; Medium Access Control (MAC) protocol specification(Release 15)," Aug. 2017, 36 pages.
3GPP TS 38.323 V0.2.0 (Aug. 2017), "3rd Generation Partnership Project; Technical Specification Group Radio Access Network; NR; Packet Data Convergence Protocol (PDCP) specification (Release 15)," Aug. 2017, 29 pages.
3GPP TS 38.331 V0.0.4 (Jun. 2017), "3rd Generation Partnership Project; Technical Specification Group Radio Access Network; NR; Radio Resource Control (RRC); Protocol specification(Release 15)," Aug. 2017, 22 pages.
3GPP TS 38.413 V0.2.1 (Aug. 2017), "3rd Generation Partnership Project; Technical Specification Group Radio Access Network; NG Radio Access Network (NG-RAN); NG Application Protocol (NGAP)(Release 15)," Aug. 2017, 81 pages.
3GPP TS 38.423 V0.1.1 (Jun. 2017), "3rd Generation Partnership Project; Technical Specification Group Radio Access Network, NG Radio Access Network(NG-RAN), Xn application protocol (XnAP)(Release 15)," Jun. 2017, 53 pages.
3GPP TS 37.340 V0.2.1 (Aug. 2017), "3rd Generation Partnership Project;Technical Specification Group Radio Access Network; Evolved Universal Terrestrial Radio Access (E-UTRA) and NR; Multi-connectivity; Stage 2(Release 15)," Aug. 2017, 43 pages.
Huawei, China Unicom, "LTE CU DU function split," 3GPP TSG-RAN3 Meeting #NR#2, R3-172103, Qingdao, China, Jun. 27-29, 2017, 2 pages.
Office Action issued in Korean Application No. 2020-7007175 dated Aug. 10, 2021, 12 pages (with English translation).

* cited by examiner

TRANSMISSION METHOD AND NETWORK DEVICE

CROSS-REFERENCE TO RELATED APPLICATIONS

This application is a continuation of International Application No. PCT/CN2018/099819, filed on Aug. 10, 2018, which claims priority to Chinese Patent Application No. 201710685352.9, filed on Aug. 11, 2017. The disclosures of the aforementioned applications are hereby incorporated by reference in their entireties.

TECHNICAL FIELD

This application relates to the communications field, and more specifically, to a transmission method and a network device.

BACKGROUND

In a 5th Generation mobile communications (the 5th Generation mobile communication technology, 5G) system, a base station may include a centralized unit (Centralized Unit, CU) and a distributed unit (Distributed Unit, DU). To be specific, functions of a base station in an original access network are split, some functions of the base station are deployed on one CU, and remaining functions are deployed on a plurality of DUs. The plurality of DUs share the one CU, thereby reducing costs and facilitating network expansion.

A CU and a DU may be split based on a protocol stack. A possible manner is: deploying a Radio Resource Control (Radio Resource Control, RRC) layer and a Packet Data Convergence Protocol (Packet Data Convergence Protocol, PDCP) layer on the CU; and deploying a remaining Radio Link Control (Radio Link Control, RLC) layer, Media Access Control (Media Access Control, MAC) layer, and physical layer on the DU.

After a terminal device accesses a cell, a corresponding context of the terminal device is established on a network device. After a status of the terminal device changes, the network device processes the context of the terminal device accordingly. For example, when the terminal device enters an idle mode from a connected mode, the network device releases the context of the terminal device. In addition, in 5G, a new RRC status/RRC sub-status referred to as an inactive mode (also referred to as a third mode) is introduced for a terminal device. When an RRC status of the terminal device changes, a CU needs to instruct a DU to perform joint context processing. Currently, there is no corresponding solution for providing a method for managing, by a CU and a DU, a context of a terminal device when functions of a network device are split.

In addition, there is no corresponding solution for providing a method for managing, by a CU and a DU, a context of a terminal device in a handover (Hand Over, HO) scenario or when a network device finds that the terminal device encounters a radio link failure (Radio Link Failure, RLF).

SUMMARY

According to a transmission method and a network device in embodiments of this application, a context of a terminal device can be effectively managed when some functions of a network device are split into different network nodes.

According to a first aspect, a transmission method is provided. The transmission method includes: receiving, by a first network node, a first message sent by a terminal device, where the first message is used to request to establish a radio resource control connection of the terminal device; sending, by the first network node, the first message to a first system; and receiving, by the first network node, a second message sent by the first system based on the first message, where the second message includes identification information of the terminal device, and the identification information of the terminal device is used by the first network node to retrieve context information of the terminal device that is stored at the first network node, or the second message includes context information of the terminal device, and the context information of the terminal device is access stratum context information.

In some possible implementations, the first network node receives the first message sent by the terminal device, where the first message is used to request to establish the radio resource control connection of the terminal device; the first network node sends the first message to a second network node; and the first network node receives a second message sent by the second network node based on the first message, where the second message includes the identification information of the terminal device, and the identification information of the terminal device is used by the first network node to retrieve the context information of the terminal device that is stored at the first network node, or the second message includes the context information of the terminal device.

In some possible implementations, the second network node is a control plane node of the first system.

According to the transmission method in this embodiment of this application, a context of the terminal device can be effectively managed when some functions of a network device are split into different network nodes.

With reference to the first aspect, in a first possible implementation of the first aspect, before the receiving, by a first network node, a first message sent by a terminal device, the method further includes: receiving, by the first network node, a third message sent by the first system; and storing, by the first network node, the context information of the terminal device based on the third message, or releasing the context information of the terminal device.

In some possible implementations, before the receiving, by a first network node, a first message sent by a terminal device, the method further includes: receiving, by the first network node, an instruction message sent by the first system, where the instruction message is used to instruct the terminal device to enter an inactive mode; and sending, by the first network node, the instruction message to the terminal device.

With reference to the first aspect or the first possible implementation of the first aspect, in a second possible implementation of the first aspect, the sending, by the first network node, the first message to a first system includes: sending, by the first network node, the first message to a second network node, where the second network node is a control plane node of the first system; and the receiving, by the first network node, a second message sent by the first system based on the first message includes: receiving, by the first network node, the second message sent by the second network node based on the first message.

With reference to any one of the first aspect, or the first or the second possible implementation of the first aspect, in a third possible implementation of the first aspect, the identification information of the terminal device is at least one of resume identification information of the terminal device, identification information of the terminal device at a first interface, cell radio network temporary identifier information, and physical cell identifier information; and the first interface is used for data transmission and information exchange between the first network node and the first system.

With reference to any one of the first aspect, or the first to the third possible implementations of the first aspect, in a fourth possible implementation of the first aspect, the context information of the terminal device includes at least one of a radio resource control configuration, a data radio bearer parameter, the identification information of the terminal device, cell identifier information, and connection information of the first interface; and the first interface is used for data transmission and information exchange between the first network node and the first system.

With reference to any one of the first aspect, or the first to the fourth possible implementations of the first aspect, in a fifth possible implementation of the first aspect, the first network node includes at least one of a Radio Link Control protocol layer function, a Media Access Control layer function, and a physical layer function; and/or the first system includes at least one of a Packet Data Convergence Protocol layer function, a Service Data Adaptation Protocol layer function, and a Radio Resource Control layer function.

According to a second aspect, a transmission method is provided. The transmission method includes: receiving, by a first system, a first message from a terminal device, where the first message is used to request to establish a radio resource control connection of the terminal device; and sending, by the first system, a second message to a first network node based on the first message, where the second message includes identification information of the terminal device, and the identification information of the terminal device is used by the first network node to retrieve context information of the terminal device that is stored at the first network node, or the second message includes context information of the terminal device, and the context information of the terminal device is access stratum context information.

In some possible implementations, a second network node receives the first message from the terminal device, where the first message is used to request to establish the radio resource control connection of the terminal device; and the second network node sends a second message to the first network node based on the first message, where the second message includes the identification information of the terminal device, and the identification information of the terminal device is used by the first network node to retrieve the context information of the terminal device that is stored at the first network node, or the second message includes the context information of the terminal device.

In some possible implementations, the second network node is a control plane node of the first system.

According to the transmission method in this embodiment of this application, a context of the terminal device can be effectively managed when some functions of a network device are split into different network nodes.

With reference to the second aspect, in a first possible implementation of the second aspect, the receiving, by a first system, a first message from a terminal device includes: receiving, by a second network node, the first message from the terminal device, where the second network node is a control plane node of the first system; and the sending, by the first system, a second message to a first network node based on the first message includes: sending, by the second network node, the second message to the first network node based on the first message.

With reference to the first possible implementation of the second aspect, in a second possible implementation of the second aspect, the method further includes: sending, by the second network node, a fourth message to a third network node, where the fourth message includes the identification information of the terminal device, and the identification information of the terminal device is used by the third network node to retrieve context information of the terminal device that is stored at the third network node, or the fourth message includes context information of the terminal device, and the third network node is a user plane node of the first system.

In some possible implementations, before the receiving, by a first system, a first message from a terminal device, the method further includes: sending, by the first system, an instruction message to the first network node, where the instruction message is used to instruct the terminal device to enter an inactive mode; and sending, by the first network node, the instruction message to the terminal device.

With reference to any one of the second aspect, or the first or the second possible implementation of the second aspect, in a third possible implementation of the second aspect, the first network node includes at least one of a Radio Link Control protocol layer function, a Media Access Control layer function, and a physical layer function; and/or the first system includes at least one of a Packet Data Convergence Protocol layer function, a Service Data Adaptation Protocol layer function, and a Radio Resource Control function.

According to a third aspect, a transmission method is provided. The method includes: receiving, by a third network node, a fourth message sent by a second network node, where the fourth message includes identification information of the terminal device, and the identification information of the terminal device is used by the third network node to retrieve context information of the terminal device that is stored at the first network node, or the fourth message includes context information of the terminal device; and establishing, by the third network node, the context information of the terminal device based on the fourth message, where the context information of the terminal device is access stratum context information, the second network node is a control plane node of a first system, and the third network node is a user plane node of the first system.

In some possible implementations, the third network node is a user plane node of the first system.

With reference to the third aspect, in a first possible implementation of the third aspect, before the receiving, by a third network node, a fourth message sent by a second network node, the method further includes: receiving, by the third network node, a fifth message sent by the second network node; and storing, by the third network node, the context information of the terminal device based on the fifth message, or releasing a part of the context information of the terminal device.

With reference to the first possible implementation of the third aspect, in a second possible implementation of the third aspect, the context information of the terminal device includes at least one of connection information of a second interface, connection information of a third interface, connection information of a fourth interface, a radio resource control configuration, a data radio bearer parameter, current security context information, a Packet Data Convergence Protocol status, cell identifier information, and identification information used to identify the terminal device; the second interface is used for data transmission and/or information exchange between the third network node and a core network; the third interface is used for data transmission and/or information exchange between the third network node and the second network node; and the fourth interface is used for data transmission and/or information exchange between the third network node and the first network node.

In some possible implementations, the context information of the terminal device that is stored at the third network node includes connection information of a first interface, the connection information of the second interface, the current security context information, the Packet Data Convergence Protocol status, and the identification information used to identify the terminal device; and the context information of the terminal device that is released by the third network node includes at least one of the Packet Data Convergence Protocol status and the connection information of the fourth interface.

With reference to any one of the third aspect, or the first or the second possible implementation of the third aspect, in a third possible implementation of the third aspect, the first network node includes at least one of a Radio Link Control protocol layer function, a Media Access Control layer function, and a physical layer function; and/or the first system includes at least one of a Packet Data Convergence Protocol layer function, a Service Data Adaptation Protocol layer function, and a Radio Resource Control function.

According to a fourth aspect, a transmission method is provided. The method includes: receiving, by a first network node, a first message sent by a terminal device, where the first message is used to request to establish a radio resource control connection of the terminal device; determining, by the first network node, identification information of the terminal device based on the first message; and retrieving, by the first network node based on the identification information of the terminal device, context information of the terminal device that is stored at the first network node; or receiving, by the first network node based on the identification information of the terminal device, a second message sent by a first system, where the second message includes context information of the terminal device, and the context information of the terminal device is access stratum context information.

In some possible implementations, the first network node receives the first message sent by the terminal device, where the first message is used to request to establish the radio resource control connection of the terminal device; the first network node determines the identification information of the terminal device based on the first message; and the first network node retrieves, based on the identification information of the terminal device, the context information of the terminal device that is stored at the first network node; or the first network node receives, based on the identification information of the terminal device, a second message sent by a second network node, where the second message includes the context information of the terminal device.

In some possible implementations, the second network node is a control plane node of the first system.

According to the transmission method in this embodiment of this application, a context of the terminal device can be effectively managed when some functions of a network device are split into different network nodes.

With reference to the fourth aspect, in a first possible implementation of the fourth aspect, before the receiving, by a first network node, a first message sent by a terminal device, the method further includes: receiving, by the first network node, a third message sent by the first system; and storing, by the first network node, the context information of the terminal device based on the third message, or releasing the context information of the terminal device.

In some possible implementations, before the receiving, by a first network node, a first message sent by a terminal device, the method further includes: receiving, by the first network node, an instruction message sent by the first system, where the instruction message is used to instruct the terminal device to enter an inactive mode; and sending, by the first network node, the instruction message to the terminal device.

With reference to the fourth aspect or the first possible implementation of the fourth aspect, in a second possible implementation of the fourth aspect, the receiving, by the first network node based on the identification information of the terminal device, a second message sent by a first system includes: receiving, by the first network node based on the identification information of the terminal device, the second message sent by a second network node, where the second network node is a control plane node of the first system.

With reference to any one of the fourth aspect, or the first or the second possible implementation of the fourth aspect, in a third possible implementation of the fourth aspect, the identification information of the terminal device is at least one of resume identification information of the terminal device, identification information of the terminal device at a first interface, cell radio network temporary identifier information, and physical cell identifier information; and the first interface is used for data transmission and information exchange between the first network node and the first system.

With reference to any one of the fourth aspect, or the first to the third possible implementations of the fourth aspect, in a fourth possible implementation of the fourth aspect, the context information of the terminal device includes at least one of a radio resource control configuration, a data radio bearer parameter, and connection information of the first interface; and the first interface is used for data transmission and information exchange between the first network node and the first system.

With reference to any one of the fourth aspect, or the first to the fourth possible implementations of the fourth aspect, in a fifth possible implementation of the fourth aspect, the first network node includes at least one of a Radio Link Control protocol layer function, a Media Access Control layer function, a physical layer function, and a Radio Resource Control layer function; and/or the first system includes at least one of a Packet Data Convergence Protocol layer function, a Service Data Adaptation Protocol layer function, and a Radio Resource Control layer function.

According to a fifth aspect, a transmission method is provided. The method includes: receiving, by a first system, a sixth message sent by a first network node, where the sixth message includes identification information of the terminal device, and the sixth message is used to instruct the first system to retrieve context information of the terminal device that is stored at the first system; and sending, by the first system, a second message to the first network node based on the sixth message, where the second message includes the context information of the terminal device, and the context information of the terminal device is access stratum context information.

In some possible implementations, a second network node receives the sixth message sent by the first network node, where the sixth message includes the identification information of the terminal device, and the sixth message is used to instruct the second network node to retrieve context information of the terminal device that is stored at the second network node; and the second network node sends a second message to the first network node based on the sixth message, where the second message includes the identification information of the terminal device, and the identification information of the terminal device is used by the first network node to retrieve the context information of the terminal device that is stored at the first network node, or the second message includes the context information of the terminal device.

In some possible implementations, the second network node is a control plane node of the first system.

According to the transmission method in this embodiment of this application, a context of the terminal device can be effectively managed when some functions of a network device are split into different network nodes.

With reference to the fifth aspect, in a first possible implementation of the fifth aspect, the receiving, by a first system, a sixth message sent by a first network node includes: receiving, by a second network node, the sixth message sent by the first network node, where the second network node is a control plane node of the first system; and the sending, by the first system, a second message to the first network node based on the sixth message includes: sending, by the second network node, the second message to the first network node based on the sixth message.

In some possible implementations, before the receiving, by a first system, a sixth message sent by a first network node, the method further includes: sending, by the first system, an instruction message to the first network node, where the instruction message is used to instruct the terminal device to enter an inactive mode; and sending, by the first network node, the instruction message to the terminal device.

With reference to the first possible implementation of the fifth aspect, in a second possible implementation of the fifth aspect, the method further includes: sending, by the second network node, a seventh message to a third network node, where the seventh message includes the identification information of the terminal device, and the identification information of the terminal device is used by the first network node to retrieve context information of the terminal device that is stored at the first network node, or the seventh message includes context information of the terminal device, and the third network node is a user plane node of the first system.

With reference to any one of the fifth aspect, or the first or the second possible implementation of the fifth aspect, in a third possible implementation of the fifth aspect, the first network node includes at least one of a Radio Link Control protocol layer function, a Media Access Control layer function, a physical layer function, and a Radio Resource Control layer function; and/or the first system includes at least one of a Packet Data Convergence Protocol layer function, a Service Data Adaptation Protocol layer function, and a Radio Resource Control layer function.

According to a sixth aspect, a transmission method is provided. The method includes: determining, by a first network node, that a radio link failure occurs between the first network node and a terminal device, where the first network node includes at least one of a Radio Link Control protocol layer function, a Media Access Control layer function, and a physical layer function; and sending, by the first network node, a sixth message to a first system, where the sixth message is used to indicate to a second network node that the radio link failure occurs between the first network node and the terminal device, and the second network node includes at least one of a Packet Data Convergence Protocol layer function, a Service Data Adaptation Protocol layer function, and a Radio Resource Control layer function.

With reference to the sixth aspect, in a first possible implementation of the sixth aspect, the method further includes: receiving, by the first network node, a seventh message sent by the first system, where the seventh message is used to instruct the first network node to release a context of the terminal device.

With reference to the sixth aspect or the first possible implementation of the sixth aspect, in a second possible implementation of the sixth aspect, the sending, by the first network node, a sixth message to the first system includes: sending, by the first network node, the sixth message to the second network node, where the second network node is a control plane node of the first system.

With reference to any one of the sixth aspect, or the first or the second possible implementation of the sixth aspect, in a third possible implementation of the sixth aspect, the sixth message includes at least one of identification information of the terminal device, radio link failure indication information, and a cell radio network temporary identifier.

According to the transmission method in this embodiment of this application, a context of the terminal device can be effectively managed when some functions of a network device are split into different network nodes.

According to a seventh aspect, a transmission method is provided. The method includes: receiving, by a first system, a sixth message sent by a first network node, where the sixth message is used to indicate to the first system that a radio link failure occurs between the first network node and a terminal device, the first network node includes at least one of a Radio Link Control protocol layer function, a Media Access Control layer function, and a physical layer function, and the first system includes at least one of a Packet Data Convergence Protocol layer function, a Service Data Adaptation Protocol layer function, and a Radio Resource Control layer function; setting, by the first system, a timer based on the sixth message; and if the timer expires, sending, by the first system, a seventh message to the first network node, where the seventh message is used to instruct the first network node to release a context of the terminal device; or if the first system receives a radio resource control connection message before the timer expires, stopping, by the first system, the timer.

With reference to the seventh aspect, in a first possible implementation of the seventh aspect, the receiving, by a first system, a sixth message sent by a first network node includes: receiving, by a second network node, the sixth message sent by the first network node, where the second network node is a control plane node of the first system; and the setting, by the first system, a timer based on the sixth message includes: setting, by the second network node, the timer based on the sixth message.

With reference to the first possible implementation of the seventh aspect, in a second possible implementation of the seventh aspect, the method further includes: if the timer expires, sending, by the second network node, an eighth message to a third network node, where the eighth message is used to instruct the third network node to release a part of context information of the terminal device, and the third network node is a user plane node of the first system.

With reference to any one of the seventh aspect, or the first or the second possible implementation of the seventh aspect, in a third possible implementation of the seventh aspect, the sixth message includes at least one of identification information of the terminal device, radio link failure indication information, and a cell radio network temporary identifier.

According to an eighth aspect, a network device is provided. The network device includes: a transceiver module, configured to receive a first message sent by a terminal device, where the first message is used to request to establish a radio resource control connection of the terminal device; and a processing module, configured to control the transceiver module to send the first message to a first system, where the transceiver module is further configured to receive a second message sent by the first system based on the first message, where the second message includes identification information of the terminal device, and the identification information of the terminal device is used by a first network node to retrieve context information of the terminal device that is stored at the first network node, or the second message includes context information of the terminal device, and the context information of the terminal device is access stratum context information.

According to the network device in this embodiment of this application, a context of the terminal device can be effectively managed when some functions of a network device are split into different network nodes.

With reference to the eighth aspect, in a first possible implementation of the eighth aspect, the transceiver module is further configured to receive a third message sent by the first system; and the first network node stores the context information of the terminal device or releases the context information of the terminal device based on the third message.

In some possible implementations, the transceiver module is further configured to receive an instruction message sent by the first system, where the instruction message is used by the first network node to instruct the terminal device to enter an inactive mode; and the first network node sends the instruction message to the terminal device.

With reference to the eighth aspect or the first possible implementation of the eighth aspect, in a second possible implementation of the eighth aspect, the transceiver module is specifically configured to send the first message to a second network node, and receive the second message sent by the second network node based on the first message, where the second network node is a control plane node of the first system.

With reference to any one of the eighth aspect, or the first or the second possible implementation of the eighth aspect, in a third possible implementation of the eighth aspect, the identification information of the terminal device is at least one of resume identification information of the terminal device, identification information of the terminal device at a first interface, cell radio network temporary identifier information, and physical cell identifier information; and the first interface is used for data transmission and information exchange between the first network node and the first system.

With reference to any one of the eighth aspect, or the first to the third possible implementations of the eighth aspect, in a fourth possible implementation of the eighth aspect, the context information of the terminal device includes at least one of a radio resource control configuration, a data radio bearer parameter, and connection information of the first interface; and the first interface is used for data transmission and information exchange between the first network node and the first system.

With reference to any one of the eighth aspect, or the first to the fourth possible implementations of the eighth aspect, in a fifth possible implementation of the eighth aspect, the first network node includes at least one of a Radio Link Control protocol layer function, a Media Access Control layer function, and a physical layer function; and/or the first system includes at least one of a Packet Data Convergence Protocol layer function, a Service Data Adaptation Protocol layer function, and a Radio Resource Control function.

According to a ninth aspect, a network device is provided. The network device includes: a transceiver module, configured to receive a first message from a terminal device, where the first message is used to request to establish a radio resource control connection of the terminal device; and a processing module, configured to send a second message to a first network node based on the first message, where the second message includes identification information of the terminal device, and the identification information of the terminal device is used by the first network node to retrieve context information of the terminal device that is stored at the first network node, or the second message includes context information of the terminal device, and the context information of the terminal device is access stratum context information.

According to the network device in this embodiment of this application, a context of the terminal device can be effectively managed when some functions of a network device are split into different network nodes.

With reference to the ninth aspect, in a first possible implementation of the ninth aspect, the transceiver module is a transceiver module of a second network node, and the second network node is a control plane node of a first system.

With reference to the first possible implementation of the ninth aspect, in a second possible implementation of the ninth aspect, the transceiver module is further configured to send a fourth message to a third network node, where the fourth message includes the identification information of the terminal device, and the identification information of the terminal device is used by the third network node to retrieve context information of the terminal device that is stored at the third network node, or the fourth message includes context information of the terminal device, and the third network node is a user plane node of the first system.

In some possible implementations, the transceiver module is further configured to send an instruction message to the first network node, where the instruction message is used by the first network node to instruct the terminal device to enter an inactive mode; and the first network node sends the instruction message to the terminal device.

With reference to any one of the ninth aspect, or the first or the second possible implementation of the ninth aspect, in a third possible implementation of the ninth aspect, the first network node includes at least one of a Radio Link Control protocol layer function, a Media Access Control layer function, and a physical layer function; and/or the first system includes at least one of a Packet Data Convergence Protocol layer function, a Service Data Adaptation Protocol layer function, and a Radio Resource Control function.

According to a tenth aspect, a network device is provided. The network device includes: a transceiver module, configured to receive a fourth message sent by a second network node, where the fourth message includes identification information of a terminal device, and the identification information of the terminal device is used by a third network node to retrieve context information of the terminal device that is stored at a first network node, or the fourth message includes context information of the terminal device; and a processing module, configured to establish the context information of the terminal device based on the fourth message, where the context information of the terminal device is access stratum context information, the second network node is a control plane node of a first system, and the third network node is a user plane node of the first system.

According to the network device in this embodiment of this application, a context of the terminal device can be effectively managed when some functions of a network device are split into different network nodes.

With reference to the tenth aspect, in a first possible implementation of the tenth aspect, the transceiver module is further configured to receive a fifth message sent by the second network node; and the processing module is further configured to store the context information of the terminal device based on the fifth message, or release a part of the context information of the terminal device based on the fifth message.

With reference to the first possible implementation of the tenth aspect, in a second possible implementation of the tenth aspect, the context information of the terminal device includes at least one of connection information of a second interface, connection information of a third interface, connection information of a fourth interface, a radio resource control configuration, a data radio bearer parameter, current security context information, a Packet Data Convergence Protocol status, cell identifier information, and identification information used to identify the terminal device; the second interface is used for data transmission and/or information exchange between the third network node and a core network; the third interface is used for data transmission and/or information exchange between the third network node and the second network node; and the fourth interface is used for data transmission and/or information exchange between the third network node and the first network node.

With reference to any one of the tenth aspect, or the first or the second possible implementation of the tenth aspect, in a third possible implementation of the tenth aspect, the first network node includes at least one of a Radio Link Control protocol layer function, a Media Access Control layer function, and a physical layer function; and/or the first system includes at least one of a Packet Data Convergence Protocol layer function, a Service Data Adaptation Protocol layer function, and a Radio Resource Control function.

According to an eleventh aspect, a network device is provided. The network device includes: a transceiver module, configured to receive a first message sent by a terminal device, where the first message is used to request to establish a radio resource control connection of the terminal device; and a processing module, configured to determine identification information of the terminal device based on the first message, where the processing module is further configured to retrieve, based on the identification information of the terminal device, context information of the terminal device that is stored at a first network node; or the processing module is further configured to receive, based on the identification information of the terminal device, a second message sent by a first system, where the second message includes context information of the terminal device, and the context information of the terminal device is access stratum context information.

According to the network device in this embodiment of this application, a context of the terminal device can be effectively managed when some functions of a network device are split into different network nodes.

With reference to the eleventh aspect, in a first possible implementation of the eleventh aspect, the transceiver module is further configured to receive a third message sent by the first system; and the processing module is further configured to store the context information of the terminal device based on the third message, or release the context information of the terminal device based on the third message.

In some possible implementations, the transceiver module is further configured to receive an instruction message sent by the first system, where the instruction message is used by the first network node to instruct the terminal device to enter an inactive mode; and the first network node sends the instruction message to the terminal device.

With reference to the eleventh aspect or the first possible implementation of the eleventh aspect, in a second possible implementation of the eleventh aspect, the processing module is a processing module of a second network node, and the second network node is a control plane node of the first system.

With reference to any one of the eleventh aspect, or the first or the second possible implementation of the eleventh aspect, in a third possible implementation of the eleventh aspect, the identification information of the terminal device is at least one of resume identification information of the terminal device, identification information of the terminal device at a first interface, cell radio network temporary identifier information, and physical cell identifier information; and the first interface is used for data transmission and information exchange between the first network node and the first system.

With reference to any one of the eleventh aspect, or the first to the third possible implementations of the eleventh aspect, in a fourth possible implementation of the eleventh aspect, the context information of the terminal device includes at least one of a radio resource control configuration, a data radio bearer parameter, and connection information of the first interface; and the first interface is used for data transmission and information exchange between the first network node and the first system.

With reference to any one of the eleventh aspect, or the first to the fourth possible implementations of the eleventh aspect, in a fifth possible implementation of the eleventh aspect, the first network node includes at least one of a Radio Link Control protocol layer function, a Media Access Control layer function, a physical layer function, and a Radio Resource Control layer function; and/or the first system includes at least one of a Packet Data Convergence Protocol layer function, a Service Data Adaptation Protocol layer function, and a Radio Resource Control layer function.

According to a twelfth aspect, a network device is provided. The network device includes: a transceiver module, configured to receive a sixth message sent by a first network node, where the sixth message includes identification information of a terminal device, and the sixth message is used by a first system to retrieve context information of the terminal device that is stored at the first system; and a processing module, configured to send a second message to the first network node based on the sixth message, where the second message includes the context information of the terminal device, and the context information of the terminal device is access stratum context information.

According to the network device in this embodiment of this application, a context of the terminal device can be effectively managed when some functions of a network device are split into different network nodes.

With reference to the twelfth aspect, in a first possible implementation of the twelfth aspect, the transceiver module is a transceiver module of a second network node, the processing module is a processing module of the second network node, and the second network node is a control plane node of the first system.

With reference to the first possible implementation of the twelfth aspect, in a second possible implementation of the twelfth aspect, the transceiver module is further configured to send a seventh message to a third network node, where the seventh message includes the identification information of the terminal device, and the identification information of the terminal device is used by the first network node to retrieve context information of the terminal device that is stored at the first network node, or the seventh message includes context information of the terminal device, and the third network node is a user plane node of the first system.

With reference to any one of the twelfth aspect, or the first or the second possible implementation of the twelfth aspect, in a third possible implementation of the twelfth aspect, the first network node includes at least one of a Radio Link Control protocol layer function, a Media Access Control layer function, a physical layer function, and a Radio Resource Control layer function; and/or the first system includes at least one of a Packet Data Convergence Protocol layer function, a Service Data Adaptation Protocol layer function, and a Radio Resource Control layer function.

According to a thirteenth aspect, a network device is provided. The network device includes: a processing module, configured to determine that a radio link failure occurs between a first network node and a terminal device, where the first network node includes at least one of a Radio Link Control protocol layer function, a Media Access Control layer function, and a physical layer function; and a transceiver module, configured to send a sixth message to a first system, where the sixth message is used to indicate to a second network node that the radio link failure occurs between the first network node and the terminal device, and the second network node includes at least one of a Packet Data Convergence Protocol layer function, a Service Data Adaptation Protocol layer function, and a Radio Resource Control layer function.

According to the network device in this embodiment of this application, a context of the terminal device can be effectively managed when some functions of a network device are split into different network nodes.

With reference to the thirteenth aspect, in a first possible implementation of the thirteenth aspect, the transceiver module is further configured to receive a seventh message sent by the first system, where the seventh message is used to instruct the first network node to release a context of the terminal device.

With reference to the thirteenth aspect or the first possible implementation of the thirteenth aspect, in a second possible implementation of the thirteenth aspect, the transceiver module is a transceiver module of the second network node, the processing module is a processing module of the second network node, and the second network node is a control plane node of the first system.

With reference to any one of the thirteenth aspect, or the first or the second possible implementation of the thirteenth aspect, in a third possible implementation of the thirteenth aspect, the sixth message includes at least one of identification information of the terminal device, radio link failure indication information, and a cell radio network temporary identifier.

According to a fourteenth aspect, a network device is provided. The network device includes: a transceiver module, configured to receive a sixth message sent by a first network node, where the sixth message is used to indicate to a first system that a radio link failure occurs between the first network node and a terminal device, the first network node includes at least one of a Radio Link Control protocol layer function, a Media Access Control layer function, and a physical layer function, and the first system includes at least one of a Packet Data Convergence Protocol layer function, a Service Data Adaptation Protocol layer function, and a Radio Resource Control layer function; and a processing module, configured to set a timer based on the sixth message, where if the timer expires, the first system sends a seventh message to the first network node, and the seventh message is used to instruct the first network node to release a context of the terminal device; or if the first system receives a radio resource control connection message before the timer expires, the first system stops the timer.

According to the network device in this embodiment of this application, a context of the terminal device can be effectively managed when some functions of a network device are split into different network nodes.

With reference to the fourteenth aspect, in a first possible implementation of the fourteenth aspect, the transceiver module is a transceiver module of a second network node, the processing module is a processing module of the second network node, and the second network node is a control plane node of the first system.

With reference to the first possible implementation of the fourteenth aspect, in a second possible implementation of the fourteenth aspect, the transceiver module is further configured to: if the timer expires, send an eighth message to a third network node, where the eighth message is used to instruct the third network node to release context information of the terminal device, and the third network node is a user plane node of the first system.

With reference to any one of the fourteenth aspect, or the first or the second possible implementation of the fourteenth aspect, in a third possible implementation of the fourteenth aspect, the sixth message includes at least one of identification information of the terminal device, radio link failure indication information, and a cell radio network temporary identifier.

According to a fifteenth aspect, a network device is provided. The network device includes: a memory, a transceiver, and at least one processor. The memory, the transceiver, and the at least one processor are connected to each other via a line. The transceiver is configured to perform information sending/receiving operations that are performed on the network device in the method according to any one of the first aspect or the possible implementations of the first aspect. The at least one processor invokes the instruction stored in the memory, to perform processing operations that are performed on the network device in the method according to any one of the first aspect or the possible implementations of the first aspect.

According to a sixteenth aspect, a network device is provided. The network device includes: a memory, a transceiver, and at least one processor. The memory, the transceiver, and the at least one processor are connected to each other via a line. The transceiver is configured to perform information sending/receiving operations that are performed on the network device in the method according to any one of the second aspect or the possible implementations of the second aspect. The at least one processor invokes the instruction stored in the memory, to perform processing operations that are performed on the network device in the method according to any one of the second aspect or the possible implementations of the second aspect.

According to a seventeenth aspect, a network device is provided. The network device includes: a memory, a transceiver, and at least one processor. The memory, the transceiver, and the at least one processor are connected to each other via a line. The transceiver is configured to perform information sending/receiving operations that are performed on the network device in the method according to any one of the third aspect or the possible implementations of the third aspect. The at least one processor invokes the instruction stored in the memory, to perform processing operations that are performed on the network device in the method according to any one of the third aspect or the possible implementations of the third aspect.

According to an eighteenth aspect, a network device is provided. The network device includes: a memory, a transceiver, and at least one processor. The memory, the transceiver, and the at least one processor are connected to each other via a line. The transceiver is configured to perform information sending/receiving operations that are performed on the network device in the method according to any one of the fourth aspect or the possible implementations of the fourth aspect. The at least one processor invokes the instruction stored in the memory, to perform processing operations that are performed on the network device in the method according to any one of the fourth aspect or the possible implementations of the fourth aspect.

According to a nineteenth aspect, a network device is provided. The network device includes: a memory, a transceiver, and at least one processor. The memory, the transceiver, and the at least one processor are connected to each other via a line. The transceiver is configured to perform information sending/receiving operations that are performed on the network device in the method according to any one of the fifth aspect or the possible implementations of the fifth aspect. The at least one processor invokes the instruction stored in the memory, to perform processing operations that are performed on the network device in the method according to any one of the fifth aspect or the possible implementations of the fifth aspect.

According to a twentieth aspect, a network device is provided. The network device includes: a memory, a transceiver, and at least one processor. The memory, the transceiver, and the at least one processor are connected to each other via a line. The transceiver is configured to perform information sending/receiving operations that are performed on the network device in the method according to any one of the sixth aspect or the possible implementations of the sixth aspect. The at least one processor invokes the instruction stored in the memory, to perform processing operations that are performed on the network device in the method according to any one of the sixth aspect or the possible implementations of the sixth aspect.

According to a twenty-first aspect, a network device is provided. The network device includes: a memory, a transceiver, and at least one processor. The memory, the transceiver, and the at least one processor are connected to each other via a line. The transceiver is configured to perform information sending/receiving operations that are performed on the network device in the method according to any one of the seventh aspect or the possible implementations of the seventh aspect. The at least one processor invokes the instruction stored in the memory, to perform processing operations that are performed on the network device in the method according to any one of the seventh aspect or the possible implementations of the seventh aspect.

According to a twenty-second aspect, a chip system is provided. The chip system is applied to a network device, and the chip system includes: at least one processor, at least one memory, and an interface circuit. The interface circuit is responsible for information exchange between the chip system and an external environment. The at least one memory, the interface circuit, and the at least one processor are connected to each other via a line. The at least one memory stores an instruction. The instruction is executed by the at least one processor, to perform operations of the network device in the methods according to the foregoing aspects.

According to a twenty-third aspect, a communications system is provided, including a network device and/or a terminal device. The network device is the network device according to the foregoing aspects.

According to a twenty-fourth aspect, a computer program product is provided. The computer program product is applied to a network device, and the computer program product includes a series of instructions. When the instructions are run, operations of the network device in the methods according to the foregoing aspects are performed.

According to a twenty-fifth aspect, a computer readable storage medium is provided. The computer readable storage medium stores an instruction. When the instruction is run on a computer, the computer is enabled to perform the methods according to the foregoing aspects.

DESCRIPTION OF EMBODIMENTS

The following describes technical solutions of this application with reference to the accompanying drawings.

Figure 1:
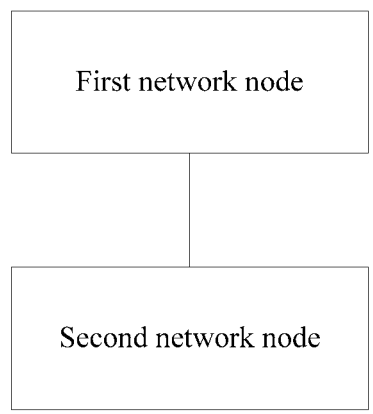
FIG. 1 is a schematic diagram of an application scenario of a technical solution according to an embodiment of this application.

Embodiments of this application are applicable to various forms of systems in which some functions of a network device are split. FIG. 1 is a schematic diagram of an application scenario of a technical solution according to an embodiment of this application. As shown in FIG. 1, some functions of a network device are split into a first network node and a second network node.

Figure 2:
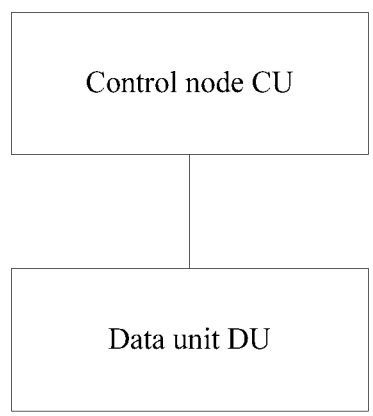
FIG. 2 is another schematic diagram of an application scenario of a technical solution according to an embodiment of this application.

Specifically, FIG. 2 is a schematic diagram of another application scenario of a technical solution according to an embodiment of this application. As shown in FIG. 2, CU-DU splitting is introduced in a CRAN architecture. A DU may be corresponding to the first network node in FIG. 1, and a CU is corresponding to the second network node in FIG. 1.

It should be understood that the first network node and the second network node may be two physically or logically separate modules in an entire network architecture, or may be two completely independent logical network elements.

It should be further understood that control plane/user plane splitting may be performed on the second network node, to form a user plane of the second network node and a control plane of the second network node.

The CU has radio resource control (Radio Resource Control, RRC) functions or some of RRC functions, and includes all or some protocol layer functions of an existing base station, for example, including only the RRC functions or some of the RRC functions; or including the RRC functions or Service Data Adaptation Protocol (Service Data Adaptation Protocol, SDAP) layer functions; or including RRC/Packet Data Convergence Protocol (Packet Data Convergence Protocol, PDCP) layer functions; or including RRC/PDCP layer functions and some Radio Link Control (Radio Link Control, RLC) protocol layer functions; or including RRC/PDCP/Media Access Control (Media Access Control, MAC) layer functions and even some or all physical layer PHY functions. There may be any other possibilities.

The DU has all or some protocol layer functions of an existing base station, namely, some RRC/SDAP/PDCP/RLC/MAC/PHY protocol layer function units, for example, including some RRC functions and PDCP/RLC/MAC/PHY protocol layer functions; or including PDCP/RLC/MAC/PHY protocol layer functions; or including RLC/MAC/PHY protocol layer functions, or including some RLC/MAC/PHY functions; or including only all or some PHY functions. It should be noted that the functions of the protocol layers mentioned herein may change, and all changes fall within the protection scope of this application.

It should be understood that in this embodiment of this application, different protocol layers may be separately deployed on the first network node and the second network node. A possible implementation is: deploying at least a first protocol layer on the second network node, and deploying at least a second protocol layer and a third protocol layer on the first network node.

For example, the first protocol layer may be an RRC layer, the second protocol layer may be a MAC layer, and the third protocol layer may be a PHY layer.

It should be understood that the examples of the first protocol layer, the second protocol layer, and the third protocol layer are merely example descriptions, and should not constitute any limitation to this application. The first protocol layer and the second protocol layer may alternatively be other protocol layers defined in an existing protocol (for example, the LTE protocol) or a future protocol. This is not particularly limited in this application.

For another example, in a 5G network, new technical progress is also achieved for a new relay node. For example, a protocol stack architecture including only a layer 2 (for example, including a Radio Link Control (resource link control, RLC) layer and a MAC layer) and a layer 1 (for example, including a PHY layer) is deployed on a relay node, and none of protocol stack functions above the layer 2, for example, RRC layer functions, is deployed. Therefore, data or signaling generated by a host base station needs to be forwarded to a terminal device via a relay node.

It should be understood that in this embodiment of this application, the first network node may be corresponding to a DU in a CU-DU architecture, or may be corresponding to the foregoing relay node; and the second network node may be corresponding to a CU in the CU-DU architecture, or may be corresponding to the foregoing host base station.

Figure 3:
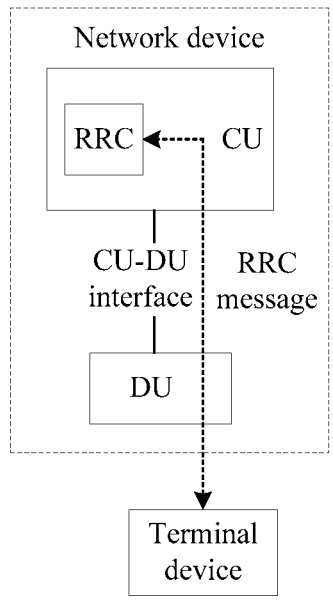
FIG. 3 is still another schematic diagram of an application scenario of a technical solution according to an embodiment of this application.

FIG. 3 is a schematic diagram of another application scenario of a technical solution according to an embodiment of this application. As shown in FIG. 3, an RRC layer is placed on a CU, and a MAC layer is placed on a DU. For an uplink RRC message, the DU receives, via an air interface, the message sent by a terminal device, and the DU processes the message, and then sends the RRC message to the CU via an interface between the CU and the DU. For a downlink RRC message, after generating the message, the CU sends the message to the DU via the interface between the CU and the DU, and the DU processes the message, and then sends the RRC message to the terminal device via the air interface.

Figure 4:
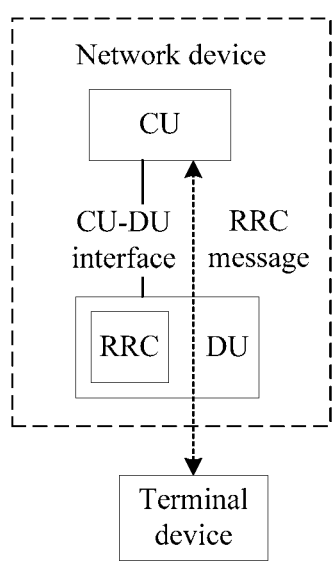
FIG. 4 is still another schematic diagram of an application scenario of a technical solution according to an embodiment of this application.

FIG. 4 is a schematic diagram of another application scenario of a technical solution according to an embodiment of this application. As shown in FIG. 4, a DU has some RRC functions, for example, signaling radio bearer SRB0 processing. Therefore, the RRC message may be processed by the DU.

It should be understood that the 3rd Generation Partnership Project (3rd Generation Partnership Project, 3GPP) currently names an interface between a CU and a DU as F1. The F1 interface includes a control plane (Control Plane, CP) and a user plane (User Plane, UP). A transport layer protocol of the control plane is the Stream Control Transmission Protocol (Stream Control Transmission Protocol, SCTP), and a transmitted application layer message is an F1AP (Application Protocol) message. A transport layer protocol of the user plane is the GPRS Tunneling Protocol-User Plane (GPRS Tunneling Protocol-User plane, GTP-U).

Figure 5:
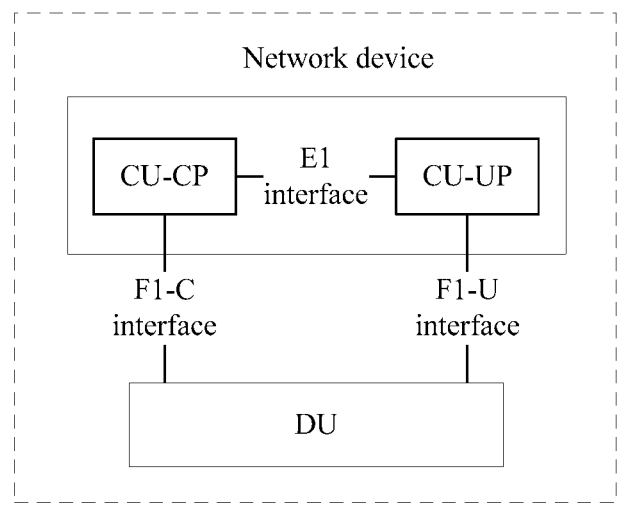
FIG. 5 is still another schematic diagram of an application scenario of a technical solution according to an embodiment of this application.

FIG. 5 is a schematic diagram of another application scenario of a technical solution according to an embodiment of this application. As shown in FIG. 5, when control plane/user plane splitting is performed on a CU, a CU-CP is responsible for control plane functions, for example, SRB processing, and may have an RRC layer and a PDCP layer that is responsible for SRB processing; and a CU-UP is responsible for user plane functions, for example, DRB management, is interconnected to a user plane network element of a core network, and may have an SDAP layer and a PDCP layer that are responsible for DRB processing.

An E1 interface is an interface between the CU-CP and the CU-UP. There is an F1-U connection between the CU-UP and a DU, and there is an F1-C connection between the CU-CP and the DU. There is an Ng-U connection between the CU-UP and the core network, and there is an Ng-C connection between the CU-CP and the core network.

It should be understood that the technical solutions in the embodiments of this application may be applied to various communications systems, for example, a Global System for Mobile Communications (Global System of Mobile Communication, GSM) system, a Code Division Multiple Access (Code Division Multiple Access, CDMA) system, a Wideband Code Division Multiple Access (Wideband Code Division Multiple Access, WCDMA) system, a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunication System, UMTS) system, a future 5th Generation (5th-Generation, 5G) communications system, and a communications system such as a CRAN.

It should be further understood that a network device in the embodiments of this application may be a device configured to communicate with a terminal device. For example, the network device may be a combination of a base station (Base Transceiver Station, BTS) and a base station controller (Base Station Controller, BSC) in a GSM system or a CDMA system, may be a combination of a NodeB (NodeB, NB) and a radio network controller (Radio Network Controller, RNC) in a WCDMA system, or may be an evolved NodeB (Evolutional Node B, eNB or eNodeB) in an LTE system. Alternatively, the network device may be a relay station, an access point, an in-vehicle device, a wearable device, an access network device in a future 5G network, such as a next-generation base station, an access network device in a future evolved public land mobile network (Public Land Mobile Network, PLMN), or the like.

Specifically, in the UMTS system in a 3rd Generation (3rd-Generation, 3G) mobile communications technology, there is a scenario in which a radio network control node is separated from a base station. In the LTE system, there are: a scenario in which a baseband module is separated from a radio frequency module, namely, a remote radio scenario; a data center (Data Center, DC) scenario, in which interconnection between two different networks is required; a macro-small cell scenario, in which there is an interface for interconnection between a macro cell and a small cell; and an LTE and Wi-Fi aggregation (LTE-Wi-Fi aggregation, LWA) scenario. In a 5G system, there are: various non-cell (non-cell) scenarios (a terminal may be randomly handed over between cells, and there is no explicit boundary between the cells), in which one control node is connected to all cells, or transmission nodes are connected to a cell; a CRAN scenario, including a BBU splitting scenario; a CRAN virtualization scenario, in which some functions of a BBU are centrally deployed and virtualized, other functions are separately deployed, and the two parts may be deployed in a physically separate manner. It should be understood that scenarios in which different systems/standards coexist fall within the applicable scope of this application.

This application describes the embodiments with reference to a terminal device. The terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a terminal device in a future 5G network, a terminal device in a PLMN, or the like.

Figure 6:
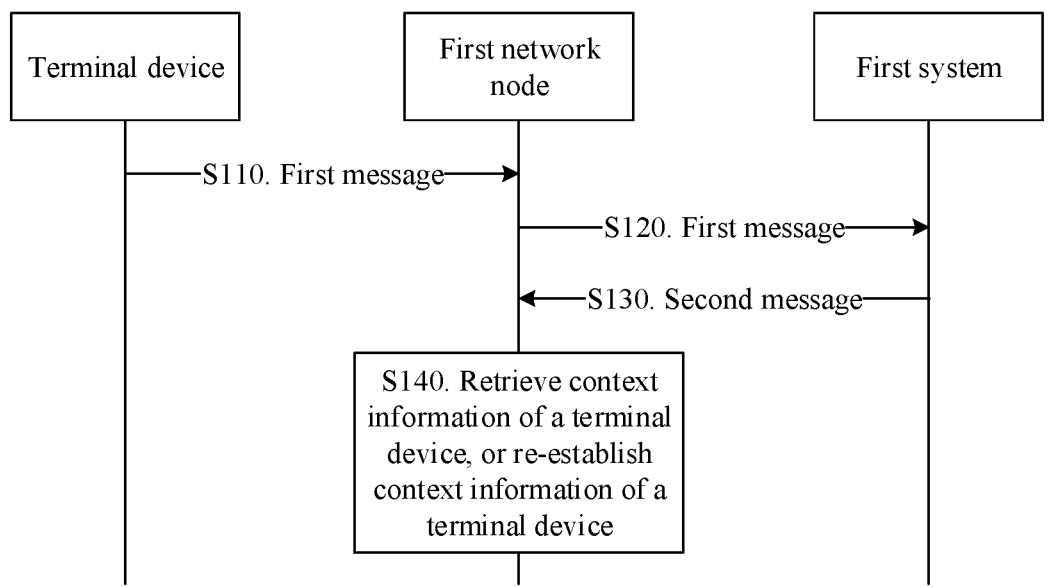
FIG. 6 is a schematic flowchart of a transmission method according to an embodiment of this application.

FIG. 6 is a schematic flowchart of a transmission method 100 according to an embodiment of this application. As shown in FIG. 6, the transmission method 100 includes the following steps.

S110. A first network node receives a first message sent by a terminal device, where the first message is used to request to establish a radio resource control connection of the terminal device.

S120. The first network node sends the first message to a first system.

S130. The first network node receives a second message sent by the first system based on the first message, where the second message includes identification information of the terminal device, and the identification information of the terminal device is used by the first network node to retrieve context information of the terminal device that is stored at the first network node, or the second message includes context information of the terminal device, and the context information of the terminal device is access stratum context information.

Optionally, the context information of the terminal device includes at least one of a radio resource control configuration, a data radio bearer parameter, the identification information of the terminal device, cell identifier information, and connection information of a first interface. The first interface is used for data transmission and information exchange between the first network node and the first system.

S140. The first network node retrieves, based on the identification information of the terminal device that is carried in the second message, the context information of the terminal device that is stored at the first network node, or re-establishes the context information of the terminal device.

Optionally, the first message is an RRC connection resume request message or an RRC connection re-establishment request message.

Optionally, the first network node includes at least one of a Radio Link Control protocol layer function, a Media Access Control layer function, and a physical layer function; and/or the first system includes at least one of a Packet Data Convergence Protocol layer function, a Service Data Adaptation Protocol layer function, and a Radio Resource Control function.

Specifically, the terminal device sends the first message to the first network node. The first message is used to request to establish the radio resource control connection of the terminal device. Because the first network node does not have some RRC functions, the first network node forwards the first message to the first system. After receiving the first message and processing the first message, the first system sends the second message to the first network node. The first network node receives the second message sent by the first system based on the first message. The second message includes the identification information of the terminal device, and the identification information of the terminal device is used by the first network node to retrieve the context information of the terminal device that is stored at the first network node. Alternatively, the second message includes the context information of the terminal device. For example, the first network node is a DU, and the first system is a CU. The terminal device sends an RRC connection resume request message to the DU. The DU forwards the RRC connection resume request message to the CU via an F1 interface. After the CU receives the message, if the CU can resume an RRC connection of the terminal device, the CU sends an F1 interface control plane message to the DU, to instruct the DU to find context information of the terminal device that is stored at the DU, or to instruct the DU to re-establish context information of the terminal device. After receiving the control plane message, the DU finds the stored context information of the terminal device, or re-establishes the context information of the terminal device. The CU sends an RRC message to the terminal device (where the RRC message is sent to the DU via the F1 interface, and is forwarded by the DU to the terminal device), to indicate that establishment of the RRC connection succeeds or fails.

Figure 7:
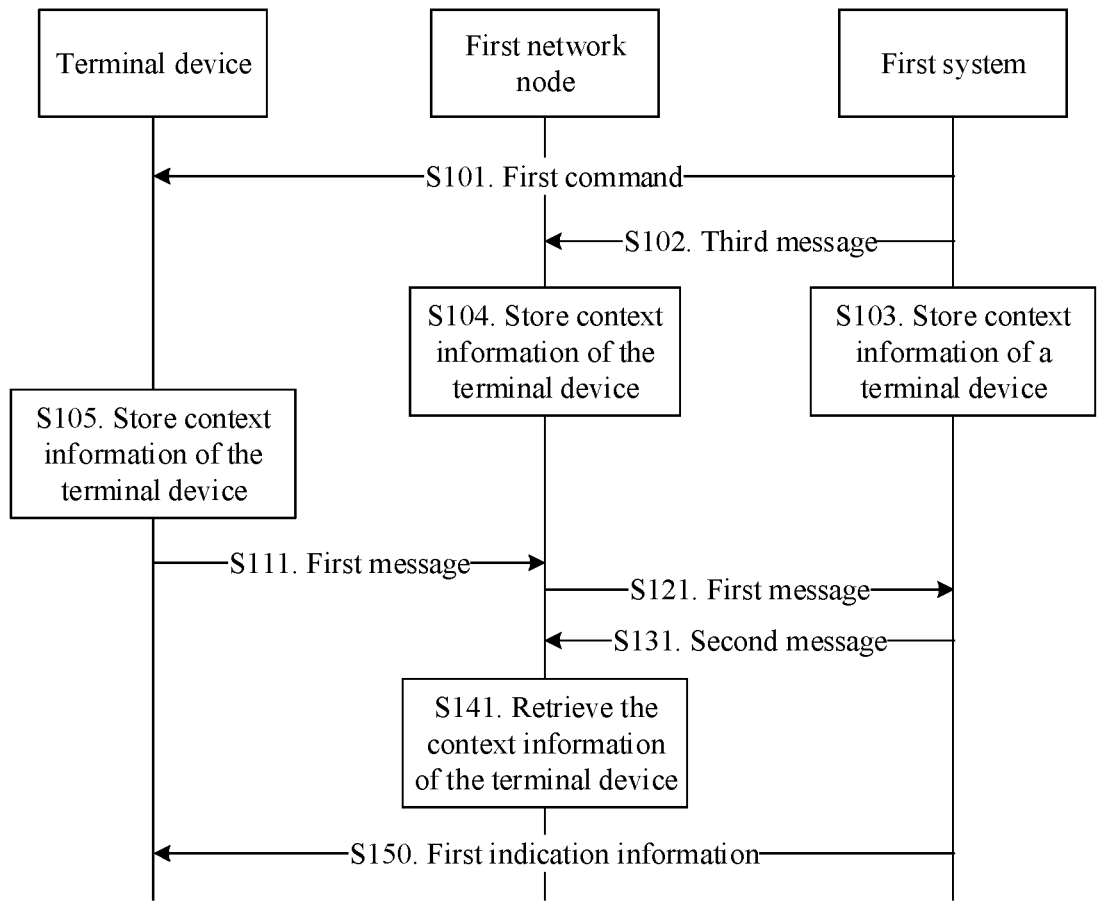
FIG. 7 is another schematic flowchart of a transmission method according to an embodiment of this application.

FIG. 7 is another schematic flowchart of a transmission method 100 according to an embodiment of this application. As shown in FIG. 7, the transmission method 100 includes the following steps.

S101. A first system sends a first command to a terminal device, where the first command is used to instruct the terminal device to enter an inactive mode.

Specifically, the first system sends the first command to a first network node. The first command is used to instruct the terminal device to enter the inactive mode. The first network node does not parse or change content of the first command, but performs corresponding processing on the first command by a protocol layer deployed on the first network node, and sends the first command to the terminal device.

For example, the first command may be an RRC message. A CU instructs, via the RRC message, the terminal device to enter the inactive mode. The RRC message carries a resume ID of the terminal device, and an inactive mode entry instruction. The first command may alternatively include an instruction about whether to suspend one or more signaling radio bearers (SRB)/data radio bearers (DRB), and/or corresponding radio bearer identification information. The RRC message is sent by the CU to a DU via an F1 interface. The DU processes the RRC message, and sends the RRC message to the terminal device.

Optionally, the message is an RRC connection release message (RRC Connection Release message), or the message is an RRC connection suspend message (RRC Connection Suspend message).

It should be noted that step S102 may alternatively be performed before step S101.

S102. The first system sends a third message to the first network node, where the third message is used by the first network node to instruct the terminal device to enter the inactive mode.

Optionally, the first system includes at least one of a Packet Data Convergence Protocol layer function, a Service Data Adaptation Protocol layer function, and a Radio Resource Control layer function.

Specifically, the terminal device accesses a cell managed by the first network node and the first system, and establishes an RRC connection. The first system determines to set the terminal device to the inactive mode (inactive mode), and sends the third message to the first network node. The third message is used by the first network node to instruct the terminal device to enter the inactive mode.

For example, the CU sends an instruction message to the DU via the F1 interface, to instruct the terminal device to enter the inactive mode. The instruction is sent via an F1 interface control plane message. The instruction message includes one of the following information or a combination of a plurality of pieces of the following information: identification information of the terminal device at the F1 interface (identification information of the terminal device of an F1AP CU side, identification information of the terminal device of an F1AP DU side, or independent identification information for the terminal device at the interface); an inactive mode entry instruction; a resume identifier resume ID (an identifier allocated for a UE when a network instructs the UE to enter the inactive mode, where the identifier is carried when the UE requests the network to resume an RRC connection, so that the network accesses a stored context); a cell radio network temporary identifier C-RNTI for the terminal device, context identification information of the terminal device (used to be correlated with a context of the terminal device that is stored at the DU; for example, the context identification information of the terminal device may be a context ID of the terminal device or an ID in another format); and an instruction about whether to suspend one or more signaling radio bearers (SRB)/data radio bearers (DRB), and/or corresponding radio bearer identification information.

Further, optionally, when the CU sends the first command to the DU via the F1 interface, the first command is used as an RRC container and, along with the third message in S102, is carried in a same F1AP message for sending.

It should be understood that for downlink data transmission of the terminal device, the first system sends, to the first network node, data that belongs to the terminal device and that comes from a core network, and the first network node is responsible for scheduling an air interface transmission resource for the terminal device, and further sends the downlink data to the terminal device; similarly, for uplink data, the terminal device first requests an uplink data transmission resource from the first network node, and further sends the uplink data to the first network node on a granted uplink resource, and then the first network node sends the uplink data to the first system.

It can be learned that the first system does not necessarily know whether uplink/downlink data transmission of the terminal device is being performed on an air interface, for example, whether a downlink data buffer of a second network node still has to-be-sent data, and whether the terminal device has to-be-sent uplink data. For example, the first system has sent, to the second network node, all data that belongs to a specific terminal device and that comes from the core network, and prepares to instruct the terminal device to enter an inactive mode. Therefore, the first system sends a first command to the terminal device, and sends a third message to the first network node. In this case, uplink data and/or downlink data are/is still being sent between the first network node and the terminal device. If the terminal device immediately enters the inactive mode after receiving the first command, the downlink data may be lost; and/or if the first network node suspends data sending/receiving of the terminal device after receiving the third message, the uplink data may be lost.

Optionally, before the first system sends the first command to the terminal device, the method 100 further includes:

determining, by the first system, that uplink or downlink data transmission on the first network node is completed.

Specifically, before sending the third message and the first command, the first system negotiates with the first network node, and sends the first command and the third message after the first network node is ready (for example, after the uplink or downlink data transmission is completed). Specifically, the first system may send a data sending status query message to the first network node, where the data sending status query message is used to query whether the first network node has completed data transmission between the first network node and the terminal device; and the first network node sends a response message to the first system, where the response message is used to indicate to the first system whether the data transmission between the first network node and the terminal device has been completed.

Optionally, the first system sends the first command to the terminal device, and the method 100 further includes:

sending, by the first system, the first command to the first network node; and when the first network node determines that uplink or downlink data transmission on the first network node is completed, sending, by the first network node, the first command to the terminal device.

Specifically, the first network node determines the content of the first command, that is, the first network node determines that the first system is to instruct the terminal device to enter the inactive mode, and therefore performs corresponding processing. After the first network node is ready (for example, after the uplink or downlink data transmission is completed), the first network node sends the first command to the terminal device, and processes context information of the terminal device based on specific content of the third message. Manners in which the first network node can learn of the content of the first command may be as follows:

(1) The first network node can read the content of the first command, for example, is capable of decoding an RRC message.

(2) An F1 interface message carrying the first command carries an indication used to indicate the content of the first command, for example, the content of the first command is instructing the terminal device to enter the inactive mode.

(3) The content of the first command is obtained through deduction based on a type of an F1AP message carrying the first command. For example, the first command and the third message are carried in a same F1AP message. It can be learned, through deduction based on content of the third message, that the content of the first command is instructing the terminal device to enter the inactive mode.

Optionally, before the first system sends the first command to the terminal device, the method 100 further includes:

determining, by the first system based on first interface information, that data transmission between the first network node and the terminal device is completed.

For example, the first system can learn, based on flow control information of an F1 user plane interface, that the data transmission between the first network node and the terminal device is completed.

Optionally, the first network node reports a data buffer status, correlated with the terminal device, of the first network node. When a downlink data buffer is 0, it indicates that downlink data transmission is completed.

Optionally, the first system configures that the first network node reports a data buffer status when the data buffer status of the first network node is 0.

Optionally, the first network node periodically notifies the first system of a data buffer status of the first network node.

Optionally, the periodic reporting is configured by the first network node.

Optionally, the first system sends the first command to the terminal device, and the method 100 further includes:

sending, by the first system, the first command and the third message to the first network node via an F1 message; and if data/signaling is being transmitted between the first network node and the terminal device in this case, sending, by the first network node to the first system, an F1 message indicating an instruction procedure failure; or if data/signaling transmission between the first network node and the terminal device is completed in this case, sending, to the first system, an F1 message indicating an instruction procedure success, and sending the first command to the terminal device. A sequence of sending, by the first network node to the first system, the F1 message indicating the instruction procedure success, and sending, by the first network node, the first command to the terminal device is not limited.

S103. The first system stores context information of the terminal device.

Specifically, the context information of the terminal device that is stored at the first system includes one of the following information or a combination of a plurality of pieces of the following information: RRC configuration information, a current security context, a PDCP status, a C-RNTI, a cell global identifier ECGI, a physical cell identifier PCI, a resume ID, connection-related information of an S1/NG interface (for example, the connection-related information of the S1/NG interface may be a UE identifier on a control plane of the interface, tunnel information TEID on a user plane of the interface, and an IP address), and connection-related information of an F1 interface (for example, the connection-related information of the F1 interface may be a UE identifier on a control plane of the interface, tunnel information TEID on a user plane of the interface, and an IP address).

S104. The first network node stores context information of the terminal device.

For example, the context information of the terminal device that is stored at the DU includes one of the following information or a combination of a plurality of pieces of the following information: RRC configuration information, a DRB parameter (for example, identification information and QoS parameter information of a DRB), a resume ID (if the CU provides the resume ID, the context information of the terminal device that is stored at the DU includes the resume ID; otherwise, the DU may correlate identification information of the terminal device at an interface to internal identification information of the terminal device of the DU), connection-related information of an F1 interface (for example, the connection-related information of the F1 interface may be a UE identifier on a control plane of the interface, tunnel information TEID on a user plane of the interface, and an IP address), and MAC configuration information (for example, logical channel identification information and scheduling priority information (such as a prioritized bit rate PBR and bucket size duration BSD)).

Optionally, the DU resets MAC configured for the terminal device.

Further, optionally, the DU re-establishes RLC corresponding to a radio bearer (Radio Bear, RB) suspended for the terminal device.

S105. The terminal device stores context information of the terminal device according to the first command.

For example, after receiving the RRC message, the terminal device stores the context information of the terminal device. The context information of the terminal device specifically includes one of the following information or a combination of a plurality of pieces of the following information: an RRC configuration, a current security context, a PDCP status, a C-RNTI, a cell identifier of an original primary serving cell and a corresponding PCI, and a resume ID.

Optionally, the terminal device resets MAC.

Further, optionally, the terminal device suspends a DRB and an SRB other than an SRB0. Alternatively, the terminal device suspends one or more SRBs/DRBs and retains remaining RBs according to an instruction in the first command. Correspondingly, the terminal device re-establishes RLC for a suspended RB.

It should be understood that steps S101 to S105 describe processing performed when the terminal device enters the inactive mode.

S111. The terminal device sends a first message to the first network node, where the first message is used to request to resume a radio resource control connection of the terminal device.

For example, the terminal device initiates an RRC connection resume procedure, and sends an RRC connection resume request message to resume the RRC connection of the terminal device. The RRC connection resume request message carries the resume ID of the terminal device.

It should be understood that if an eNB that the UE requests to resume is not an original eNB, a target base station (TeNB) may find a source base station (SeNB) based on a cell identifier (for example, a PCI included in a UE resume message, and then request, from the SeNB, a UE context corresponding to a C-RNTI or a resume ID.

S121. The first network node sends the first message to the first system.

Specifically, because the first network node does not have some RRC functions, after receiving the first message, the first network node does not parse or change content of the first message, but performs corresponding processing on the first message by a protocol layer deployed on the first network node, and sends the first message to the first system via the F1 interface.

For example, after receiving the RRC connection resume request message, the DU processes the RRC connection resume request message and sends the message to the CU via the F1 interface. For example, the message is carried in an RRC container in an F1AP message (for example, an initial UE message or an initial UL RRC message).

S131. The first system sends a second message to the first network node based on the first message, where the second message is used to instruct the first network node to retrieve the context information of the terminal device that is stored at the first network node, and the second message includes identification information of the terminal device.

For example, after receiving the first message carried in an F1 interface message, the CU parses out the content of the message, so as to determine that the first message is a message used by the terminal device to request to resume an RRC connection, and further resume the RRC connection for the terminal device. If the RRC connection of the terminal device can be successfully resumed, an F1 interface control plane message is sent to the DU, to instruct the DU to find and use the context information of the terminal device that is stored at the DU, and resume the RRC connection of the terminal device.

Optionally, the control plane message carries one of or a combination of the following information: identification information of the terminal device at the F1 interface (identification information of the terminal device on an F1AP CU side and identification information of the terminal device on an F1AP DU side, or independent identification information for the terminal device at the interface), a UE resume ID, and SRB/DRB identification information and/or corresponding configuration information.

S141. The first network node retrieves, based on the identification information of the terminal device that is carried in the second message, the context information of the terminal device that is stored at the first network node.

Specifically, after receiving the second message, the first network node retrieves the context information stored at the first network node, and resumes a corresponding configuration and a corresponding transmission resource of the terminal device.

For example, the DU finds, based on the identification information of the terminal device at the F1 interface or the resume ID of the terminal device, the context information of the terminal device that is stored at the DU, and resumes the corresponding configuration and the corresponding transmission resource of the terminal device.

Optionally, if the second message carries the SRB/DRB identification information and/or the corresponding configuration information, the first network node uses the SRB/DRB identification information and/or the corresponding configuration information that are/is carried in the second message.

Further, optionally, the first network node generates protocol stack configuration information (for example, the protocol stack configuration information may be an RLC layer configuration, a MAC layer configuration, or a PHY layer configuration) of the terminal device based on the second message, and sends the protocol stack configuration information to the first system via the F1 interface. The first system encapsulates the protocol stack configuration information into first indication information, and sends the first indication information to the terminal device.

S150. The first system sends first indication information to the terminal device, where the first indication information is used to indicate that the RRC connection of the terminal device is successfully resumed or fails to be resumed.

For example, the first indication information may be an RRC message. The CU sends the RRC message to the terminal device, to indicate that the RRC connection of the terminal device is successfully resumed or fails to be resumed. The RRC message is sent to the DU via the F1 interface. The DU processes the RRC message, and forwards the RRC message to the terminal device.

Optionally, if the first network node cannot resume the context information of the terminal device, the first network node sends a response message to the first system, to indicate to the first system that a context of the terminal device fails to be correlated. Further, optionally, the first system sends the first indication information to the UE, to indicate that the RRC connection of the terminal device is successfully resumed or fails to be resumed.

Optionally, when the first indication information indicates that the RRC connection of the terminal device is successfully resumed, the first indication information may further include one of or a combination of the following information: the SRB/DRB identification information and the corresponding configuration information, and the protocol stack configuration information.

It should be understood that S111, S121, S131, S141, and S150 describe processing performed when the terminal device resumes from the inactive mode.

Figure 8:
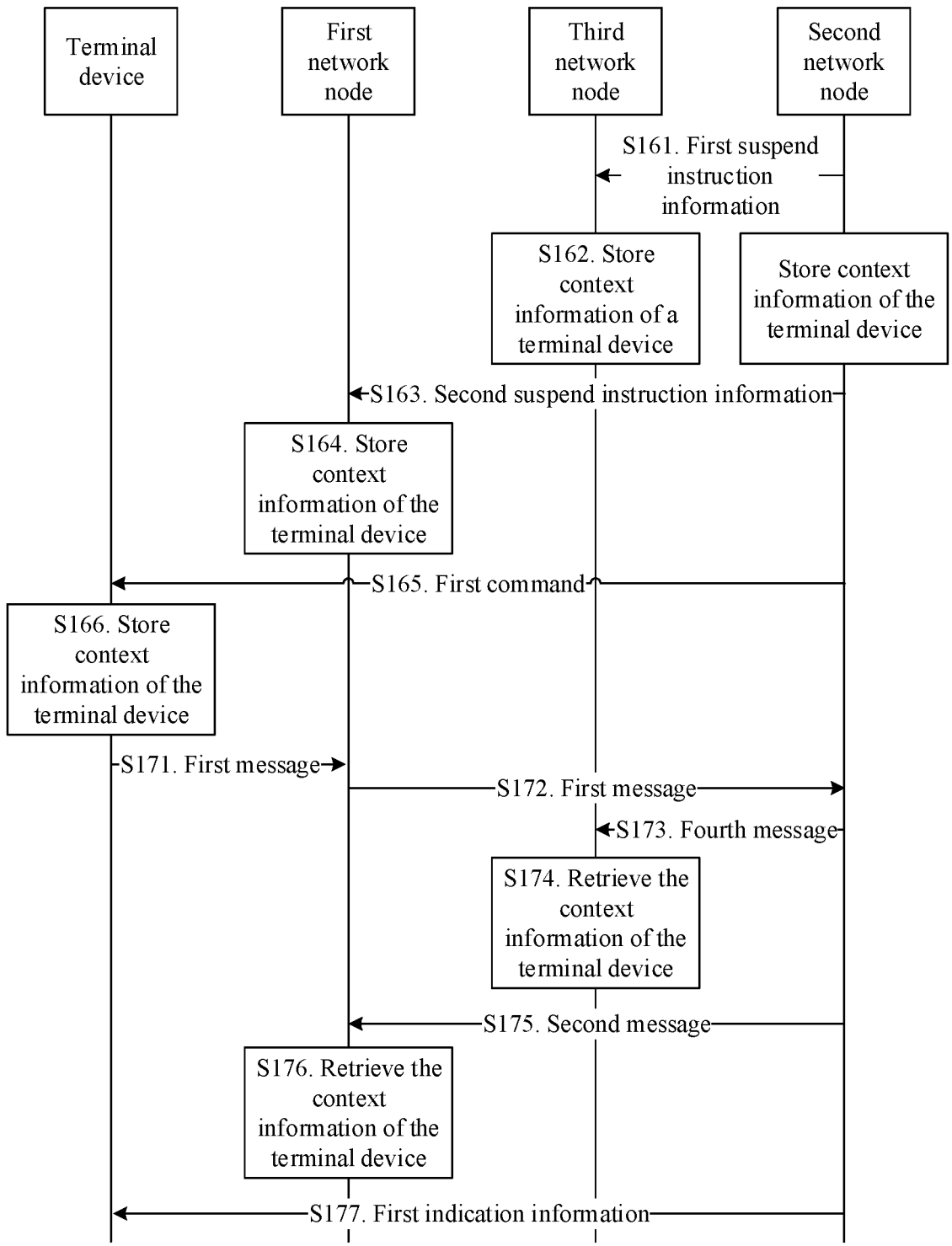
FIG. 8 is still another schematic flowchart of a transmission method according to an embodiment of this application.

FIG. 8 is another schematic flowchart of a transmission method 100 according to an embodiment of this application. As shown in FIG. 8, the transmission method 100 includes the following steps.

S161. A second network node sends first suspend instruction information to a third network node, where the first suspend instruction information is used to instruct a terminal device to enter an inactive mode.

Optionally, the second network node is a control plane node of the foregoing first system. The first system includes at least one of a Packet Data Convergence Protocol layer function, a Service Data Adaptation Protocol layer function, and a Radio Resource Control layer function.

Optionally, the second network node includes an RRC layer and a PDCP layer that is used to process an RRC message. The third network node includes an SDAP layer and a PDCP layer that is used to process user plane data.

It should be understood that the second network node and the third network node are corresponding to the control plane node and a user plane node of the first system respectively.

For example, the first system is a CU, the second network node is a CU-CP, and the third network node is a CU-UP.

Specifically, the terminal device accesses a cell managed by a first network node and the second network node, and establishes an RRC connection. The second network node determines to set the terminal device to the inactive mode (inactive mode). The second network node stores context information of the terminal device, and sends suspend instruction information to the third network node. The suspend instruction information is used by the third network node to instruct the terminal device to enter the inactive mode.

For example, the UE accesses a cell managed by CU-DU, and establishes an RRC connection. The CU determines to set the UE to the inactive mode.

The CU-CP stores an AS context of the UE. The AS context of the UE includes one or more of the following: an RRC configuration, a current security context, a PDCP status, a C-RNTI, a cell identifier of a primary serving cell and a corresponding PCI, a resume ID, connection-related information of an S1 (LTE)/NG interface (where an interface between a base station and a core network in 5G is referred to as an NG interface), connection-related information of an F1 interface, and related information of an E1 interface.

The CU-CP sends a suspend instruction to the CU-UP via the E1 interface, indicating that the UE enters the inactive mode. The instruction is sent via an E1 interface control plane message. The message includes one of the following information or a combination of a plurality of pieces of the following information: identification information of the terminal device at the E1 interface (identification information of the terminal device on an E1AP CU side and identification information of the terminal device on an E1AP DU side, or independent identification information for the terminal device at the interface), an inactive mode entry instruction or a suspend instruction, a UE ID (used to be correlated with a context of the UE that is stored at the DU, for example, the UE ID may be a context ID or a C-RNTI of the UE, or an ID in another format, such as identification information of the terminal device on an F1AP DU side and identification information of the terminal device on an F1AP CU side; alternatively, the F1 interface has only one interface UE ID) (the CU-UP should be capable of correlating a UE ID at the E1 interface to an internal UE ID, or further find a UE ID at the F1 interface based on the UE ID at the E1 interface or the internal UE ID), an instruction about whether to suspend one or more SRBs/DRBs, a resume ID, and the like.

It should be understood that the RRC configuration may be all content in an RRC connection reconfiguration message.

S162. The third network node stores context information of the terminal device.

Optionally, the third network node is the user plane node of the first system.

Optionally, the context information of the terminal device includes at least one of connection information of a second interface, connection information of a third interface, connection information of a fourth interface, a radio resource control configuration, a data radio bearer parameter, current security context information, a Packet Data Convergence Protocol status, cell identifier information, and identification information used to identify the terminal device. A first interface is used for data transmission and/or information exchange between the first network node and the first system. The second interface is used for data transmission and/or information exchange between the third network node and a core network. The third interface is used for data transmission and/or information exchange between the third network node and the second network node. The fourth interface is used for data transmission and/or information exchange between the third network node and the first network node.

Optionally, the context information of the terminal device that is stored at the third network node includes connection information of the first interface, the connection information of the second interface, the current security context information, the Packet Data Convergence Protocol status, and the identification information used to identify the terminal device.

Specifically, after the third network node receives the suspend instruction information sent by the second network node, the third network node stores, for the terminal device, the context information of the terminal device.

For example, the CU-UP stores an AS context of the UE. The AS context of the UE specifically includes: an RRC configuration, a current security context, a PDCP status, a DRB parameter (for example, identification information and QoS parameter information of a DRB, and a correspondence between a DRB and a QoS flow), S1/NG connection-related information (for example, tunnel endpoint addresses on a core network side and a CU-UP side, an interface UE ID, and a PDU session parameter), F1 connection-related information (for example, tunnel endpoint addresses on a DU side and the CU-UP side, an interface UE ID, a data flow parameter, and a DRB parameter), E1 connection-related information (for example, tunnel endpoint addresses on a CU-CP side and a CU-UP side, and an interface UE ID), a resume ID (if the CU-CP provides the resume ID, the AS context of the UE includes the resume ID; or if the CU-CP provides no resume ID, the CU-UP may identify the UE itself, that is, may correlate the UE with the AS context of the UE based on the UE ID at the E1 interface), and the like. The PDU session parameter includes QoS flow parameter information.

It should be understood that for the CU-UP, a possible case is retaining one of the following information or a combination of a plurality of pieces of the following information: connection-related information (user-plane) of the SUNG interface between the CU-UP and the core network, a resume ID (or another internal ID used to identify the UE), a current security context, and a PDCP status. A second context is released, namely, the connection-related information (user-plane) of the F1 interface, for example, related information of the fourth interface. The present invention is not limited to another case in which some information is retained and some information is released.

It should be further understood that for the CU-CP, a possible case is retaining one of the following information or a combination of a plurality of pieces of the following information: connection-related information (control-plane information) of the S1/NG interface between the CU-CP and the core network, RRC configuration information, a C-RNTI, a cell global identifier ECGI, a physical cell identifier PCI, and a resume ID.

S163. The second network node sends second suspend instruction information to a first network node, where the second suspend instruction information is used to instruct the terminal device to enter the inactive mode and/or instruct the first network node to delete a context of the terminal device.

For example, the CU-CP sends a suspend instruction to the DU via the F1 interface, indicating that the UE enters the inactive mode. The instruction is sent via an F1 interface control plane message. The message includes one of the following information or a combination of a plurality of pieces of the following information: a UE ID on an F1AP CU side and a UE ID on an F1AP DU side (or the F1 interface has only one interface UE ID), an inactive mode entry instruction, a UE ID (used to be correlated with a context of the UE that is stored at the DU, for example, the UE ID may be a context ID or a C-RNTI of the UE, or an ID in another format), and an instruction about whether to suspend one or more SRBs/DRBs. The message may further include an RRC connection suspend message (in a form of an RRC container) sent to the UE in S165.

S164. The first network node stores context information of the terminal device.

For example, the DU stores an AS context of the UE. The AS context of the UE specifically includes: an RRC configuration, a DRB parameter, F1/E1 connection-related information (for example, a tunnel endpoint address, an interface UE ID, and a DRB parameter), a resume ID, and the like. The DU resets MAC configured for the UE.

Further, optionally, the DU re-establishes RLC corresponding to an RB suspended for the UE.

S165. The second network node sends a first command to the terminal device, where the first command is used to instruct the terminal device to enter the inactive mode.

For example, the CU-CP sends an RRC message via the F1 interface, to instruct the UE to enter the inactive mode (where the RRC message may be sent together with the instruction information in S163). The RRC message carries a resume ID of the UE and an inactive mode entry instruction. The RRC message is sent by the CU-CP to the DU via the F1 interface. The DU processes the RRC message, and forwards the RRC message to the UE. For example, the message is an RRC connection suspend message (RRC Connection Suspend message).

Further, optionally, when the CU sends the RRC message to the DU via the F1 interface, the RRC message is used as an RRC container and, along with the instruction information in S163, is carried in a same F1AP message for sending.

S166. The terminal device stores context information of the terminal device according to the first command.

Optionally, before the second network node sends the first command to the terminal device, the method 100 includes:

sending, by the second network node, an inactivity timer to the third network node, where the inactivity timer is used by the third network node to determine whether the terminal device is in the inactive mode;

when the inactivity timer expires, determining, by the third network node, that no uplink data sent by the terminal device is received, and/or determining, by the third network node, that no downlink data sent by the core network is received; and sending, by the third network node, a terminal device inactive mode instruction to the second network node, where the terminal device inactive mode instruction is used by the second network node to determine whether to instruct the terminal device to enter the inactive mode.

For example, the CU-CP sends an inactive timer T to the CU-UP. The CU-CP carries, in a UE context setup request, an inactive timer corresponding to the UE; or may carry an inactive timer corresponding to a cell during cell setup, or carry an inactive timer corresponding to a gNB during E1 setup. In other words, the inactive timer may be based on a granularity of UE, or may be based on a granularity of a cell or a gNB.

When the CU-UP does not find uplink data of the UE after a time of T elapses and/or does not find downlink data of the UE after a time of T elapses, the CU-UP notifies the CU-CP that the timer expires.

For example, the CU-UP starts a timer-dl and a timer-ul for downlink data and uplink data respectively. When no data is received from the core network, the timer-dl starts to count down. Once data is received from the core network, the timer-dl is reset. A case for uplink data is similar. When no data is received from the DU, the timer-ul starts to count down. Once data is received from the DU, the timer-ul is reset. Only when both the timer-dl and the timer-ul expire, the CU-UP considers that the UE satisfies the inactive condition, and sends an instruction to the CU-CP.

If the CU-CP determines to make the UE enter the inactive mode, the CU-CP separately notifies the CU-UP and the DU. Both the CU-UP and the DU may retain or not retain a UE context. This may be stipulated in a protocol, or the CU-CP may give an instruction for retaining or not retaining the UE context.

It should be understood that the CU-CP may comprehensively consider, based on an indication from the CU-UP indicating expiry of the timer or an indication sent by the DU and indicating no available data, whether to make the UE enter the inactive mode.

It should be understood that S161 to S166 describe processing performed when the terminal device enters the inactive mode.

It should be further understood that S163 and S164 may be performed before S161 and S162. This application is not limited thereto.

S171. The terminal device sends a first message to the first network node, where the first message is used to request to resume a radio resource control connection of the terminal device.

Optionally, the sending, by the terminal device, a first message to the first network node includes:

determining, by the third network node, that downlink data sent by the core network is received;

sending, by the third network node, a notification message to the second network node, where the notification message is used by the second network node to send a paging message to the terminal device; and sending, by the terminal device, the first message to the first network node based on the paging message.

For example, when the CU-UP finds that data is received from the core network, the CU-UP notifies the CU-CP. The CU-CP initiates RAN paging in a RAN notification area to notify the UE (for example, the CU-CP sends RAN paging messages to all gNBs in the RAN notification area). The UE receives a RAN paging message, and initiates an RRC connection resume procedure.

S172. The first network node forwards the first message to the second network node.

Optionally, after the first network node forwards the first message to the second network node, the method 100 further includes:

retrieving, by the second network node, the context information of the terminal device that is stored at the second network node.

For example, after receiving the RRC connection resume message forwarded by the DU, the CU-CP first determines whether the CU-CP has a UE context. If the CU-CP has no UE context, the CU-CP finds a corresponding source gNB based on a source cell ID (which may be directly provided, or may be implied in a resume ID) provided in the RRC connection resume message, and requests a UE context from the source gNB. If the CU-CP successfully obtains the UE context, the CU-CP separately sends a message to the CU-UP and the DU.

If the UE performs access via a source DU, the CU-CP has a UE context. If both the CU-UP and the DU retain a UE context, a message sent by the CU-CP via the F1/E1 interface may be a UE context resume message, including a UE ID/resume ID used by the DU and the CU-UP to find the UE context. Otherwise, a message sent via the F1 interface may be a UE context setup message, including a UE context (an RRC configuration, such as SRB and DRB protocol stack configurations), information (for example, an IP address on a CU-CP side and a GTP-U tunnel endpoint identifier TEID) required for establishing a user plane tunnel of an F1 interface connection, and the like; and a message sent via the E1 interface may be a UE context setup message, including a UE context (an RRC configuration, such as a DRB protocol stack configuration), information (for example, an IP address on a core network side and a tunnel endpoint identifier TEID corresponding to a PDU session on the core network side) required for establishing a DRB user plane transmission channel of an S1 interface connection, information (for example, an IP address on a DU side and a tunnel endpoint identifier TEID corresponding to a DRB of the DU side) required for establishing a DRB user plane transmission channel of an F1 interface connection, and the like.

If the UE performs access via another DU but the CU-CP is the same, and the CU-UP may be the same or different, whether a message sent by the CU-CP via the E1 interface is a UE context setup message or a UE context resume message depends on whether the CU-UP has a UE context; and a message sent by the CU-CP via the F1 interface is a UE context setup message.

If the UE performs access via a DU managed by another CU, and a CU-CP originally has no UE context but has obtained a UE context from a source eNB, a corresponding CU-UP and a corresponding DU definitely have no UE context. Similarly, a message sent by the CU-CP via the F1 interface may be a UE context setup message, including a UE context (an RRC configuration, such as SRB and DRB protocol stack configurations), information (for example, an IP address on a CU-CP side and a GTP-U tunnel endpoint identifier TEID) required for establishing a user plane tunnel of an F1 interface connection, and the like; and a message sent via the E1 interface may be a UE context setup message, including a UE context (an RRC configuration, such as a DRB protocol stack configuration), information (for example, an IP address on a core network side and a tunnel endpoint identifier TEID corresponding to a PDU session on the core network side) required for establishing a PDU session user plane transmission channel of an S1 interface connection, information (for example, an IP address on a DU side and a tunnel endpoint identifier TEID corresponding to a DRB of the DU side) required for establishing a PDU session user plane transmission channel of an F1 interface connection, and the like.

S173. The second network node sends a fourth message to the third network node based on the first message, where the fourth message is used to instruct the third network node to retrieve context information of the terminal device that is stored at the third network node, and the fourth message includes identification information of the terminal device.

For example, after receiving the F1 interface message, if the CU-CP determines that the RRC connection of the UE can be successfully resumed, the CU-CP sends a resume instruction to the CU-UP via an E1 interface control plane message, to instruct the CU-UP to resume the RRC connection of the UE. The interface message carries one of or a combination of the following information: a UE ID on an E1AP CU side, a UE ID on an E1AP DU side, and a UE resume ID.

S174. The third network node retrieves, based on the identification information of the terminal device that is carried in the fourth message, the context information of the terminal device that is stored at the third network node.

For example, the CU-UP finds the AS context of the UE based on the interface UE ID or the UE resume ID, and resumes a UE configuration.

Optionally, the CU-UP returns a resume confirm message to the CU-CP.

S175. The second network node sends a second message to the first network node based on the first message, where the second message is used to instruct the first network node to retrieve context information of the terminal device that is stored at the first network node, and the second message includes the identification information of the terminal device.

For example, after receiving the F1 interface message, if the CU-CP determines that the RRC connection of the UE can be successfully resumed, the CU-CP sends a resume instruction to the DU via an F1 interface control plane message, to instruct the DU to resume the RRC connection of the UE. The interface message carries one of or a combination of the following information: a UE ID on an F1AP CU side, a UE ID on an F1AP DU side, and a UE resume ID.

S176. The first network node retrieves, based on the identification information of the terminal device that is carried in the second message, the context information of the terminal device that is stored at the first network node.

S177. The second network node sends first indication information to the terminal device, where the first indication information is used to indicate that the RRC connection of the terminal device is successfully resumed or fails to be resumed.

It should be understood that S171 to S177 describe a processing procedure performed when the terminal device resumes from the inactive mode.

It should be further understood that S175 and S176 may be performed before S173 and S174. This application is not limited thereto.

According to the transmission method in this embodiment of this application, a context of the terminal device can be effectively managed when some functions of a network device are split into different network nodes.

Figure 9:
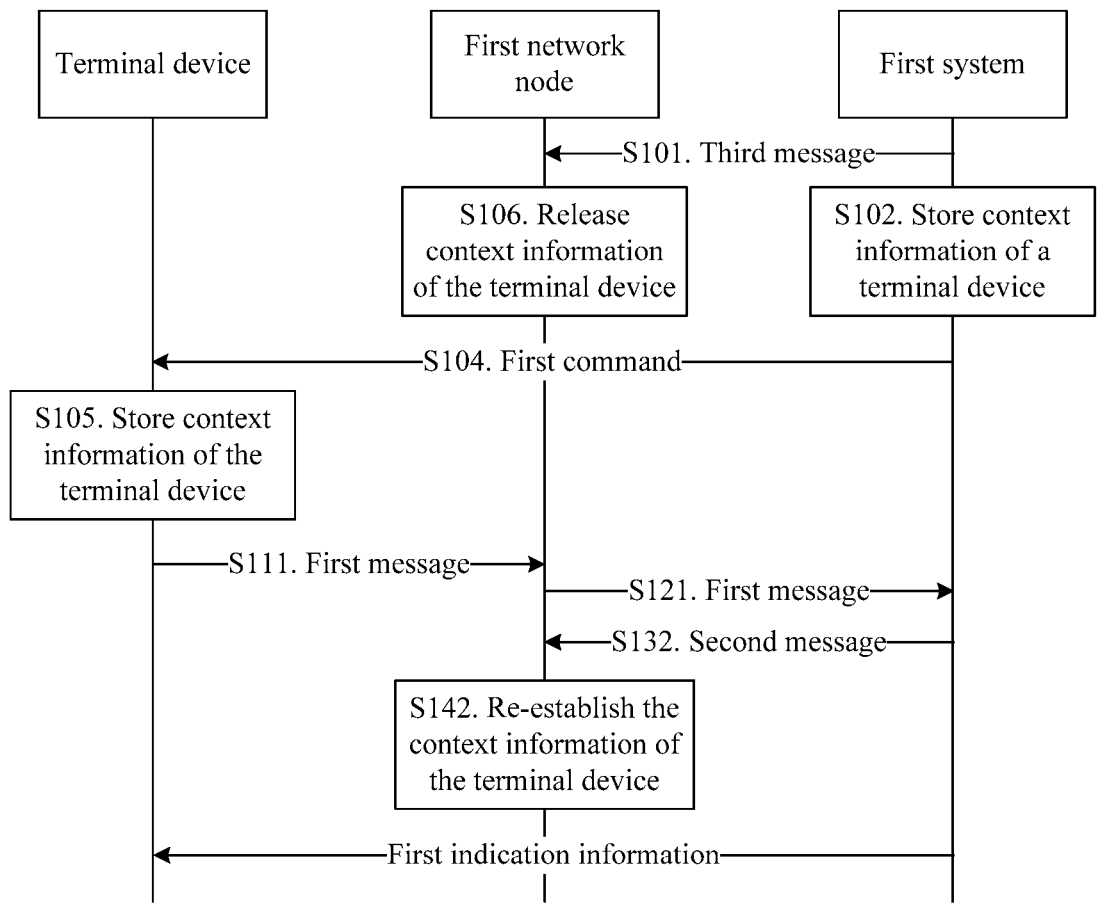
FIG. 9 is still another schematic flowchart of a transmission method according to an embodiment of this application.

FIG. 9 is another schematic flowchart of a transmission method 100 according to an embodiment of this application. A difference from the processing performed when the terminal device enters the inactive mode in FIG. 7 lies in processing performed by the first network node on the context information of the terminal device. The transmission method 100 includes the following steps.

S101. A first system sends a third message to a first network node, where the third message is used by the first network node to instruct a terminal device to enter an inactive mode and/or is used to instruct the first network node to delete a context of the terminal device.

It should be understood that a manner of processing a first command and the third message by the first network node is the same as that in FIG. 7, except that message content may be different from that in S102 in FIG. 7. For brevity, details are not described herein again.

S106. The first network node releases context information of the terminal device.

It should be understood that other processing steps performed when the terminal device enters the inactive mode are the same, except a possible difference from S104 in FIG. 7. For brevity, details are not described herein again.

It should be further understood that a difference from the processing performed when the terminal device resumes from the inactive mode in FIG. 7 lies in processing performed by the first network node on the context information of the terminal device. The transmission method 100 includes the following steps.

S132. The first system sends a second message to the first network node based on the first message, where the second message is used to instruct the first network node to re-establish the context information of the terminal device, and the second message includes identification information of the terminal device.

Optionally, the first system includes at least one of a Packet Data Convergence Protocol layer function, a Service Data Adaptation Protocol layer function, and a Radio Resource Control layer function.

For example, after receiving a first message carried in the F1 interface message, a CU parses out content of the message, so as to determine that the first message is a message used by the terminal device to request to resume an RRC connection, and further resume the RRC connection for the terminal device. If the RRC connection of the terminal device can be successfully resumed, an F1 interface control plane message is sent to a DU, to instruct the DU to resume a context configuration for the terminal device, where the context configuration includes SRB and DRB protocol stack configurations, and establish SRB and DRB control plane and user plane transmission channels of an F1 interface connection.

Optionally, the interface control plane message carries one of or a combination of the following information: identification information of the terminal device at an F1 interface (identification information of the terminal device on an F1AP CU side and identification information of the terminal device on an F1AP DU side, or independent identification information for the terminal device at the interface), identification information of the terminal device (correlated with context information of the terminal device that is stored at the DU, for example, the identification information of the terminal device may be a context ID or a C-RNTI of the terminal device or an ID in another format), a signaling radio bearer list (SRB list) and/or a data radio bearer list (DRB list) of the terminal device and corresponding protocol stack configurations, and F1 interface user plane tunnel setup information (for example, an IP address on a CU side and a GTP-U tunnel endpoint identifier TEID) corresponding to the DRB list.

S142. The first network node re-establishes the context information of the terminal device based on the identification information of the terminal device that is carried in the second message.

Specifically, after receiving the second message, the first network node establishes the context information for the terminal device, performs corresponding configuration, and allocates a transmission resource.

Optionally, the first network node generates protocol stack configuration information (for example, the protocol stack configuration information may be an RLC layer configuration, a MAC layer configuration, or a PHY layer configuration) of the terminal device based on the second message, and sends the protocol stack configuration information to the first system via the F1 interface. The first system encapsulates the protocol stack configuration information into first indication information, and sends the first indication information to the terminal device.

It should be understood that all S111, S121, and S150 are the same as steps shown in FIG. 6, except that S132 and S142 are different from the processing performed when the terminal device resumes from the inactive mode in FIG. 6. For brevity, details are not described herein again.

Figure 10:
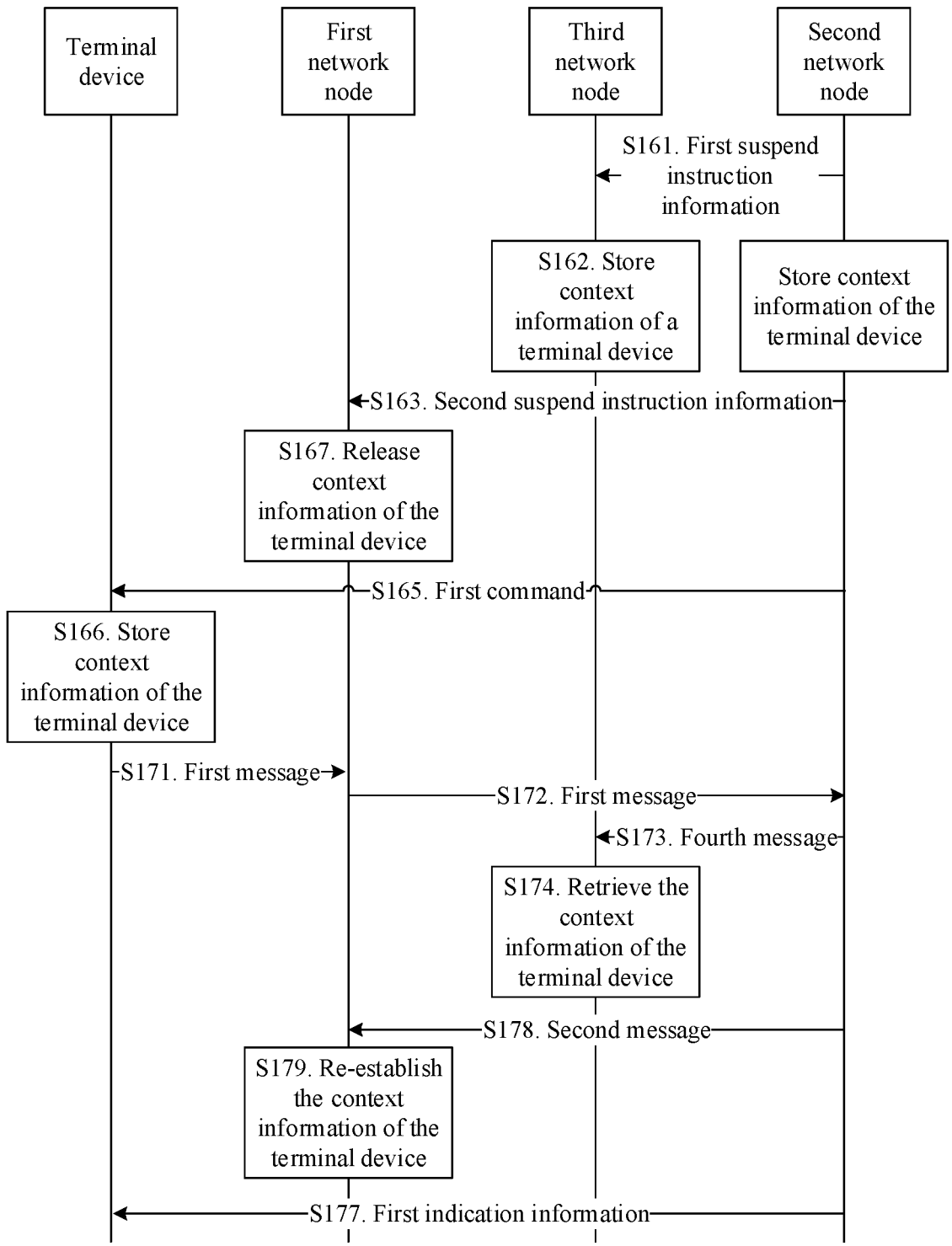
FIG. 10 is still another schematic flowchart of a transmission method according to an embodiment of this application.

FIG. 10 is another schematic flowchart of a transmission method 100 according to an embodiment of this application. As shown in FIG. 10, the transmission method 100 includes the following steps.

S167. A first network node releases context information of a terminal device.

It should be understood that processing performed when the terminal device enters an inactive mode is the same as the processing performed when the terminal device enters the inactive mode in the transmission method shown in FIG. 8, except a difference from S164. After a third network node and the first network node receive suspend instruction information sent by a second network node, the third network node stores context information of the terminal device, and the first network node releases the context information of the terminal device.

Correspondingly, a difference between a processing procedure performed when the terminal device resumes from the inactive mode and the procedure shown in FIG. 8 lies in the following:

S178. A second network node sends a second message to a first network node based on the first message, where the second message is used to instruct the first network node to re-establish the context information of the terminal device, and the second message includes at least one of a data radio bearer list, a signaling radio bearer list, a radio resource control configuration, a data radio bearer parameter, identification information of the terminal device, cell identifier information, and connection information of a first interface.

S179. The first network node re-establishes the context information of the terminal device based on at least one of the data radio bearer list, the signaling radio bearer list, the radio resource control configuration, the data radio bearer parameter, the identification information of the terminal device, the cell identifier information, and the connection information of the first interface.

For example, when receiving an RRC connection resume message from UE, a CU initiates DRB+SRB connection setup to a DU. Finally, the DU forwards, to the UE, the RRC connection resume message sent by the CU.

It should be understood that the second network node is a control plane node of a first system, the third network node is a user plane node of the first system, and the first system includes at least one of a Packet Data Convergence Protocol layer function, a Service Data Adaptation Protocol layer function, and a Radio Resource Control layer function.

For example, the first system is a CU, the second network node is a CU-CP, and the third network node is a CU-UP.

Figure 11:
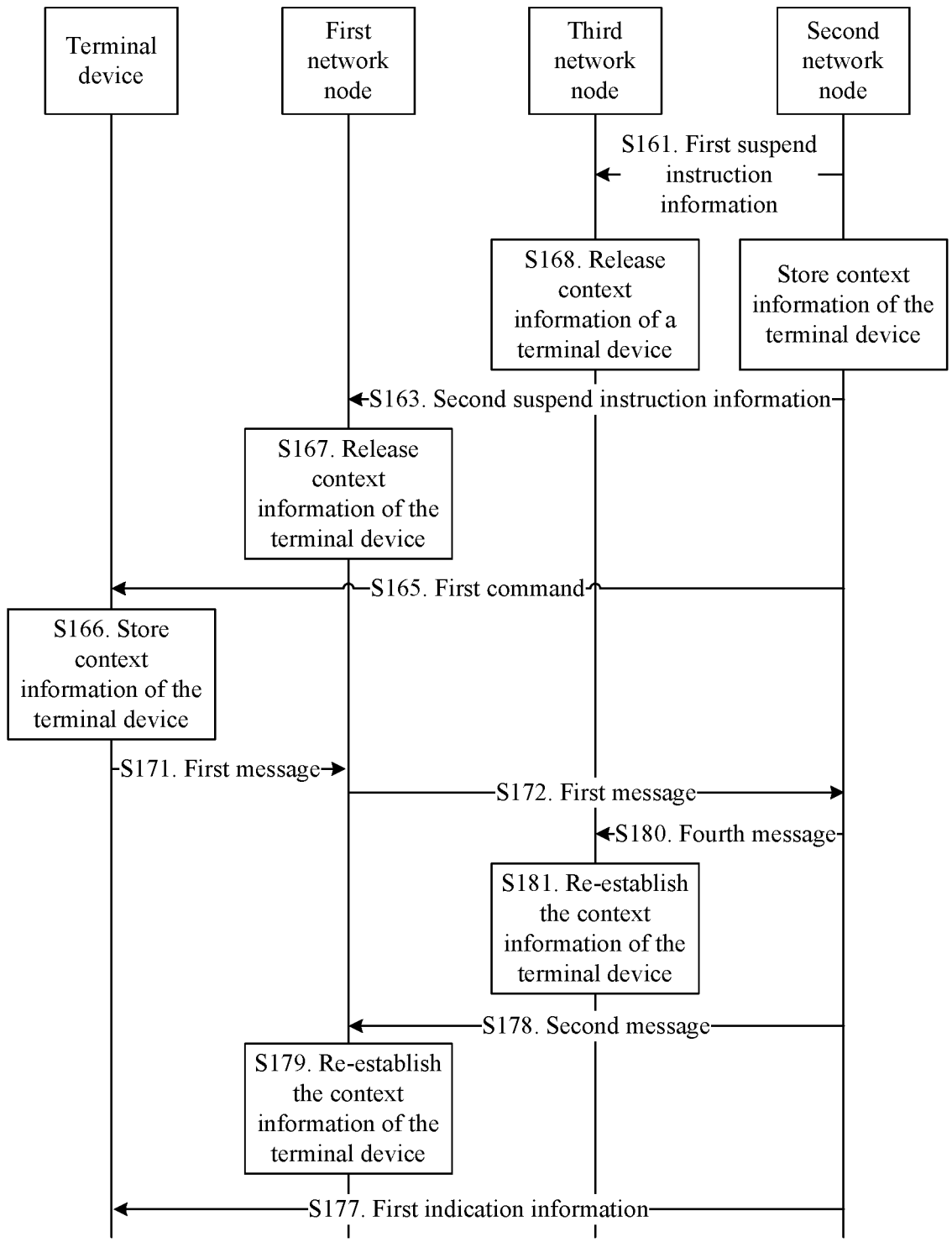
FIG. 11 is still another schematic flowchart of a transmission method according to an embodiment of this application.

FIG. 11 is another schematic flowchart of a transmission method 100 according to an embodiment of this application. As shown in FIG. 11, the transmission method 100 includes the following steps.

S168. A third network node releases a part of context information of a terminal device.

Optionally, the context information of the terminal device includes at least one of connection information of a second interface, connection information of a third interface, connection information of a fourth interface, a radio resource control configuration, a data radio bearer parameter, current security context information, a Packet Data Convergence Protocol status, cell identifier information, and identification information used to identify the terminal device. The second interface is used for data transmission and/or information exchange between the third network node and a core network. The third interface is used for data transmission and/or information exchange between the third network node and a second network node. The fourth interface is used for data transmission and/or information exchange between the third network node and a first network node.

It should be understood that connection information of a first interface includes the connection information of the fourth interface.

Optionally, the context information of the terminal device that is released by the third network node includes at least one of the Packet Data Convergence Protocol status and the connection information of the fourth interface.

It should be understood that processing performed when the terminal device enters an inactive mode is the same as the processing performed when the terminal device enters the inactive mode in the transmission method shown in FIG. 8, except a difference from S162 and S164. After the third network node and the first network node receive suspend instruction information sent by the second network node, the third network node releases a part of the context information of the terminal device, and the first network node releases context information of the terminal device.

Correspondingly, a difference between a processing procedure performed when the terminal device resumes from the inactive mode and the procedure shown in FIG. 8 lies in the following:

S180. The second network node sends a fourth message to the third network node based on the second message, where the fourth message is used to instruct the third network node to re-establish the context information of the terminal device, and the fourth message includes at least one of identification information of the terminal device, a data radio bearer list of the terminal device, a radio resource control configuration, information used to establish an F1 interface connection, and information used to establish an E1 interface connection.

S181. The third network node re-establishes the context information of the terminal device based on the identification information of the terminal device, the data radio bearer list of the terminal device, the radio resource control configuration, the information used to establish the F1 interface connection, and the information used to establish the E1 interface connection.

For example, when receiving an RRC connection resume request message from the UE, a CU-CP initiates, to a CU-UP, an F1 interface connection for the UE, initiates an E1 interface connection for the UE. For example, a message of the F1 interface connection for the UE includes a UE identifier at an F1 interface, a DRB ID, an IP address on a DU side, a tunnel endpoint identifier TEID corresponding to a DRB of the DU side, and a correspondence between a DRB and a QoS flow. For example, the E1 interface connection for the UE includes a UE identifier at an E1 interface and a resume ID. The CU-CP initiates, to a DU, DRB+SRB connection setup and an F1 interface connection for the UE.

Finally, the DU forwards, to the UE, the RRC connection resume message sent by the CU.

It should be understood that S180 and S181 may be performed before S178 and S179, or may be performed after S178 and S179. This application is not limited thereto.

It should be further understood that the second network node is a control plane node of the first system, the third network node is a user plane node of the first system, and the first system includes at least one of a Packet Data Convergence Protocol layer function, a Service Data Adaptation Protocol layer function, and a Radio Resource Control layer function. Particularly, the second network node includes at least one of a Packet Data Convergence Protocol layer function and a Radio Resource Control layer function, and the third network node includes at least one of a Packet Data Convergence Protocol layer function and a Service Data Adaptation Protocol layer function.

For example, the first system is a CU, the second network node is a CU-CP, and the third network node is a CU-UP.

Figure 12:
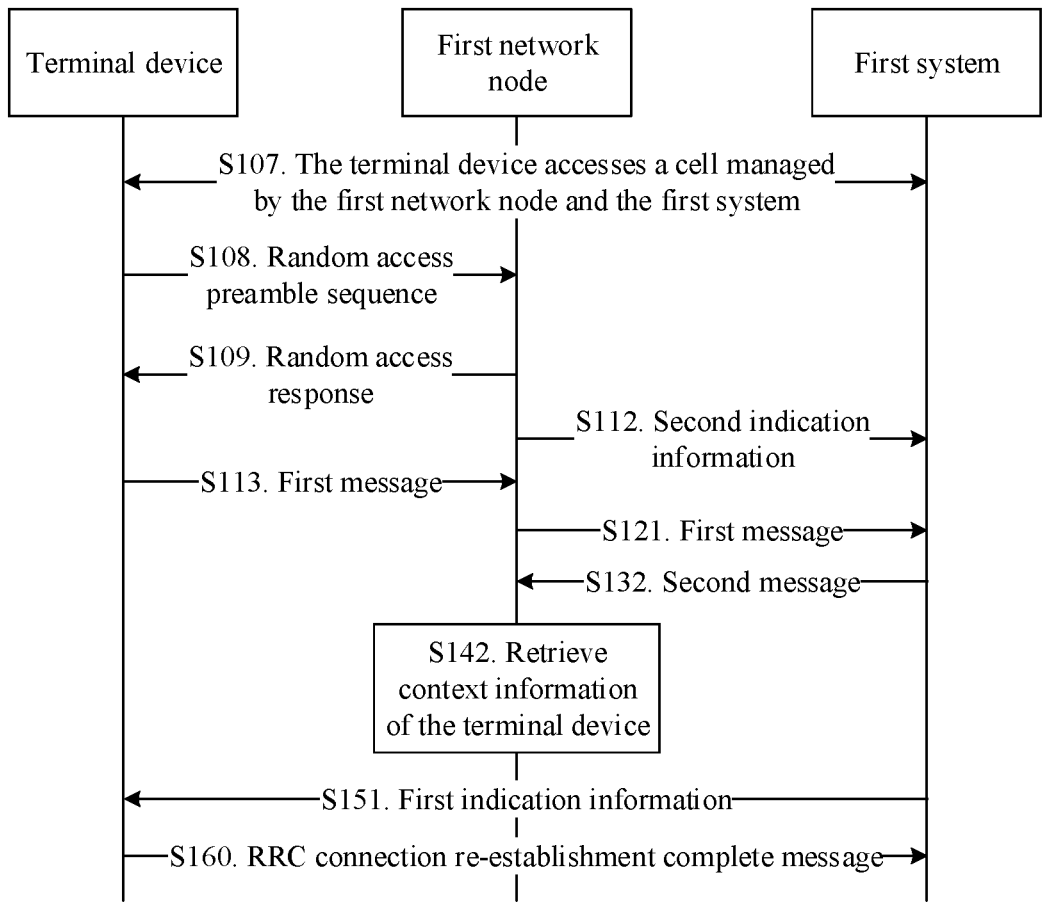
FIG. 12 is still another schematic flowchart of a transmission method according to an embodiment of this application.

FIG. 12 is another schematic flowchart of a transmission method 100 according to an embodiment of this application. A main difference between the transmission method shown in FIG. 12 and the transmission methods shown in FIG. 7 to FIG. 11 lies in: In FIG. 7 to FIG. 11, both the first network node and the first system (or the second network node) learn that the terminal device enters the inactive mode, allocate resume IDs for the terminal device, and perform matching with a context of the terminal device.

In the transmission method shown in FIG. 12, a terminal device encounters a problem such as an HO failure, an RLF, an underlying integrity check failure, or an RRC connection reconfiguration failure. As a result, during random access and RRC connection setup that are triggered by RRC connection re-establishment, a DU does not learn that the terminal device accessed a cell before, and considers the terminal device as a new terminal device. However, a CU identifies, based on a C-RNTI carried in an RRC connection re-establishment message, that the terminal device accessed the cell before and the DU has stored context information of the terminal device.

As shown in FIG. 12, the transmission method 100 includes the following steps.

S107. A terminal device accesses a cell managed by a first network node and a first system, and obtains a first cell radio network temporary identifier for the terminal device.

Specifically, the terminal device accesses the cell managed by the first network node and the first system. A C-RNTI allocated by the first network node or the first system for the terminal device is a C-RNTI1. The first network node and the first system store, for the terminal device, context information of the terminal device.

S108. The terminal device sends a random access preamble sequence to the first network node, where the random access preamble sequence is used by the terminal device to initiate random access.

S109. The first network node sends a random access response message to the terminal device, where the random access response message includes a second cell radio network temporary identifier for the terminal device.

S112. Optionally, the first network node sends second indication information to the first system, where the second indication information includes the second cell radio network temporary identifier for the terminal device.

Optionally, the second indication information includes cell identifier information, such as a PCI or an E-UTRAN cell global identifier (E-UTRAN Cell Global Identifier), of the cell accessed by the terminal device.

Optionally, the second indication information is sent via an F1 control plane message (for example, an F1AP message). The F1 control plane message includes at least one of the following information: identification information for the terminal device at an F1 interface (for example, the identification information may be identification information for the terminal device of an F1AP DU side, or independent identification information for the terminal device at the interface), the second cell radio network temporary identifier (C-RNTI2), and the cell identifier information.

S113. The terminal device sends a first message to the first network node, where the first message includes identification information of the terminal device.

Optionally, the identification information for the terminal device is at least one of first cell radio network temporary identifier information and corresponding physical cell identifier information.

For example, the first message is an RRC connection re-establishment request message. The terminal device sends the RRC connection re-establishment request message, and carries a PCI of an original base station and an original C-RNTI1 in the RRC connection re-establishment request message. A DU sends the RRC message to a CU via the F1 interface. Further, optionally, the DU encapsulates the first message into an RRC container, and adds the first message and the second indication information in S112 to a same F1AP message. For example, the F1AP message is an initial UE message used to indicate access of a new terminal device.

S121. The first network node sends the first message to the first system.

Specifically, because the first network node does not have some RRC functions, upon reception of the first message, the first network node does not parse or change content of the first message, and performs corresponding processing on the first message by a protocol layer deployed on the first network node, and sends the first message to the first system via the F1 interface.

For example, after receiving the RRC connection re-establishment request message, the DU processes the RRC connection resume request message and sends the message to the CU via the F1 interface. For example, the message is carried in an RRC container in an F1AP initial UE message S132. The first system sends a second message to the first network node based on the first message, where the second message is used to instruct the first network node to retrieve context information of the terminal device that is stored at the first network node, and the second message includes identification information of the terminal device.

For example, if the CU can re-establish an RRC connection for the terminal device, the CU sends the second message to the DU via the F1 interface, to instruct the DU to find original context information of the terminal device that is stored at the DU, and perform incremental delta configuration based on the original context information. After the delta configuration is performed, the DU has established a context for the terminal device. For example, the delta configuration includes: replacing the original C-RNTI1 with the C-RNTI2, and/or updating F1AP identification information for the terminal device.

The second message includes one of the following information or a combination of the following information: identification information of the terminal device at the F1 interface (identification information of the terminal device of an F1AP CU side and identification information of the terminal device of an F1AP DU side, or independent identification information for the terminal device at the interface), the original C-RNTI1, the new C-RNTI2, a cell identifier, and identification information for the terminal device context (used to be correlated with the context of the terminal device that is stored at the DU, and may be a context ID or an ID with another format of the terminal device).

S142. The first network node retrieves, based on the identification information of the terminal device that is carried in the second message, the context information of the terminal device that is stored at the first network node.

Specifically, upon reception of the second message, the first network node retrieves the context information stored at the first network node, and performs delta configuration based on the original context information. For example, the delta configuration specifically includes: replacing the original C-RNTI1 with the C-RNTI2, and/or updating identification information for the terminal device of F1AP.

S151. The first system sends first indication information to the terminal device, where the first indication information is used to indicate that an RRC connection of the terminal device is successfully resumed or fails to be resumed.

For example, the first indication information may be an RRC message. The RRC message is used to indicate that the RRC connection re-establishment of the terminal device succeeds or fails. The RRC message is sent by the CU to the DU via the F1 interface. The DU processes the RRC message, and sends the RRC message to the terminal device. Further, optionally, when the CU sends the RRC message to the DU via an F1 interface control plane, the RRC message and the second message in S132 may be carried in a same F1AP message for sending.

Optionally, if the RRC re-establishment succeeds, the first indication information is an RRC re-establishment message, and the F1AP message is an initial context setup message (initial context setup message) used to instruct the DU to establish a context for newly accessed UE. Otherwise, the CU sends an RRC re-establishment failure message to the terminal device.

S160. The terminal device sends an RRC connection re-establishment complete message to the first system based on the first indication information.

Specifically, if the first indication information indicates that the RRC connection re-establishment succeeds, the terminal device sends an RRC connection re-establishment complete message to the second network node. The RRC connection re-establishment complete message is sent by the first network node to the first system.

The foregoing describes in detail the transmission method 100 in the embodiments of this application with reference to FIG. 6 to FIG. 12. In the transmission method 100, because the first network node does not have some RRC functions, the first network node cannot parse a message sent by the terminal device, but can only send, via an interface, the message to the first system (or the second network node) for parsing. The following describes in detail a transmission method 200 in the embodiments of this application with reference to FIG. 13 to FIG. 19. In the transmission method 200, the first network node has some RRC functions, and can parse and/or reply to some RRC messages, for example, an RRC message on an SRB0.

Figure 13:
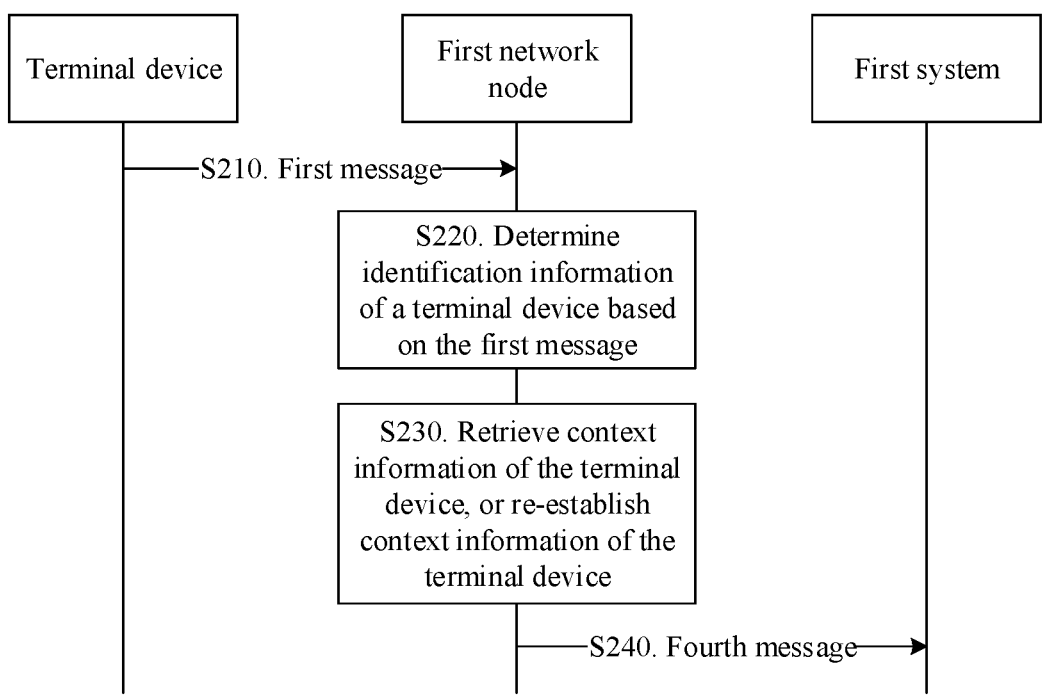
FIG. 13 is still another schematic flowchart of a transmission method according to an embodiment of this application.

FIG. 13 is a schematic flowchart of a transmission method 200 according to an embodiment of this application. As shown in FIG. 13, the transmission method 200 includes the following steps.

S210. A first network node receives a first message sent by a terminal device, where the first message is used to request to establish a radio resource control connection of the terminal device.

S220. The first network node determines identification information of the terminal device based on the first message.

S230. The first network node retrieves, based on the identification information of the terminal device, context information of the terminal device that is stored at the first network node.

Alternatively, the first network node receives, based on the identification information of the terminal device, a second message sent by a first system, where the second message includes context information of the terminal device. Optionally, the first network node sends a response message to the terminal device, to notify the terminal device of an RRC connection setup failure. Optionally, the response message includes a cause value used to indicate a cause of the RRC connection setup failure, for example, the first network node fails to retrieve a context.

Optionally, the first network node includes at least some Radio Resource Control layer functions and at least one of a Radio Link Control protocol layer function, a Media Access Control layer function, and a physical layer function.

Optionally, the first system includes at least one of a Packet Data Convergence Protocol layer function, a Service Data Adaptation Protocol layer function, and a Radio Resource Control layer function.

Optionally, that the first network node receives, based on the identification information of the terminal device, the second message sent by the first system includes:

receiving, by the first network node based on the identification information of the terminal device, the second message sent by a second network node, where the second network node is a control plane node of the first system.

It should be understood that a sequence of S230 and S240 is not limited.

Specifically, the first network node receives the first message sent by the terminal device, where the first message is used to request to establish the radio resource control connection of the terminal device; and the first network node determines the identification information of the terminal device based on the first message.

If the first network node stores context information of the terminal device, the first network node retrieves, based on the identification information of the terminal device, the context information of the terminal device that is stored at the first network node; and the first network node sends a fourth message to the first system, where the fourth message is used to instruct the first system to retrieve context information of the terminal device that is stored at the second network node.

If the first network node stores no context information of the terminal device, the first network node retrieves a fifth message sent by the first system, where the fifth message includes a signaling radio bearer list and/or a data radio bearer list of the terminal device; and the first network node re-establishes context information of the terminal device based on at least one of the identification information of the terminal device, the signaling radio bearer list of the terminal device, and the data radio bearer list of the terminal device.

According to the transmission method in this embodiment of this application, a context of the terminal device can be effectively managed when some functions of a network device are split into different network nodes.

Figure 14:
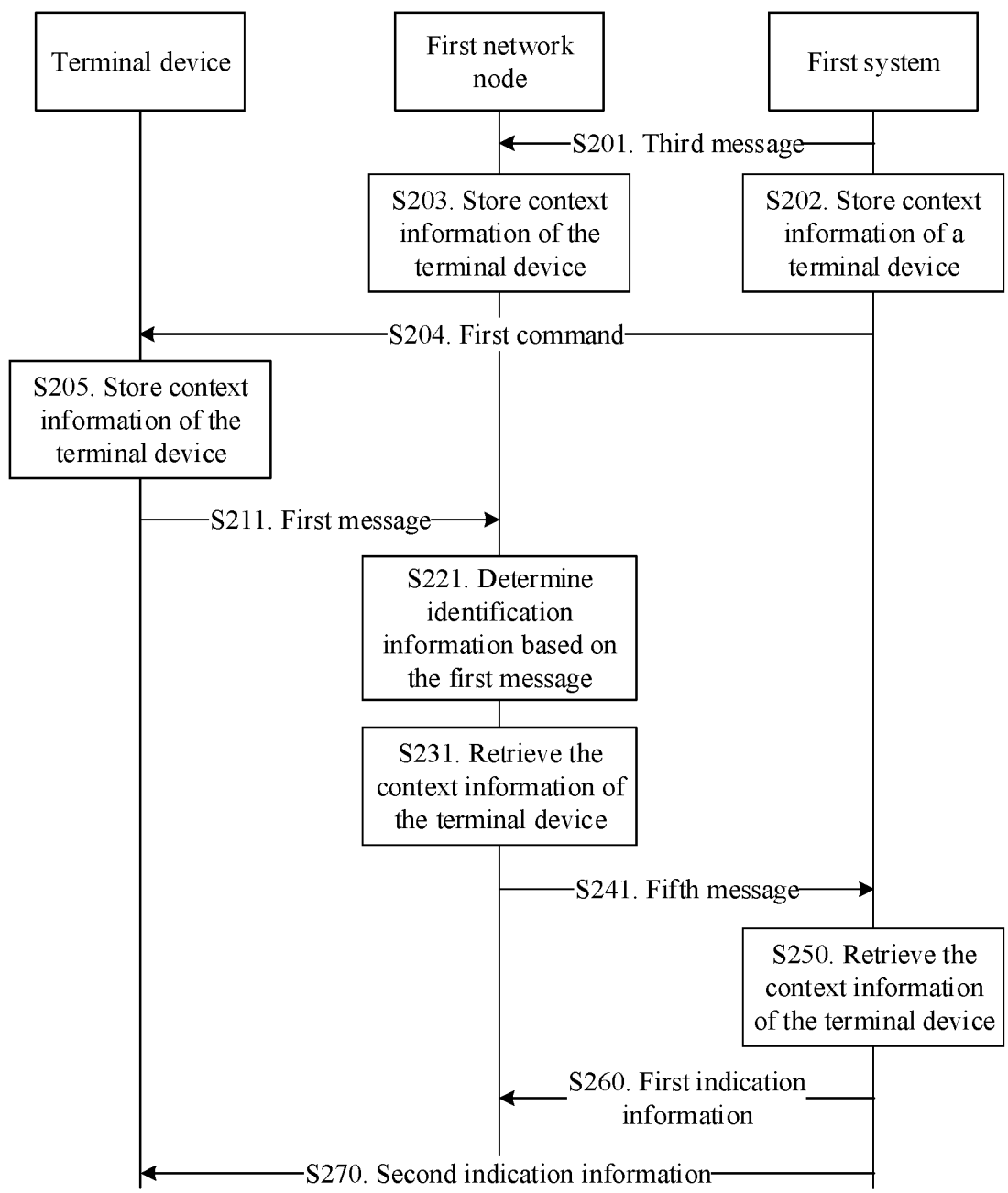
FIG. 14 is still another schematic flowchart of a transmission method according to an embodiment of this application.

FIG. 14 is another schematic flowchart of a transmission method 200 according to an embodiment of this application. As shown in FIG. 14, the transmission method 200 includes the following steps.

S201. A first network node receives a third message sent by a first system, where the third message is used by the first network node to instruct a terminal device to enter an inactive mode.

Optionally, the first system includes at least one of a Packet Data Convergence Protocol layer function, a Service Data Adaptation Protocol layer function, and a Radio Resource Control layer function.

S202. The first system stores context information of the terminal device.

S203. The first network node stores context information of the terminal device.

S204. The first system sends a first command to the terminal device, where the first command is used to instruct the terminal device to enter the inactive mode.

S205. The terminal device stores context information of the terminal device according to the first command.

It should be understood that, provided that the first network node is a DU, if the DU stores context information of the terminal device, an RRC connection resume message may be sent via a UL RRC message transfer message; or if the DU stores no context information of the terminal device, the RRC connection resume message needs to be transferred via an initial UL RRC message.

It should be understood that the foregoing steps S201 to S205 are the same as steps S101 to S105 in FIG. 7, and both describe processing performed when the terminal device enters the inactive mode. For brevity, details are not described herein again.

S211. The terminal device sends a first message to the first network node, where the first message is used to request to resume a radio resource control connection of the terminal device.

For example, the terminal device initiates an RRC connection resume procedure, and sends an RRC connection resume request message to resume the RRC connection of the terminal device. The RRC connection resume request message carries a resume ID of the terminal device.

S221. The first network node determines identification information of the terminal device based on the first message.

Specifically, because the first network node has some RRC functions, after receiving the first message, the first network node may parse the first message, and determine the identification information of the terminal device.

Optionally, the identification information is a resume ID of the terminal device.

S231. The first network node retrieves, based on the identification information of the terminal device, the context information of the terminal device that is stored at the first network node.

For example, after determining that the RRC connection resume request message carries the resume ID of the terminal device, the DU may find, based on the resume ID, the context information of the terminal device that is stored at the DU, and resume a corresponding configuration and a corresponding transmission resource of the terminal device.

S241. The first network node sends a fifth message to the first system based on the first message, where the fifth message is used to instruct the first system to retrieve the context information of the terminal device that is stored at the first system.

For example, the DU sends the fifth message to a CU via an F1 interface. After the CU receives the fifth message from the F1 interface, if the CU can find context information of the terminal device that is stored at the CU and can successfully resume the RRC connection of the terminal device based on the context information, and information carried in the fifth message, the CU resumes the corresponding configuration and the corresponding transmission resource of the terminal device.

Optionally, the fifth message may carry indication information used to indicate that the first network node has not completely retrieved a context of the terminal device. Further, optionally, the first system carries configuration information of the terminal device in first indication information based on the indication information. The configuration information is used by the first network node to re-establish a context of the terminal device.

S250. The first system retrieves, based on the fifth message, the context information of the terminal device that is stored at the first system.

S260. The first system sends first indication information to the first network node, where the first indication information is used to indicate that the RRC connection of the terminal device is successfully resumed or fails to be resumed.

Optionally, if the RRC connection of the terminal device is successfully resumed, the first indication information may further carry the configuration information of the terminal device (for example, including an SRB list and/or a DRB list of the terminal device, a corresponding protocol stack configuration, and F1 interface user plane tunnel setup information (for example, an IP address on a CU side and a GTP-U tunnel endpoint identifier TEID) corresponding to the DRB list).

Optionally, if the RRC connection of the terminal device fails to be resumed, the first indication information instructs the first network node to delete a context of the terminal device, or suspend a context of the terminal device.

S270. The first network node sends second indication information to the terminal device, to indicate that the RRC connection of the terminal device is successfully resumed or fails to be resumed.

Alternatively, the first system sends second indication information to the terminal device, to indicate that the RRC connection of the terminal device is successfully resumed or fails to be resumed.

For example, the second indication information may be an RRC message. The CU sends the RRC message to the terminal device, to indicate that the RRC connection of the terminal device is successfully resumed or fails to be resumed. The RRC message is sent to the DU via the F1 interface. The DU processes the RRC message, and forwards the RRC message to the terminal device. Alternatively, the DU generates the second indication information based on the first indication information, and sends the second indication information to the terminal device.

Figure 15:
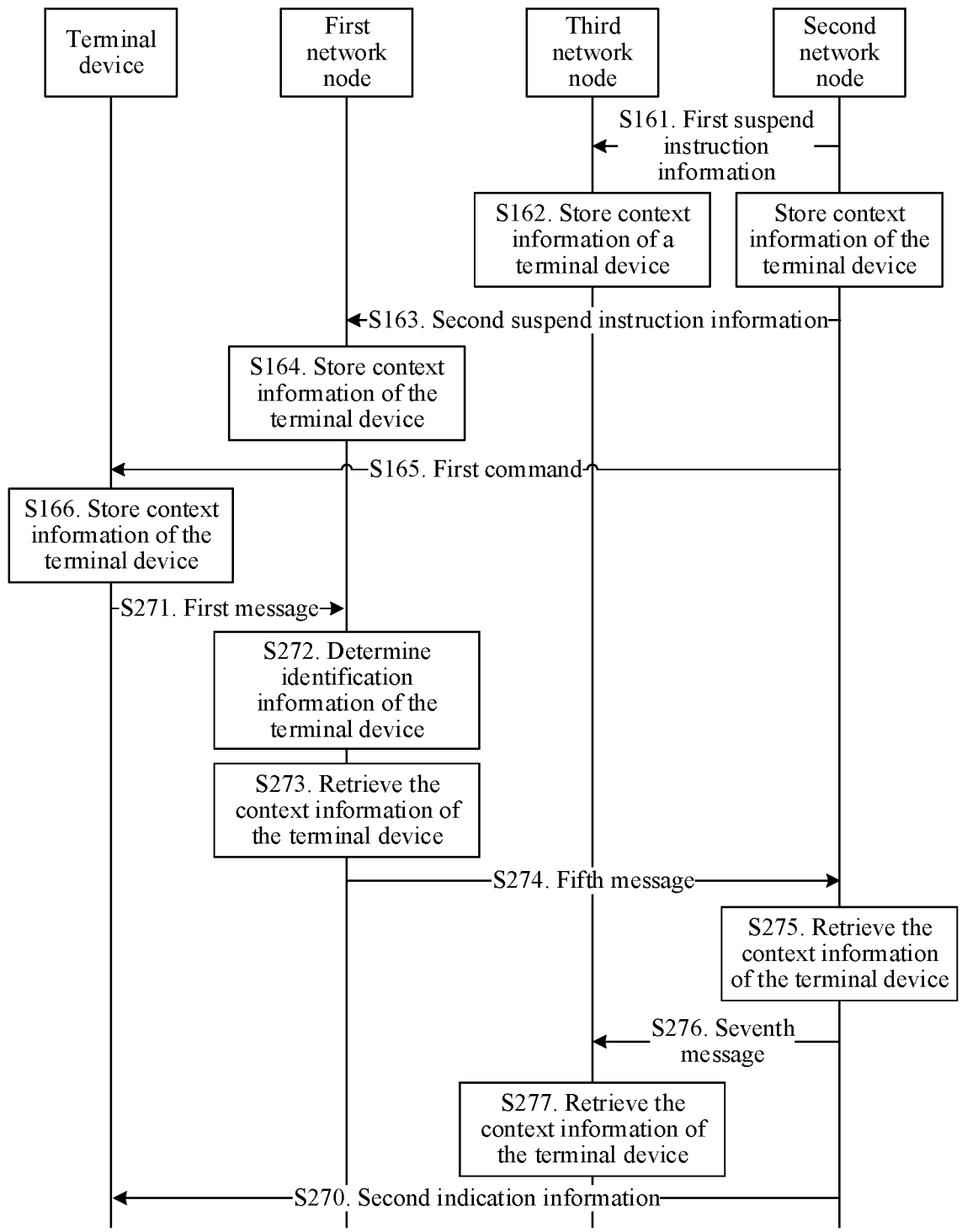
FIG. 15 is still another schematic flowchart of a transmission method according to an embodiment of this application.

FIG. 15 is another schematic flowchart of a transmission method 200 according to an embodiment of this application. As shown in FIG. 15, the transmission method 200 includes the following steps.

S271. A terminal device sends a first message to a first network node, where the first message is used to request to resume a radio resource control connection of the terminal device.

It should be understood that processing performed when the terminal device enters an inactive mode in the transmission method shown in FIG. 15 is the same as the processing performed when the terminal device enters the inactive mode in the transmission method shown in FIG. 8. For brevity, details are not described herein again.

S272. The first network node determines identification information of the terminal device based on the first message.

S273. The first network node retrieves, based on the identification information of the terminal device, context information of the terminal device that is stored at the first network node.

S274. The first network node sends a fifth message to a second network node based on the first message, where the fifth message is used to instruct the second network node to retrieve context information of the terminal device that is stored at the second network node, and the fifth message includes the identification information of the terminal device.

Optionally, the second network node is a control plane node of the first system. The first system includes at least one of a Packet Data Convergence Protocol layer function, a Service Data Adaptation Protocol layer function, and a Radio Resource Control layer function.

S275. The second network node retrieves, based on the identification information of the terminal device that is carried in the fifth message, the context information of the terminal device that is stored at the second network node.

S276. The second network node sends a seventh message to the third network node, where the seventh message is used to instruct a third network node to retrieve context information of the terminal device that is stored at the third network node, and the seventh message includes the identification information of the terminal device.

Optionally, the third network node is a user plane node of the first system.

For example, the first system is a CU, the second network node is a CU-CP, and the third network node is a CU-UP.

S277. The third network node retrieves, based on the identification information of the terminal device that is carried in the seventh message, the context information of the terminal device that is stored at the third network node.

It should be understood that the second network node sends second indication information to the terminal device. The second indication information is used to indicate that the RRC connection of the terminal device is successfully resumed or fails to be resumed.

Figure 16:
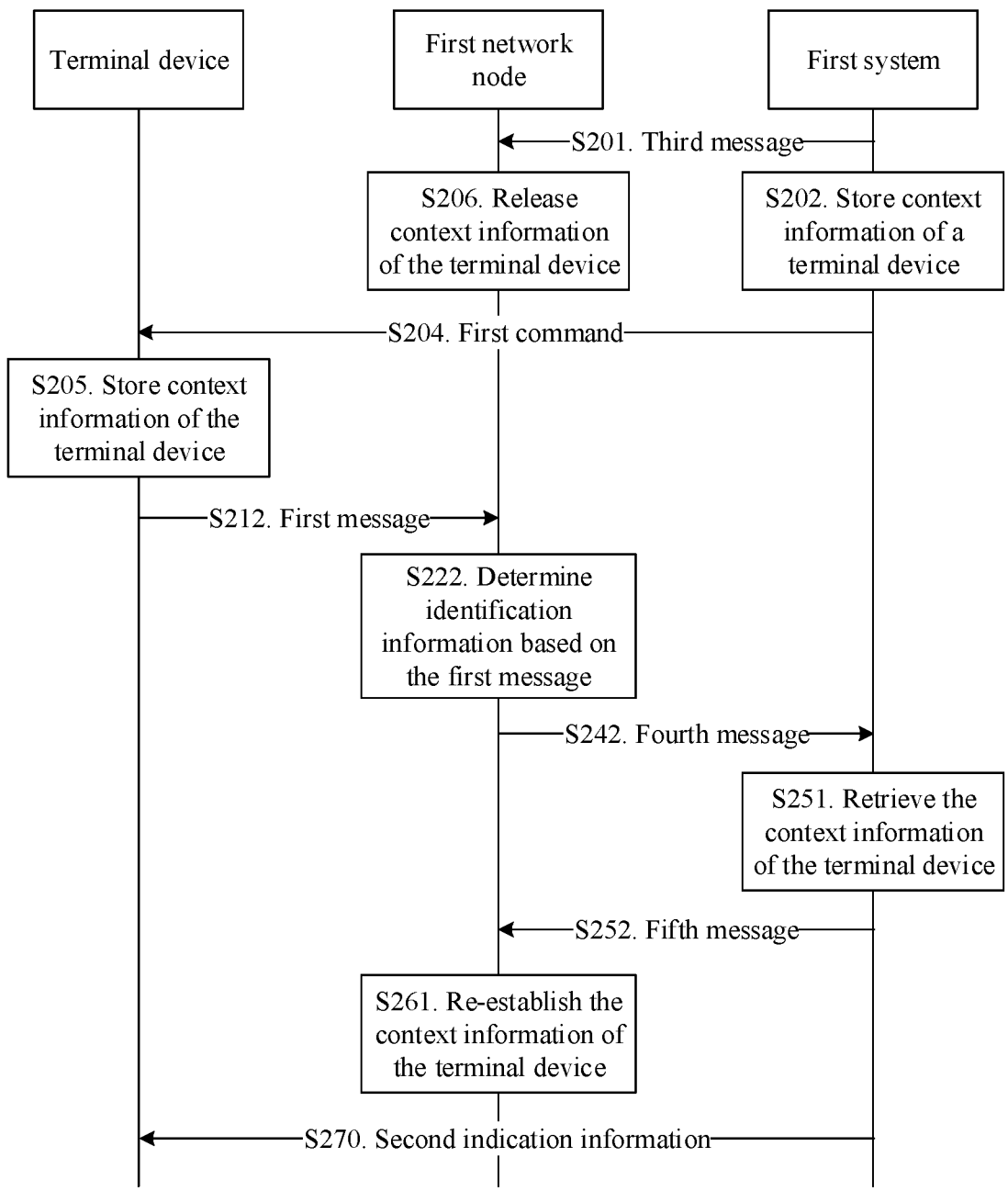
FIG. 16 is still another schematic flowchart of a transmission method according to an embodiment of this application.

FIG. 16 is another schematic flowchart of a transmission method 200 according to an embodiment of this application. As shown in FIG. 16, the transmission method 200 includes the following steps.

S206. A first network node releases context information of a terminal device.

It should be understood that other processing steps performed when the terminal device enters an inactive mode are the same, except a difference from S203 in FIG. 14. For brevity, details are not described herein again.

It should be further understood that a difference from the processing performed when the terminal device resumes from the inactive mode in FIG. 14 lies in processing performed by the first network node on the context information of the terminal device. The transmission method 200 further includes the following steps.

S212. The terminal device sends a first message to the first network node, where the first message is used to request to resume a radio resource control connection of the terminal device.

For example, the terminal device initiates an RRC connection resume procedure, and sends an RRC connection resume request message to resume the RRC connection of the terminal device. The RRC connection resume request message carries a resume ID of the terminal device.

S222. The first network node determines identification information of the terminal device based on the first message.

Specifically, because the first network node has some RRC functions, after receiving the first message, the first network node may parse the first message, and determine the identification information of the terminal device.

Optionally, the identification information is a resume ID of the terminal device.

S242. The first network node sends a fourth message to a first system, where the fourth message is used to instruct the first system to retrieve context information of the terminal device that is stored at the second network node.

Optionally, the fourth message includes the identification information of the terminal device.

Optionally, the identification information is a resume ID of the terminal device. For example, a DU sends the fourth message to a CU via an F1 interface. After the CU receives the fourth message from the F1 interface, if the CU can find context information of the terminal device that is stored at the CU and can successfully resume the RRC connection of the terminal device based on the context information, and information carried in the fourth message, the CU resumes a corresponding configuration and a corresponding transmission resource of the terminal device.

It should be understood that because the first network node releases the context information of the terminal device in S206, the first network node cannot retrieve the context information of the terminal device after S222.

S251. The first system retrieves, based on the fourth message, the context information of the terminal device that is stored at the first system, and successfully resumes or fails to resume the RRC connection of the terminal device.

S252. The first system sends a fifth message to the first network node, where the fifth message is used to indicate to the first network node that the RRC connection of the terminal device is successfully resumed. Optionally, the fifth message includes a signaling radio bearer list and/or a data radio bearer list of the terminal device.

Alternatively, the fifth message is used to indicate to the first network node that the RRC connection of the terminal device fails to be resumed. Optionally, the fifth message is used to instruct the first network node to delete or suspend context information of the terminal device.

Specifically, after finding the context information of the terminal device that is stored at the first system, the first system sends the fifth message to the first network node, where the fifth message is used to instruct the first network node to re-establish the context information of the terminal device, and the fifth message includes the signaling radio bearer list and/or the data radio bearer list of the terminal device; and after receiving the fifth message, the first network node may re-establish the context information of the terminal device based on at least one of the identification information of the terminal device, the signaling radio bearer list of the terminal device, and the data radio bearer list of the terminal device.

For example, after the CU receives the F1 interface message, if the RRC connection of the terminal device can be successfully resumed, the CU sends an F1 interface control plane message to the DU, to instruct the DU to resume a context for the terminal device, configure SRB and DRB protocol stacks, and establish control plane and user plane transmission channels of an F1 interface connection.

Optionally, the interface control plane message carries one of or a combination of the following information: identification information of the terminal device at the F1 interface (identification information of the terminal device on an F1AP CU side and identification information of the terminal device on an F1AP DU side, or independent identification information for the terminal device at the interface), a C-RNTI, context identification information of the terminal device (correlated with context information of the terminal device that is stored at the DU, for example, the context identification information of the terminal device may be a context ID of the terminal device or an ID in another format), a signaling radio bearer list (SRB list) and/or a data radio bearer list (DRB list) of the terminal device and corresponding protocol stack configurations, and F1 interface setup information (for example, an IP address on a CU side and a GTP-U TEID) corresponding to the DRB list.

S261. The first network node re-establishes the context information of the terminal device based on at least one of the identification information of the terminal device, the signaling radio bearer list of the terminal device, and the data radio bearer list of the terminal device.

S270. The first system sends second indication information to the terminal device, where the second indication information is used to indicate that the RRC connection of the terminal device is successfully resumed or fails to be resumed.

Alternatively, the first network node sends second indication information to the terminal device, where the second first indication information is used to indicate that the RRC connection of the terminal device is successfully resumed or fails to be resumed.

Figure 17:
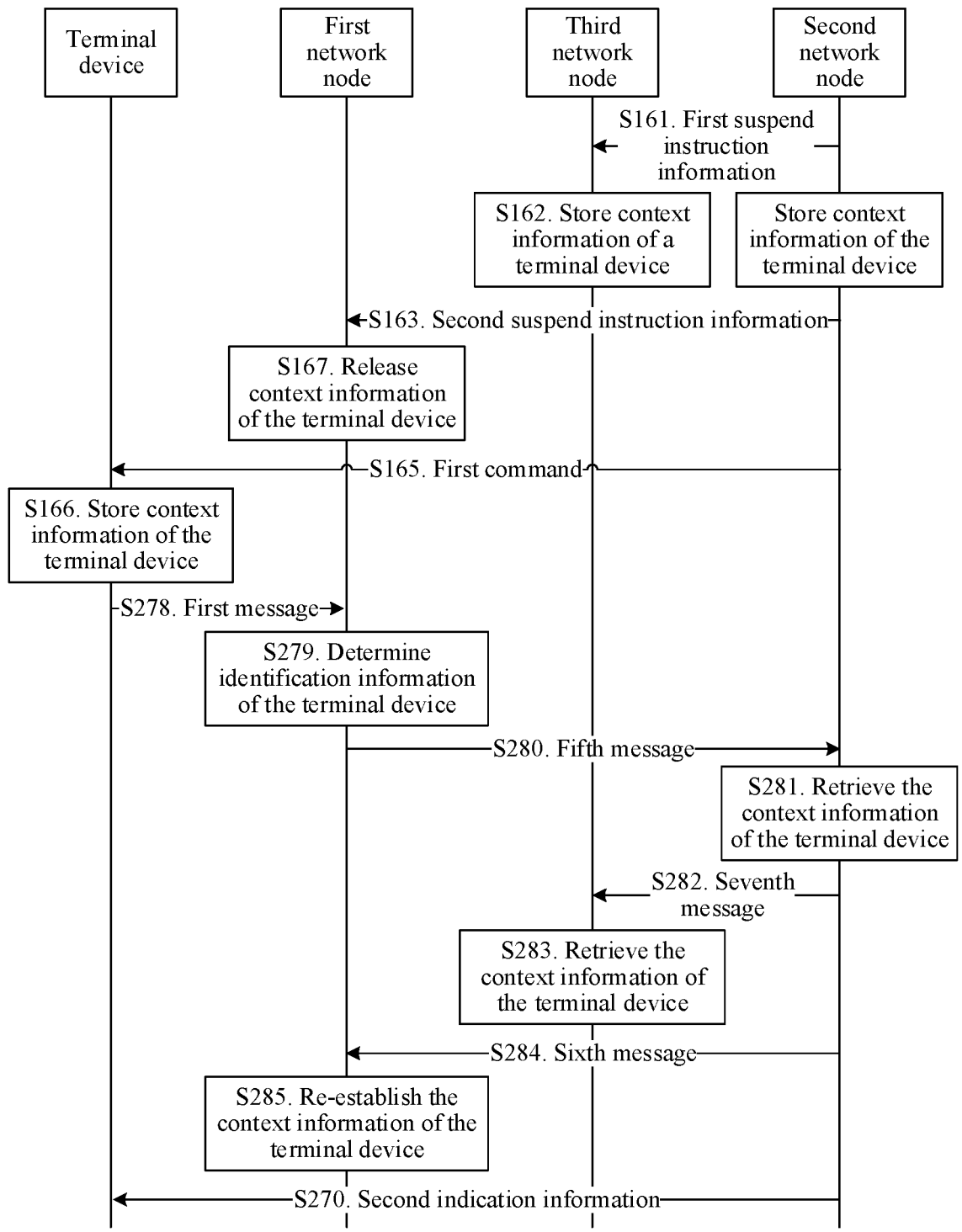
FIG. 17 is still another schematic flowchart of a transmission method according to an embodiment of this application.

FIG. 17 is another schematic flowchart of a transmission method 200 according to an embodiment of this application. As shown in FIG. 17, the method 200 includes the following steps.

S278. A terminal device sends a first message to a first network node, where the first message is used to request to resume a radio resource control connection of the terminal device.

It should be understood that processing performed when the terminal device enters an inactive mode in the transmission method shown in FIG. 17 is the same as the processing performed when the terminal device enters the inactive mode in the transmission method shown in FIG. 10. For brevity, details are not described herein again.

S279. The first network node determines identification information of the terminal device based on the first message.

S280. The first network node sends a fifth message to a second network node based on the first message, where the fifth message is used to instruct the second network node to retrieve context information of the terminal device that is stored at the second network node, and the fifth message includes the identification information of the terminal device.

Optionally, the second network node is a control plane node of a first system. The first system includes at least one of a Packet Data Convergence Protocol layer function, a Service Data Adaptation Protocol layer function, and a Radio Resource Control layer function.

S281. The second network node retrieves, based on the fifth message, the context information of the terminal device that is stored at the second network node.

S282. The second network node sends a seventh message to a third network node, where the seventh message is used to instruct the third network node to retrieve context information of the terminal device that is stored at the third network node, and the seventh message includes the identification information of the terminal device.

Optionally, the third network node is a user plane node of the first system.

For example, the first system is a CU, the second network node is a CU-CP, and the third network node is a CU-UP.

S283. The third network node retrieves, based on the identification information of the terminal device that is carried in the seventh message, the context information of the terminal device that is stored at the third network node.

S284. The second network node sends a sixth message to the first network node, where the sixth message includes the identification information of the terminal device and at least one of a signaling radio bearer list and a data radio bearer list of the terminal device, and the sixth message is used to instruct the first network node to re-establish context information of the terminal device.

S285. The first network node re-establishes the context information of the terminal device based on the identification information of the terminal device and the at least one of the signaling radio bearer list and the data radio bearer list of the terminal device that are carried in the sixth message.

It should be understood that if the second network node can resume the RRC connection of the terminal device, the second network node sends second indication information to the terminal device. The second indication information is used to indicate that the RRC connection of the terminal device is successfully resumed or fails to be resumed.

It should be further understood that S282 and S283 may be performed before S284 and S285, or may be performed after S284 and S285. This application is not limited thereto.

Figure 18:
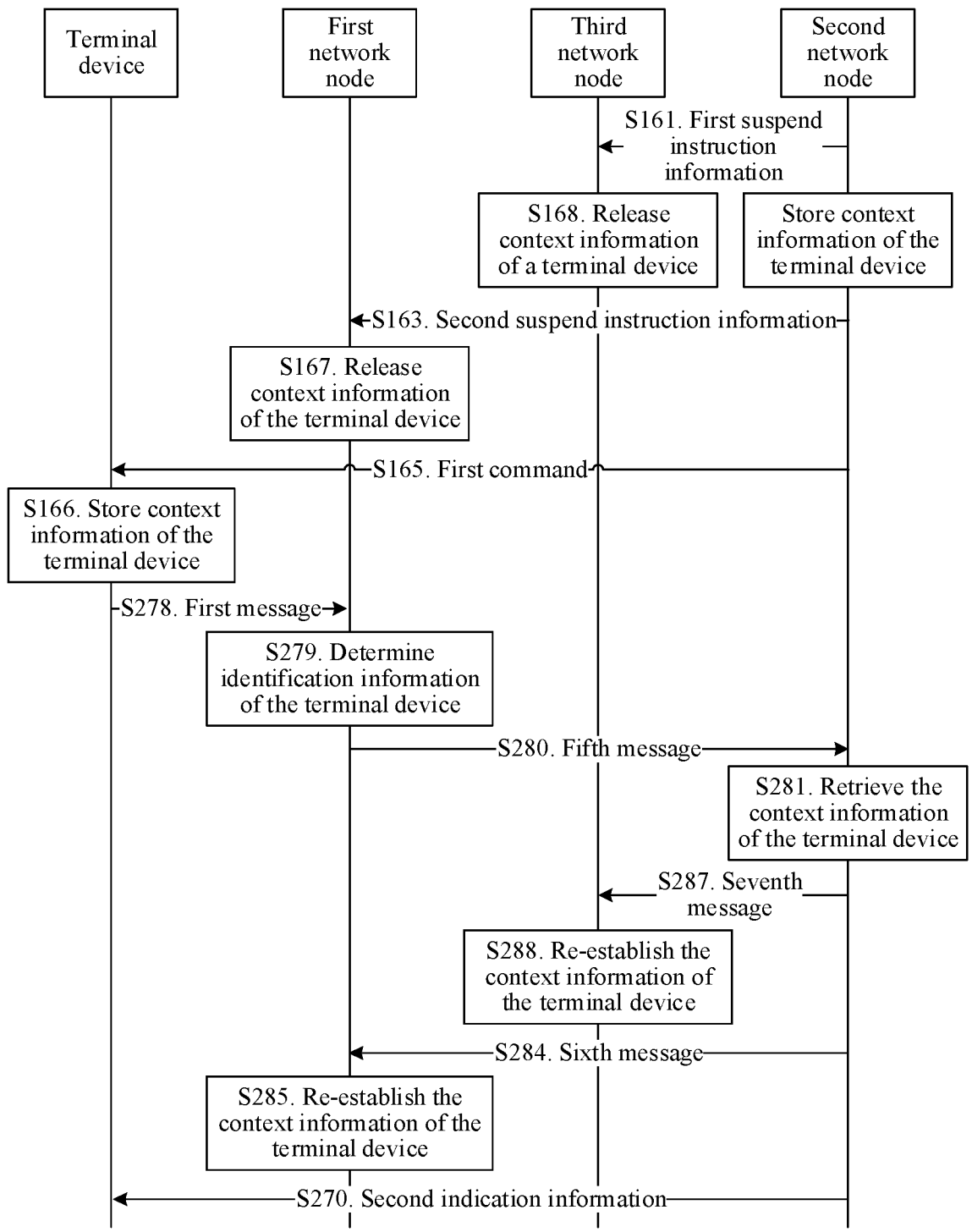
FIG. 18 is still another schematic flowchart of a transmission method according to an embodiment of this application.

FIG. 18 is another schematic flowchart of a transmission method 200 according to an embodiment of this application. As shown in FIG. 18, the method 200 includes the following steps.

S287. A second network node sends a seventh message to a third network node, where the seventh message is used to instruct the third network node to re-establish context information of a terminal device that is stored at the third network node, and the seventh message includes a data radio bearer list of the terminal device and identification information of the terminal device.

Optionally, the second network node is a control plane node of a first system, and the third network node is a user plane node of the first system.

For example, the first system is a CU, the second network node is a CU-CP, and the third network node is a CU-UP.

S288. The third network node re-establishes the context information of the terminal device based on the data radio bearer list of the terminal device and the identification information of the terminal device that are carried in the seventh message.

It should be understood that processing performed when the terminal device enters an inactive mode in the transmission method shown in FIG. 18 is the same as the processing performed when the terminal device enters the inactive mode in the transmission method shown in FIG. 11. For brevity, details are not described herein again.

It should be further understood that a processing procedure performed when the terminal device resumes from the inactive mode in the transmission method shown in FIG. 18 is the same as the processing procedure performed when the terminal device resumes from the inactive mode in the transmission method shown in FIG. 17, except a difference from S283 and S284. For brevity, details are not described herein again.

It should be further understood that if the second network node can resume an RRC connection of the terminal device, the second network node sends second indication information to the terminal device. The second indication information is used to indicate that the RRC connection of the terminal device is successfully resumed or fails to be resumed.

It should be further understood that S287 and S288 may be performed before S284 and S285, or may be performed after S284 and S285. This application is not limited thereto.

Figure 19:
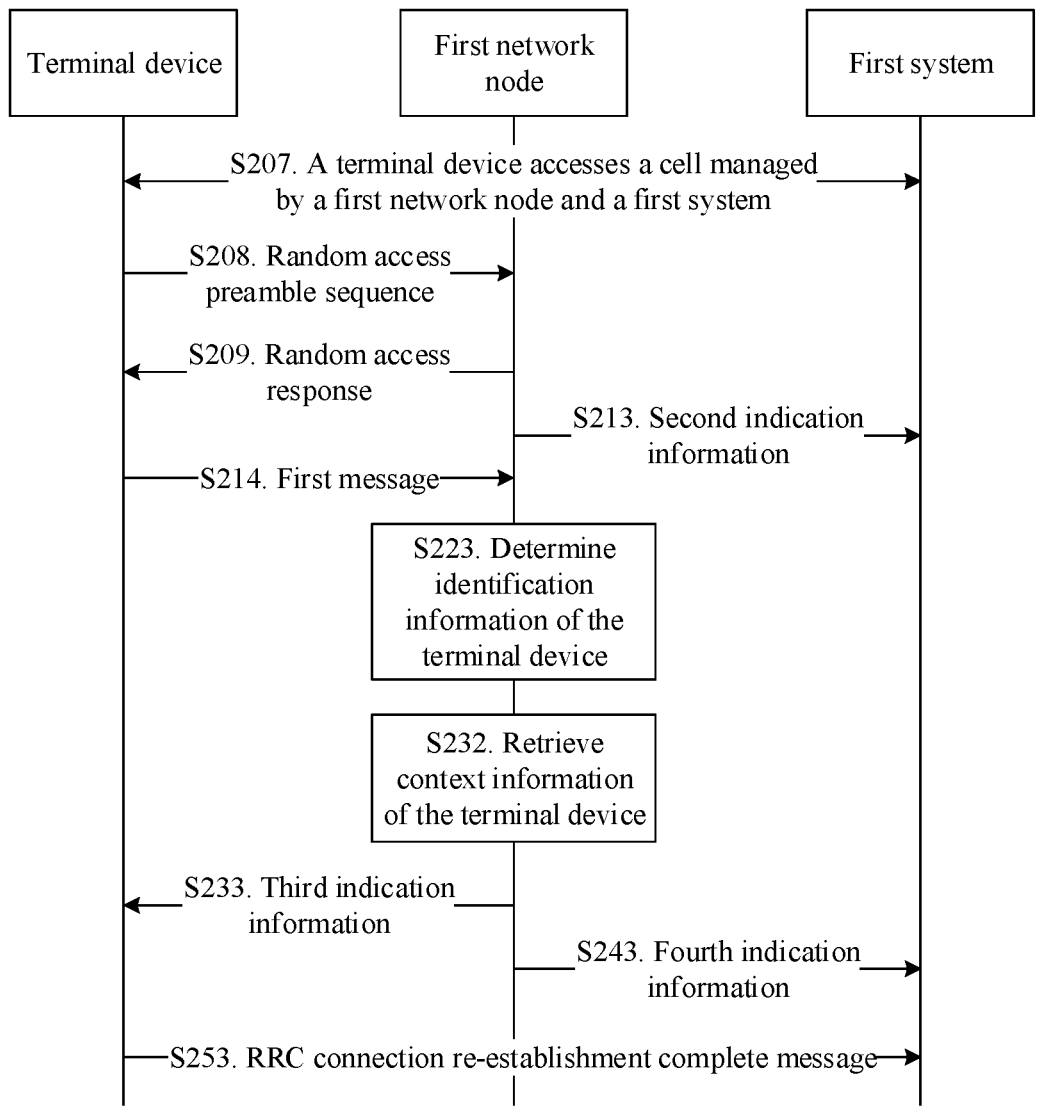
FIG. 19 is still another schematic flowchart of a transmission method according to an embodiment of this application.

FIG. 19 is another schematic flowchart of a transmission method 200 according to an embodiment of this application. It should be understood that an application scenario of the transmission method shown in FIG. 19 is the same as that of the transmission method shown in FIG. 12. A difference lies in: A first network node in FIG. 19 has some RRC functions, but the first network node in FIG. 12 has no RRC function.

As shown in FIG. 19, the transmission method 200 includes the following steps.

S207. A terminal device accesses a cell managed by the first network node and a first system, and retrieves a first cell radio network temporary identifier for the terminal device.

S208. The terminal device sends a random access preamble sequence to the first network node, where the random access preamble sequence is used by the terminal device to initiate random access.

S209. The first network node sends a random access response message to the terminal device, where the random access response message includes a second cell radio network temporary identifier for the terminal device.

S213. The first network node sends second indication information to the first system, where the second indication information includes the second cell radio network temporary identifier for the terminal device.

It should be understood that the foregoing steps are the same as S107, S108, S109, and S112 in FIG. 8. For brevity, details are not described herein again.

S214. The terminal device sends a first message to the first network node, where the first message includes identification information of the terminal device.

Optionally, the identification information of the terminal device is at least one of first cell radio network temporary identifier information and physical cell identifier information.

For example, the first message is an RRC connection re-establishment request message. The terminal device sends the RRC connection re-establishment request message, and carries a PCI of an original base station and an original C-RNTI1 in the RRC connection re-establishment request message. A DU forwards the RRC message to a CU via an F1 interface. Further, optionally, when the DU forwards the message via the F1 interface, the message and the second indication information in S112 are carried in a same F1AP message. The RRC connection re-establishment request message is an RRC container. For example, the F1AP message is an initial UE message.

S223. The first network node determines the identification information of the terminal device based on the first message.

Specifically, because the first network node has some RRC functions, after receiving the first message, the first network node may parse the first message, and determine the identification information of the terminal device.

Optionally, the first message is an RRC connection re-establishment request message.

Optionally, the identification information is at least one of cell radio network temporary identification information of the terminal device and physical cell identifier information.

S232. The first network node retrieves, based on the identification information of the terminal device, context information of the terminal device that is stored at the first network node.

For example, after determining that the RRC connection re-establishment request message carries the PCI and/or the C-RNTI1 of the terminal device, the DU may find, based on the PCI and/or the C-RNTI1 of the terminal device, context information of the terminal device that is stored at the DU, and resume a corresponding configuration and a corresponding transmission resource of the terminal device.

S233. The first network node sends third indication information to the terminal device, where the third indication information is used to indicate that RRC connection re-establishment succeeds or fails.

For example, after the DU receives the RRC message, if the DU can re-establish an RRC connection for the terminal device, the DU sends an RRC message to the terminal device, to indicate that the RRC connection of the terminal device is successfully re-established. Otherwise, the DU sends an RRC re-establishment failure message to the terminal device.

S243. The first network node sends fourth indication information to the first system based on the first message, where the fourth indication information is used to indicate that a cell radio network temporary identifier for the terminal device changes.

For example, the DU sends configuration information to the CU via the F1 interface, to indicate that the C-RNTI of the terminal device changes. The configuration information includes one of the following information or a combination of a plurality of pieces of the following information: identification information of the terminal device at the F1 interface (identification information of the terminal device on an F1AP CU side and identification information of the terminal device on an F1AP DU side, or independent identification information for the terminal device at the interface), the original C-RNTI1, a new C-RNTI2, a cell identifier, and context identification information of the terminal device (used to be correlated with a context of the terminal device that is stored at the DU, where the context identification information of the terminal device may be a context ID of the terminal device or an ID in another format).

Optionally, the first system generates a corresponding RRC configuration and/or RB configuration for the terminal device based on the fourth indication information, and sends the corresponding RRC configuration and/or RB configuration to the first network node. The first network node generates third indication information. In this case, S233 is performed after S243.

S253. The terminal device sends an RRC connection re-establishment complete message to the first system based on the third indication information.

Specifically, if the third indication information indicates that the RRC connection re-establishment succeeds, the terminal device sends the RRC connection re-establishment complete message to the first system. The RRC connection re-establishment complete message is sent by the first network node to the first system.

Optionally, the first network node includes at least one of a Radio Link Control protocol layer function, a Media Access Control layer function, a physical layer function, and a Radio Resource Control layer function.

Optionally, the first system includes at least one of a Packet Data Convergence Protocol layer function, a Service Data Adaptation Protocol layer function, and a Radio Resource Control layer function.

Figure 20:
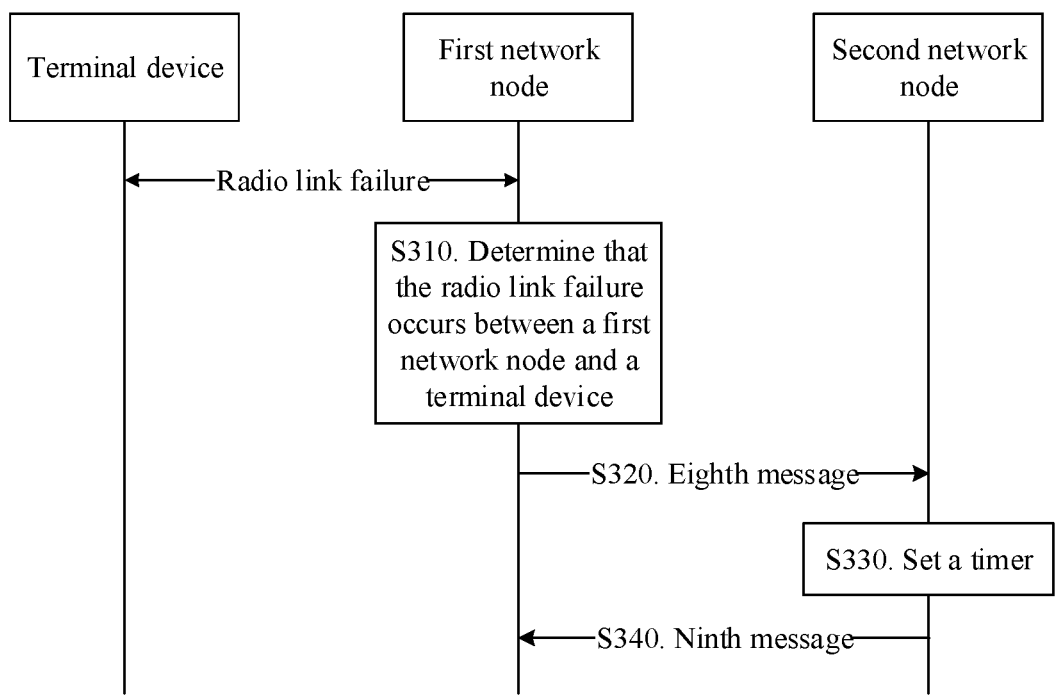
FIG. 20 is still another schematic flowchart of a transmission method according to an embodiment of this application.

FIG. 20 is a schematic flowchart of a transmission method 300 according to an embodiment of this application. As shown in FIG. 20, the method 300 includes the following steps.

S310. A first network node determines that a radio link failure occurs between the first network node and a terminal device.

Optionally, the first network node includes at least one of a Radio Link Control protocol layer function, a Media Access Control layer function, and a physical layer function.

For example, a DU finds that an RLF occurs on a link between the DU and the terminal device. A cause may be a physical layer cause (for example, a quantity of times of out-of-sync in a specific time period exceeds a threshold), an excessive quantity of times of retransmission at an RLC layer, or the like.

S320. The first network node sends an eighth message to a second network node, where the eighth message is used to indicate to the second network node that the radio link failure occurs between the first network node and the terminal device.

Optionally, the second network node includes at least one of a Packet Data Convergence Protocol layer function, a Service Data Adaptation Protocol layer function, and a Radio Resource Control function.

Optionally, the eighth message includes at least one of identification information of the terminal device, radio link failure indication information, and a cell radio network temporary identifier.

For example, the DU sends a notification message to a CU via an F1 interface, to notify the CU that the terminal device encounters the RLF. The message includes one of the following information or a combination of a plurality of pieces of the following information: identification information of the terminal device at the F1 interface (identification information of the terminal device on an F1AP CU side and identification information of the terminal device on an F1AP DU side, or independent identification information for the terminal device at the interface), a C-RNTI, context identification information of the terminal device (used to be correlated with a context of the terminal device that is stored at the DU, where the context identification information of the terminal device may be a context ID of the terminal device or an ID in another format), an RLF indication, and an RLF cause (for example, a physical layer cause or an RLC layer cause).

S330. The second network node sets a timer based on the eighth message.

S340. If the timer expires, the second network node sends a ninth message to the first network node, where the ninth message is used to instruct the first network node to release a context of the terminal device.

For example, if the timer expires, the CU instructs, via the F1 interface, the DU to release context information of the terminal device and release an F1 interface connection.

Further, optionally, the CU releases an NG interface.

It should be understood that if the second network node receives a radio resource control connection message before the timer expires, the second network node stops the timer.

Figure 21:
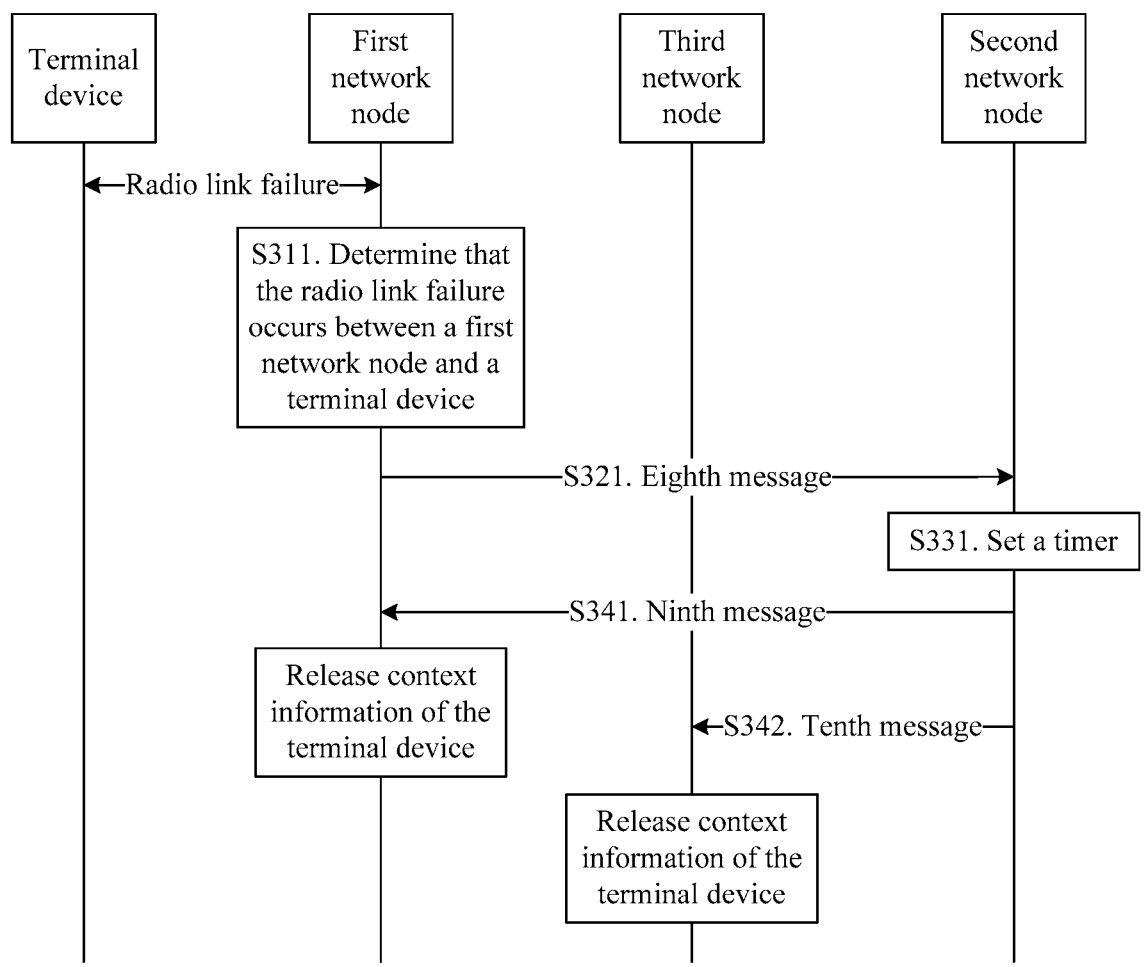
FIG. 21 is still another schematic flowchart of a transmission method according to an embodiment of this application.

FIG. 21 is another schematic flowchart of a transmission method 300 according to an embodiment of this application. As shown in FIG. 21, the method 300 includes the following steps.

S311. A first network node determines that a radio link failure occurs between the first network node and a terminal device.

Optionally, the first network node includes at least one of a Radio Link Control protocol layer function, a Media Access Control layer function, and a physical layer function.

S321. The first network node sends an eighth message to a second network node, where the eighth message is used to indicate to the second network node that the radio link failure occurs between the first network node and the terminal device.

Optionally, the second network node is a control plane node of a first system. The first system includes at least one of a Packet Data Convergence Protocol layer function, a Service Data Adaptation Protocol layer function, and a Radio Resource Control layer function. Optionally, the eighth message includes at least one of identification information of the terminal device, radio link failure indication information, and a cell radio network temporary identifier.

For example, a DU sends a notification message to a CU-CP via an F1 interface, to notify the CU-CP that the UE encounters an RLF. The message includes one of the following information or a combination of a plurality of pieces of the following information: an F1 interface UE ID (a UE ID on an F1AP DU side and a UE ID on an F1AP CU side, or an interface UE ID), a C-RNTI, a UE ID (used to be correlated with a context of the UE that is stored at the DU, where the UE ID may be a context ID of the UE or an ID in another format), an RLF indication, and an RLF cause (a physical layer cause or an RLC layer cause).

S331. The second network node sets a timer based on the eighth message.

S341. If the timer expires, the second network node sends a ninth message to the first network node, where the ninth message is used to instruct the first network node to release context information of the terminal device.

S342. If the timer expires, the second network node sends a tenth message to a third network node, where the tenth message is used to instruct the third network node to release context information of the terminal device.

Optionally, the third network node is a user plane node of the first system.

For example, if the timer expires, the CU-CP instructs, via the F1 interface, the DU to release a UE context and release an F1 connection. The CU-CP instructs, via an E1 interface, a CU-UP to release a UE context and release an Ng-U interface connection, an F1 interface connection, and an E1 interface connection.

Further, optionally, the CU releases an NG interface.

It should be understood that there is no sequence between S341 and S342.

It should be further understood that if the second network node receives a radio resource control connection message before the timer expires, the second network node stops the timer.

According to the transmission method in this embodiment of this application, a context of the terminal device can be effectively managed when some functions of a network device are split into different network nodes.

Figure 22:
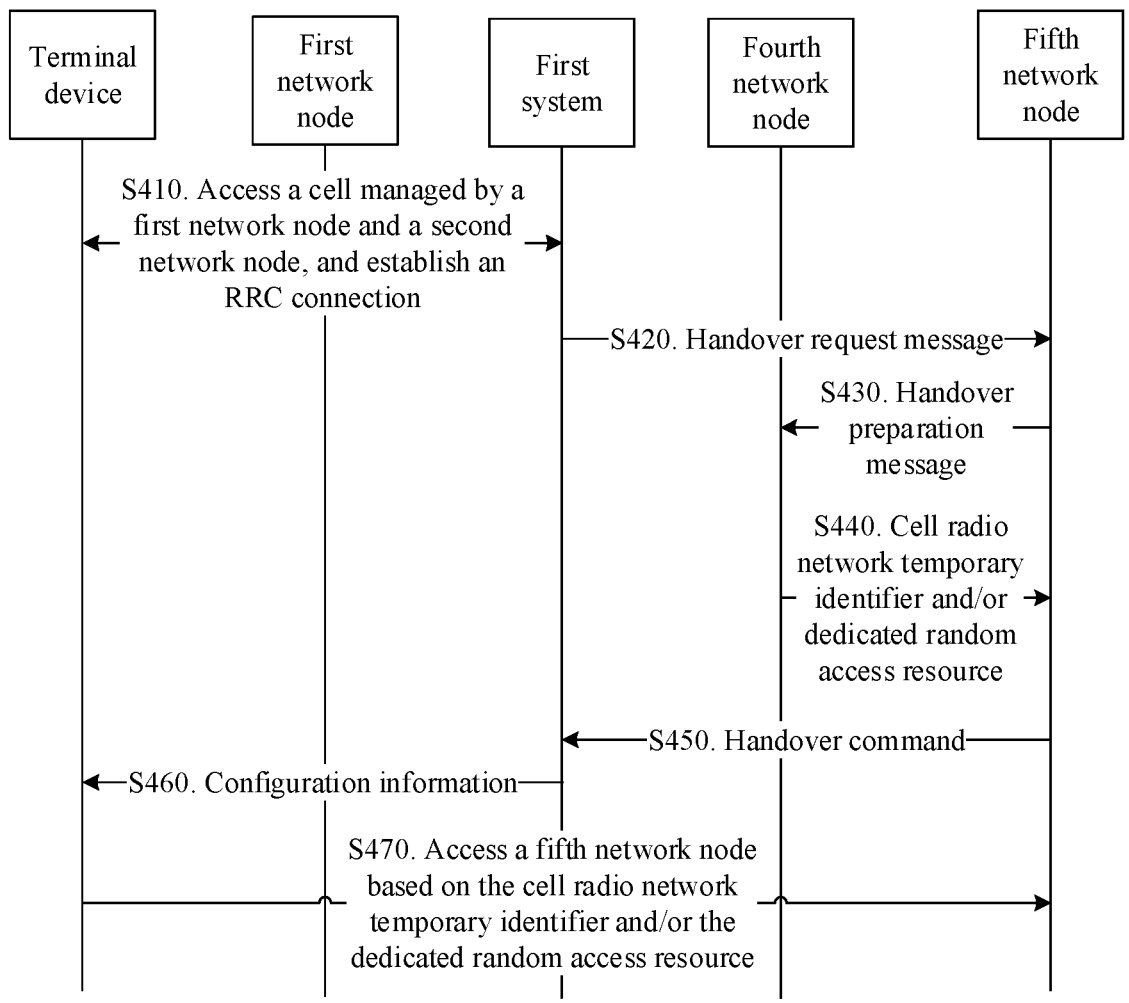
FIG. 22 is still another schematic flowchart of a transmission method according to an embodiment of this application.

FIG. 22 is a schematic flowchart of a transmission method 400 according to an embodiment of this application. As shown in FIG. 22, the transmission method 400 includes the following steps.

S410. A terminal device accesses a cell managed by a first network node and a first system, and establishes an RRC connection.

Optionally, the first network node includes at least one of a Radio Link Control protocol layer function, a Media Access Control layer function, and a physical layer function.

Optionally, the first system includes at least one of a Packet Data Convergence Protocol layer function, a Service Data Adaptation Protocol layer function, and a Radio Resource Control function.

It should be understood that the first network node and the first system are different network nodes obtained by splitting some functions of a network device. The network device includes the first network node and the first system.

It should be further understood that the first network node may be a source DU, and the first system may be a source CU. The transmission method in FIG. 22 is used to hand over the terminal device from the source DU managed by the source CU to a target DU managed by a target CU.

For example, the terminal device accesses a cell managed by CU-DU, and establishes an RRC connection. A C-RNTI of the terminal device is a C-RNTI1. Both the CU and the DU store context information of the terminal device.

S420. The first system determines to hand over the terminal device to a fifth network node, and sends a handover request message to the fifth network node.

For example, the source CU determines to hand over the terminal device to the target CU, and sends a handover request message to the target CU via an inter-base station interface or an interface between a base station and a core network entity, namely, a RAN-CN interface.

S430. The fifth network node sends a handover preparation message to a fourth network node, where the handover preparation message is used to request the fourth network node to perform configuration for the terminal device.

It should be understood that the fourth network node may be the target DU, and the fifth network node may be the target CU.

Optionally, the fourth network node includes at least one of a Radio Link Control protocol layer function, a Media Access Control layer function, and a physical layer function.

Optionally, the fifth network node includes at least one of a Packet Data Convergence Protocol layer function, a Service Data Adaptation Protocol layer function, and a Radio Resource Control layer function.

For example, after the target CU performs admission control, if access to the terminal device is allowed, the target CU sends the handover preparation message to the target DU, to request the target DU to perform configuration for the terminal device. The message includes one of the following information or a combination of a plurality of pieces of the following information: identification information of the terminal device at an F1 interface (identification information of the terminal device on an F1AP CU side and identification information of the terminal device on an F1AP DU side, or independent identification information for the terminal device at the interface), context identification information of the terminal device (correlated with context information of the terminal device that is stored at the DU, for example, the context identification information of the terminal device may be a context ID of the terminal device or an ID in another format), an SRB list and/or a DRB list of the terminal device, F1 interface setup information (for example, a tunnel address on a CU side and a GTP-U TEID) corresponding to a DRB, and a cell ID (for example, a PCI or an ECGI).

S440. The fourth network node sends a cell radio network temporary identifier and/or a dedicated random access resource to the fifth network node based on the handover preparation message.

For example, after receiving the message, the DU allocates a C-RNTI2 and/or a dedicated RACH resource for the terminal device, and sends the C-RNTI2 and/or the dedicated RACH resource to the CU via the F1 interface. For example, information related to the RACH resource specifically includes beam identification information beam ID and a physical resource indication.

S450. The fifth network node sends a handover command to the first system, where the handover command includes the cell radio network temporary identifier and/or the dedicated random access resource.

For example, the target CU sends the handover command to the source CU via forwarding by the inter-base station interface or the RAN-CN interface. The handover command carries the configuration that is made by the target CU for the terminal device. The configuration includes the C-RNTI2 and the dedicated RACH resource.

S460. The first system sends configuration information to the terminal device, where the configuration information includes the cell radio network temporary identifier and/or the dedicated random access resource.

S470. The terminal device accesses the fifth network node by using the cell radio network temporary identifier and/or the dedicated random access resource.

According to the transmission method in this embodiment of this application, a context of the terminal device can be effectively managed when some functions of a network device are split into different network nodes.

The foregoing describes in detail the transmission methods in the embodiments of this application with reference to FIG. 6 to FIG. 22. The following describes in detail network devices in the embodiments of this application with reference to FIG. 23 to FIG. 36.

Figure 23:
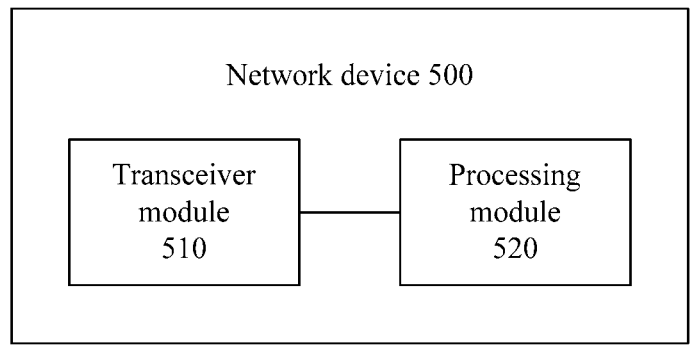
FIG. 23 is a schematic block diagram of a network device according to an embodiment of this application.

FIG. 23 is a schematic block diagram of a network device 500 according to an embodiment of this application. As shown in FIG. 23, the network device 500 includes:

a transceiver module 510, configured to receive a first message sent by a terminal device, where the first message is used to request to establish a radio resource control connection of the terminal device; and a processing module 520, configured to control the transceiver module to send the first message to a first system, where the transceiver module is further configured to receive a second message sent by the first system based on the first message; the second message includes identification information of the terminal device, and the identification information of the terminal device is used by a first network node to retrieve context information of the terminal device that is stored at the first network node; or the second message includes context information of the terminal device, and the context information of the terminal device is access stratum context information.

Optionally, the transceiver module 510 is further configured to receive a third message sent by the first system; and the first network node stores the context information of the terminal device or releases the context information of the terminal device based on the third message.

Optionally, the transceiver module 510 is further configured to receive an instruction message sent by the first system, where the instruction message is used by the first network node to instruct the terminal device to enter an inactive mode; and the first network node sends the instruction message to the terminal device.

Optionally, the transceiver module 510 is specifically configured to send the first message to a second network node, and receive the second message sent by the second network node based on the first message, where the second network node is a control plane node of the first system.

Optionally, the identification information of the terminal device is at least one of resume identification information of the terminal device, identification information of the terminal device at a first interface, cell radio network temporary identifier information, and physical cell identifier information. The first interface is used for data transmission and information exchange between the first network node and the first system.

Optionally, the context information of the terminal device includes at least one of a radio resource control configuration, a data radio bearer parameter, the identification information of the terminal device, cell identifier information, and connection information of a first interface. The first interface is used for data transmission and information exchange between the first network node and the first system.

Optionally, the first network node includes at least one of a Radio Link Control protocol layer function, a Media Access Control layer function, and a physical layer function; and/or
the first system includes at least one of a Packet Data Convergence Protocol layer function, a Service Data Adaptation Protocol layer function, and a Radio Resource Control function.

According to the network device in this embodiment of this application, a context of the terminal device can be effectively managed when some functions of a network device are split into different network nodes.

Figure 24:
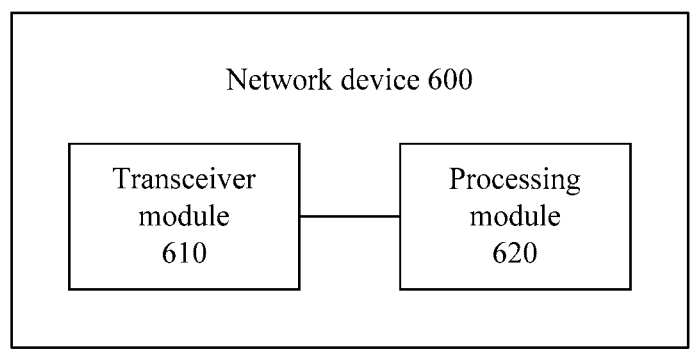
FIG. 24 is another schematic block diagram of a network device according to an embodiment of this application.

FIG. 24 is a schematic block diagram of a network device 600 according to an embodiment of this application. As shown in FIG. 24, the network device 600 includes:
a transceiver module 610, configured to receive a first message from a terminal device, where the first message is used to request to establish a radio resource control connection of the terminal device; and
a processing module 620, configured to send a second message to a first network node based on the first message, where the second message includes identification information of the terminal device, and the identification information of the terminal device is used by the first network node to retrieve context information of the terminal device that is stored at the first network node, or the second message includes context information of the terminal device, and the context information of the terminal device is access stratum context information.

Optionally, the transceiver module 610 is a transceiver module of a second network node, the processing module 620 is a processing module of the second network node, and the second network node is a control plane node of a first system.

Optionally, the transceiver module 610 is further configured to send a fourth message to a third network node, where the fourth message includes the identification information of the terminal device, and the identification information of the terminal device is used by the third network node to retrieve context information of the terminal device that is stored at the third network node, or the fourth message includes context information of the terminal device, and the third network node is a user plane node of the first system.

Optionally, the transceiver module 610 is further configured to send an instruction message to the first network node, where the instruction message is used by the first network node to instruct the terminal device to enter an inactive mode; and the first network node sends the instruction message to the terminal device.

Optionally, the first network node includes at least one of a Radio Link Control protocol layer function, a Media Access Control layer function, and a physical layer function; and/or
the first system includes at least one of a Packet Data Convergence Protocol layer function, a Service Data Adaptation Protocol layer function, and a Radio Resource Control function.

According to the network device in this embodiment of this application, a context of the terminal device can be effectively managed when some functions of a network device are split into different network nodes.

Figure 25:
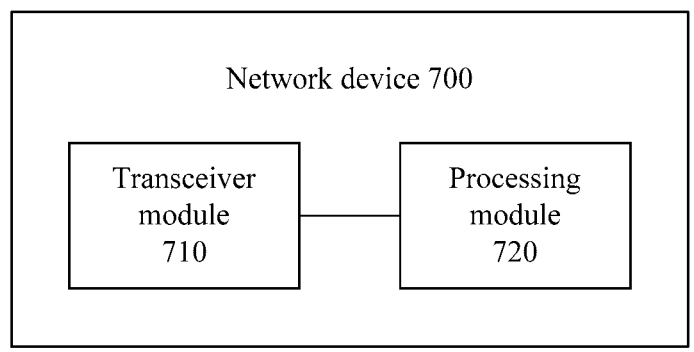
FIG. 25 is still another schematic block diagram of a network device according to an embodiment of this application.

FIG. 25 is a schematic block diagram of a network device 700 according to an embodiment of this application. As shown in FIG. 25, the network device 700 includes:
a transceiver module 710, configured to receive a fourth message sent by a second network node, where the fourth message includes identification information of a terminal device, and the identification information of the terminal device is used by a third network node to retrieve context information of the terminal device that is stored at the first network node, or the fourth message includes context information of the terminal device; and
a processing module 720, configured to establish the context information of the terminal device based on the fourth message, where the second network node is a control plane node of a first system, and the third network node is a user plane node of the first system.

Optionally, the transceiver module 710 is further configured to receive a fifth message sent by the second network node; and the processing module is further configured to store the context information of the terminal device based on the fifth message, or release a part of the context information of the terminal device based on the fifth message. The context information of the terminal device is access stratum context information.

Optionally, the context information of the terminal device includes at least one of connection information of a second interface, connection information of a third interface, connection information of a fourth interface, a radio resource control configuration, a data radio bearer parameter, current security context information, a Packet Data Convergence Protocol status, cell identifier information, and identification information used to identify the terminal device. The second interface is used for data transmission and/or information exchange between the third network node and a core network. The third interface is used for data transmission and/or information exchange between the third network node and the second network node. The fourth interface is used for data transmission and/or information exchange between the third network node and the first network node.

Optionally, the first network node includes at least one of a Radio Link Control protocol layer function, a Media Access Control layer function, and a physical layer function; and/or
the first system includes at least one of a Packet Data Convergence Protocol layer function, a Service Data Adaptation Protocol layer function, and a Radio Resource Control function.

According to the network device in this embodiment of this application, a context of the terminal device can be effectively managed when some functions of a network device are split into different network nodes.

Figure 26:
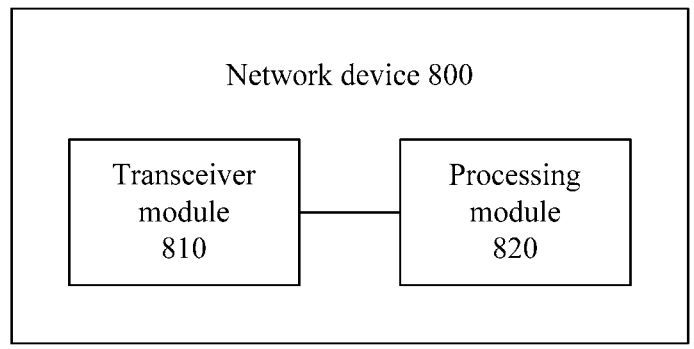
FIG. 26 is still another schematic block diagram of a network device according to an embodiment of this application.

FIG. 26 is a schematic block diagram of a network device 800 according to an embodiment of this application. As shown in FIG. 26, the network device 800 includes:

a transceiver module 810, configured to receive a first message sent by a terminal device, where the first message is used to request to establish a radio resource control connection of the terminal device; and a processing module 820, configured to determine identification information of the terminal device based on the first message.

The processing module 820 is further configured to retrieve, based on the identification information of the terminal device, context information of the terminal device that is stored at a first network node; or the processing module 820 is further configured to receive, based on the identification information of the terminal device, a second message sent by a first system, where the second message includes context information of the terminal device, and the context information of the terminal device is access stratum context information.

Optionally, the transceiver module 810 is further configured to receive a third message sent by the first system; and the processing module is further configured to store the context information of the terminal device based on the third message, or release the context information of the terminal device based on the third message.

Optionally, the transceiver module 810 is further configured to receive an instruction message sent by the first system, where the instruction message is used by the first network node to instruct the terminal device to enter an inactive mode; and the first network node sends the instruction message to the terminal device.

Optionally, the transceiver module 810 is a transceiver module of a second network node, the processing module 820 is a processing module of the second network node, and the second network node is a control plane node of the first system.

Optionally, the identification information of the terminal device is at least one of resume identification information of the terminal device, identification information of the terminal device at a first interface, cell radio network temporary identifier information, and physical cell identifier information. The first interface is used for data transmission and information exchange between the first network node and the first system.

Optionally, the context information of the terminal device includes at least one of a radio resource control configuration, a data radio bearer parameter, and connection information of a first interface. The first interface is used for data transmission and information exchange between the first network node and the first system.

Optionally, the first network node includes at least one of a Radio Link Control protocol layer function, a Media Access Control layer function, a physical layer function, and a Radio Resource Control layer function; and/or the first system includes at least one of a Packet Data Convergence Protocol layer function, a Service Data Adaptation Protocol layer function, and a Radio Resource Control layer function.

According to the network device in this embodiment of this application, a context of the terminal device can be effectively managed when some functions of a network device are split into different network nodes.

Figure 27:
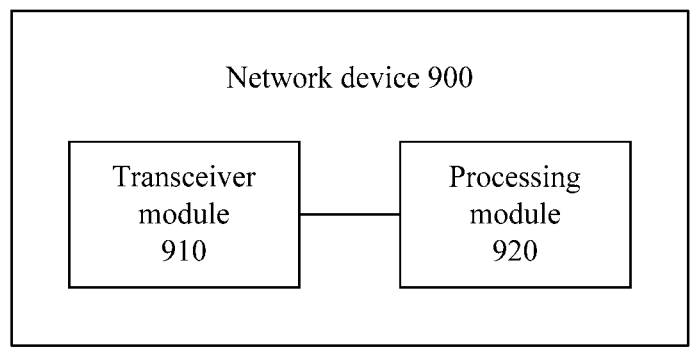
FIG. 27 is still another schematic block diagram of a network device according to an embodiment of this application.

FIG. 27 is a schematic block diagram of a network device 900 according to an embodiment of this application. As shown in FIG. 27, the network device 900 includes:

a transceiver module 910, configured to receive a sixth message sent by a first network node, where the sixth message includes identification information of a terminal device, and the sixth message is used by a first system to retrieve context information of the terminal device that is stored at the first system; and a processing module 920, configured to send a second message to the first network node based on the sixth message, where the second message includes the context information of the terminal device, and the context information of the terminal device is access stratum context information.

Optionally, the transceiver module 910 is a transceiver module of a second network node, the processing module 920 is a processing module of the second network node, and the second network node is a control plane node of the first system.

Optionally, the transceiver module 910 is further configured to send a seventh message to a third network node, where the seventh message includes the identification information of the terminal device, and the identification information of the terminal device is used by the third network node to retrieve context information of the terminal device that is stored at the third network node, or the second message includes context information of the terminal device, and the third network node is a user plane node of the first system.

Optionally, the first network node includes at least one of a Radio Link Control protocol layer function, a Media Access Control layer function, a physical layer function, and a Radio Resource Control layer function; and/or the first system includes at least one of a Packet Data Convergence Protocol layer function, a Service Data Adaptation Protocol layer function, and a Radio Resource Control layer function.

According to the network device in this embodiment of this application, a context of the terminal device can be effectively managed when some functions of a network device are split into different network nodes.

Figure 28:
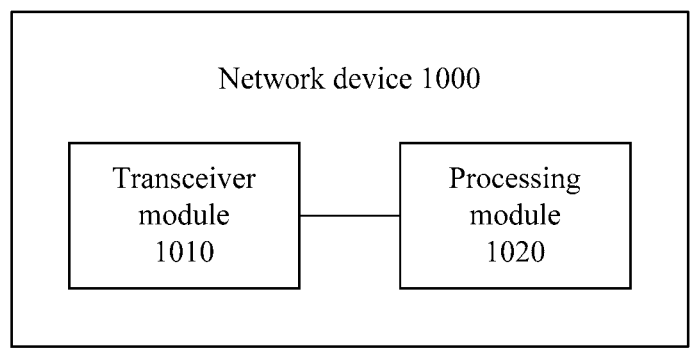
FIG. 28 is still another schematic block diagram of a network device according to an embodiment of this application.

FIG. 28 is a schematic block diagram of a network device 1000 according to an embodiment of this application. As shown in FIG. 28, the network device 1000 includes:

a processing module 1010, configured to determine that a radio link failure occurs between a first network node and a terminal device, where the first network node includes at least one of a Radio Link Control protocol layer function, a Media Access Control layer function, and a physical layer function; and a transceiver module 1020, configured to send a sixth message to a first system, where the sixth message is used to indicate to the second network node that the radio link failure occurs between the first network node and the terminal device, and the second network node includes at least one of a Packet Data Convergence Protocol layer function, a Service Data Adaptation Protocol layer function, and a Radio Resource Control layer function.

Optionally, the transceiver module 1020 is further configured to receive a seventh message sent by the first system, where the seventh message is used to instruct the first network node to release a context of the terminal device.

Optionally, the transceiver module 1020 is a transceiver module of the second network node, the processing module is a processing module of the second network node, and the second network node is a control plane node of the first system.

Optionally, the sixth message includes at least one of identification information of the terminal device, radio link failure indication information, and a cell radio network temporary identifier.

According to the network device in this embodiment of this application, a context of the terminal device can be effectively managed when some functions of a network device are split into different network nodes.

Figure 29:
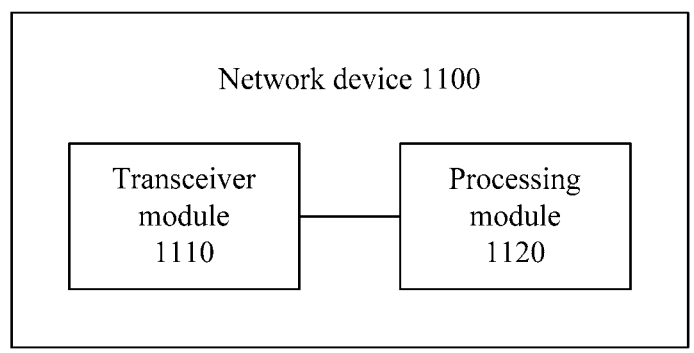
FIG. 29 is still another schematic block diagram of a network device according to an embodiment of this application.

FIG. 29 is a schematic block diagram of a network device 1100 according to an embodiment of this application. As shown in FIG. 29, the network device 1100 includes:

a transceiver module 1110, configured to receive a sixth message sent by a first network node, where the sixth message is used to indicate to a first system that a radio link failure occurs between the first network node and a terminal device; and a processing module 1120, configured to set a timer based on the sixth message.

If the timer expires, the first system sends a seventh message to the first network node, where the seventh message is used to instruct the first network node to release a context of the terminal device; or if the first system receives a radio resource control connection message before the timer expires, the first system stops the timer.

Optionally, the first network node includes at least one of a Radio Link Control protocol layer function, a Media Access Control layer function, and a physical layer function; and the first system includes at least one of a Packet Data Convergence Protocol layer function, a Service Data Adaptation Protocol layer function, and a Radio Resource Control layer function.

Optionally, the transceiver module 1110 is a transceiver module of a second network node, the processing module 1120 is a processing module of the second network node, and the second network node is a control plane node of the first system.

Optionally, the transceiver module 1110 is further configured to: if the timer expires, send an eighth message to a third network node, where the eighth message is used to instruct the third network node to release context information of the terminal device, and the third network node is a user plane node of the first system.

Optionally, the sixth message includes at least one of identification information of the terminal device, radio link failure indication information, and a cell radio network temporary identifier.

According to the network device in this embodiment of this application, a context of the terminal device can be effectively managed when some functions of a network device are split into different network nodes.

Figure 30:
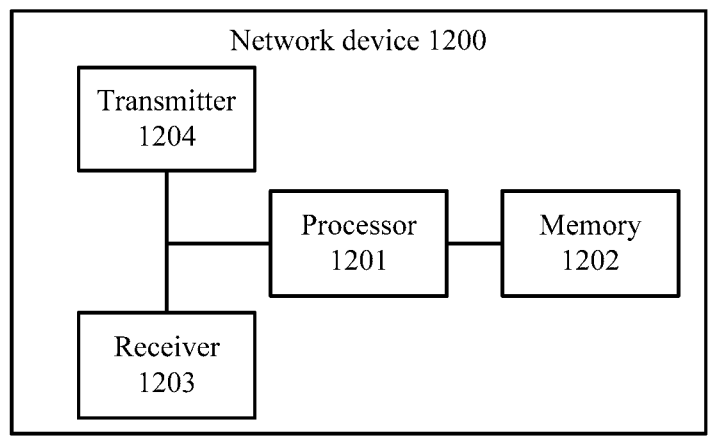
FIG. 30 is still another schematic block diagram of a network device according to an embodiment of this application.

FIG. 30 is a schematic structural diagram of a network device 1200 according to an embodiment of this application. As shown in FIG. 30, the network device 1200 includes a processor 1201, a memory 1202, a receiver 1203, and a transmitter 1204. These components are in a communications connection. The memory 1202 is configured to store an instruction. The processor 1201 is configured to: execute the instruction stored in the memory 1202, control the receiver 1203 to receive information, and control the transmitter 1204 to send information.

The processor 1201 is configured to execute the instruction stored in the memory 1202. The processor 1201 may be configured to perform operations and/or functions corresponding to the processing module 520 in the network device 500. The receiver 1203 and the transmitter 1204 may be configured to perform operations and/or functions corresponding to the transceiver module 510 in the network device 500. For brevity, details are not described herein again.

Figure 31:
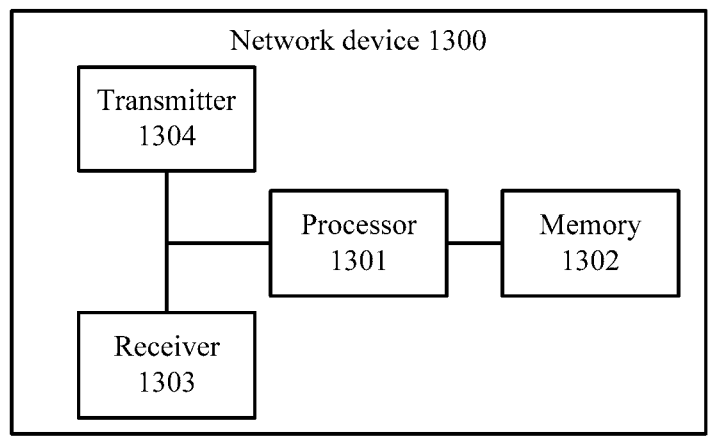
FIG. 31 is still another schematic block diagram of a network device according to an embodiment of this application.

FIG. 31 is a schematic structural diagram of a network device 1300 according to an embodiment of this application. As shown in FIG. 31, the network device 1300 includes a processor 1301, a memory 1302, a receiver 1303, and a transmitter 1304. These components are in a communications connection. The memory 1302 is configured to store an instruction. The processor 1301 is configured to: execute the instruction stored in the memory 1302, control the receiver 1303 to receive information, and control the transmitter 1304 to send information.

The processor 1301 is configured to execute the instruction stored in the memory 1302. The processor 1301 may be configured to perform operations and/or functions corresponding to the processing module 620 in the network device 600. The receiver 1303 and the transmitter 1304 may be configured to perform operations and/or functions corresponding to the transceiver module 610 in the network device 600. For brevity, details are not described herein again.

Figure 32:
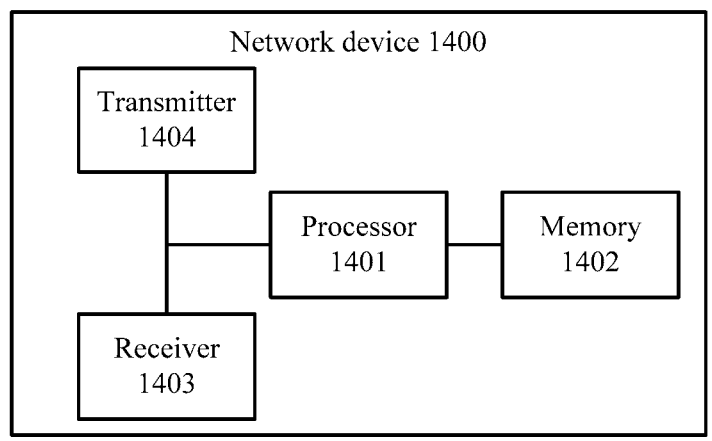
FIG. 32 is still another schematic block diagram of a network device according to an embodiment of this application.

FIG. 32 is a schematic structural diagram of a network device 1400 according to an embodiment of this application. As shown in FIG. 32, the network device 1400 includes a processor 1401, a memory 1402, a receiver 1403, and a transmitter 1404. These components are in a communications connection. The memory 1402 is configured to store an instruction. The processor 1401 is configured to: execute the instruction stored in the memory 1402, control the receiver 1403 to receive information, and control the transmitter 1404 to send information.

The processor 1401 is configured to execute the instruction stored in the memory 1402. The processor 1401 may be configured to perform operations and/or functions corresponding to the processing module 720 in the network device 700. The receiver 1403 and the transmitter 1404 may be configured to perform operations and/or functions corresponding to the transceiver module 710 in the network device 700. For brevity, details are not described herein again.

Figure 33:
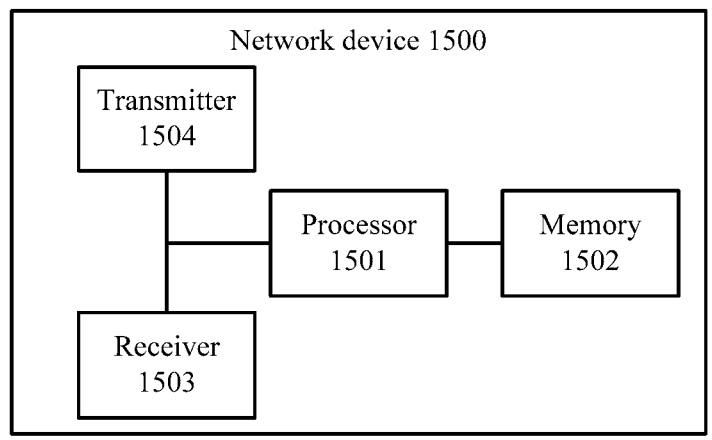
FIG. 33 is still another schematic block diagram of a network device according to an embodiment of this application.

FIG. 33 is a schematic structural diagram of a network device 1500 according to an embodiment of this application. As shown in FIG. 33, the network device 1500 includes a processor 1501, a memory 1502, a receiver 1503, and a transmitter 1504. These components are in a communications connection. The memory 1502 is configured to store an instruction. The processor 1501 is configured to: execute the instruction stored in the memory 1502, control the receiver 1503 to receive information, and control the transmitter 1504 to send information.

The processor 1501 is configured to execute the instruction stored in the memory 1502. The processor 1501 may be configured to perform operations and/or functions corresponding to the processing module 820 in the network device 800. The receiver 1503 and the transmitter 1504 may be configured to perform operations and/or functions corresponding to the transceiver module 810 in the network device 800. For brevity, details are not described herein again.

Figure 34:
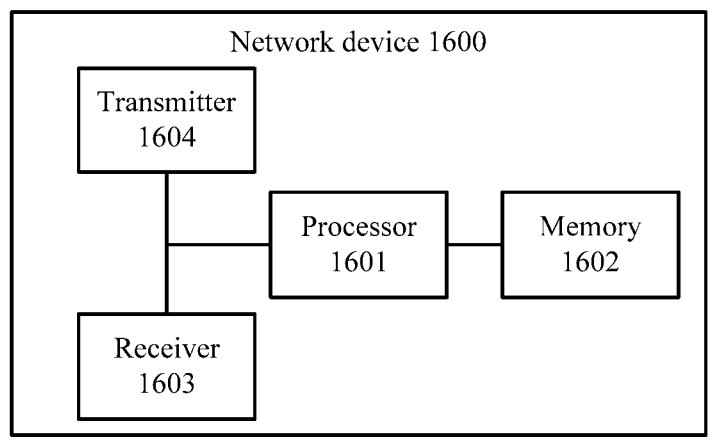
FIG. 34 is still another schematic block diagram of a network device according to an embodiment of this application.

FIG. 34 is a schematic structural diagram of a network device 1600 according to an embodiment of this application. As shown in FIG. 34, the network device 1600 includes a processor 1601, a memory 1602, a receiver 1603, and a transmitter 1604. These components are in a communications connection. The memory 1602 is configured to store an instruction. The processor 1601 is configured to: execute the instruction stored in the memory 1602, control the receiver 1603 to receive information, and control the transmitter 1604 to send information.

The processor 1601 is configured to execute the instruction stored in the memory 1602. The processor 1601 may be configured to perform operations and/or functions corresponding to the processing module 920 in the network device 900. The receiver 1603 and the transmitter 1604 may be configured to perform operations and/or functions corresponding to the transceiver module 910 in the network device 900. For brevity, details are not described herein again.

Figure 35:
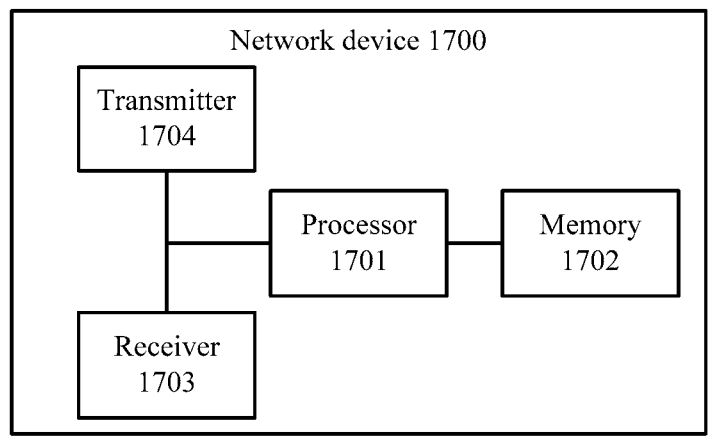
FIG. 35 is still another schematic block diagram of a network device according to an embodiment of this application.

FIG. 35 is a schematic structural diagram of a network device 1700 according to an embodiment of this application. As shown in FIG. 35, the network device 1700 includes a processor 1701, a memory 1702, a receiver 1703, and a transmitter 1704. These components are in a communications connection. The memory 1702 is configured to store an instruction. The processor 1701 is configured to: execute the instruction stored in the memory 1702, control the receiver 1703 to receive information, and control the transmitter 1704 to send information.

The processor 1701 is configured to execute the instruction stored in the memory 1702. The processor 1701 may be configured to perform operations and/or functions corresponding to the processing module 1010 in the network device 1000. The receiver 1703 and the transmitter 1704 may be configured to perform operations and/or functions corresponding to the transceiver module 1020 in the network device 1000. For brevity, details are not described herein again.

Figure 36:
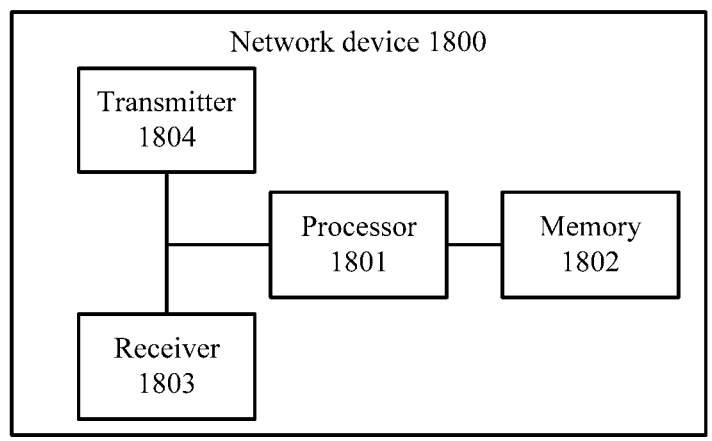
FIG. 36 is still another schematic block diagram of a network device according to an embodiment of this application.

FIG. 36 is a schematic structural diagram of a network device 1800 according to an embodiment of this application. As shown in FIG. 36, the network device 1800 includes a processor 1801, a memory 1802, a receiver 1803, and a transmitter 1804. These components are in a communications connection. The memory 1802 is configured to store an instruction. The processor 1801 is configured to: execute the instruction stored in the memory 1802, control the receiver 1803 to receive information, and control the transmitter 1804 to send information.

The processor 1801 is configured to execute the instruction stored in the memory 1802. The processor 1801 may be configured to perform operations and/or functions corresponding to the processing module 1120 in the network device 1100. The receiver 1803 and the transmitter 1804 may be configured to perform operations and/or functions corresponding to the transceiver module 1110 in the network device 1100. For brevity, details are not described herein again.

An embodiment of this application further provides a chip system. The chip system is applied to a network device, and the chip system includes: at least one processor, at least one memory, and an interface circuit. The interface circuit is responsible for information exchange between the chip system and an external environment. The at least one memory, the interface circuit, and the at least one processor are connected to each other via a line. The at least one memory stores an instruction. The instruction is executed by the at least one processor, to perform operations of the network device in the methods according to the foregoing aspects.

An embodiment of this application further provides a communications system, including a network device and/or a terminal device. The network device is the network device according to the foregoing aspects.

An embodiment of this application further provides a computer program product. The computer program product is applied to a network device, and the computer program product includes a series of instructions. When the instructions are run, operations of the network device in the methods according to the foregoing aspects are performed.

In the embodiments of this application, it should be noted that the foregoing method embodiments of this application may be applied to a processor, or may be implemented by a processor. The processor may be an integrated circuit chip and has a signal processing capability. In an implementation process, steps in the foregoing method embodiments may be implemented by using a hardware integrated logic circuit in the processor, or by using instructions in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform the methods, the steps, and the logical block diagrams that are disclosed in the embodiments of this application. The general purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in a memory, and a processor reads information from the memory and performs the steps in the foregoing methods with reference to hardware of the processor.

It may be understood that the memory in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. As an example but not a limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the systems and methods described in this specification includes but is not limited to these memories and any memory of another proper type.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" appearing throughout this specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should be further understood that determining B based on A does not mean that B is determined based on A only; that is, B may also be determined based on A and/or other information.

All or some of the foregoing embodiments may be implemented by using software, hardware, firmware, or any combination thereof. When software is used to implement the embodiments, all or some of the embodiments may be implemented in a form of a computer program product. The computer program product may include one or more computer instructions. When the computer program instructions are loaded and executed on a computer, all of some of the procedures or functions according to the embodiments of this application are generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid state disk (SSD), or the like.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented via some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission method, comprising:
    sending, by a first network node, a first message to a first system, wherein the first message is received from a terminal device and wherein the first message comprises an original cell radio network temporary identifier allocated by the first network node for the terminal device;

sending, by the first system, a second message to the first network node, wherein the second message comprises identification information of the terminal device, and wherein the identification information of the terminal device is in association with context information of the terminal device that is stored at the first network node;

retrieving, by the first network node, based on the identification information of the terminal device, the context information of the terminal device; and, replacing, by the first network node, the original cell radio network temporary identifier with a new cell radio network temporary identifier allocated by the first network node for the context information of the terminal device, wherein the new cell radio network temporary identifier is allocated by the first network node after the original cell radio network temporary identifier was allocated by the first network node.

2. The method according to claim 1, wherein the first message is a radio resource control connection re-establishment request message, and the radio resource control connection re-establishment request message is included in an F1 interface application layer message.

3. The method according to claim 1, comprising:

sending, by the first network node, second indication information to the first system, wherein the second indication information comprises the new cell radio network temporary identifier allocated by the first network node for the terminal device, and the second indication information is included in an F1 interface application layer message.

4. The method according to claim 1, wherein that the new cell radio network temporary identifier for the terminal device is allocated, before the first network node sends the first message to the first system, by the first network node during a random access procedure initiated by the terminal device.

5. The method according to claim 1, wherein the first network node comprises a Radio Link Control protocol layer function, a Media Access Control protocol layer function, and a physical layer protocol function, and the first system comprises a Radio Resource Control protocol layer function and a Packet Data Convergence Protocol layer function; and wherein the first network node and the first system are included in a base station.

6. A communication system, comprising:

a first network node and a first system; wherein the first network node, comprises:

a first non-transitory memory storage comprising first instructions; and a first hardware processor in communication with the first non-transitory memory storage, wherein the first hardware processor executes the first instructions to:

send a first message to the first system, wherein the first message is received from a terminal device and wherein the first message comprises an original cell radio network temporary identifier allocated by the first network node for the terminal device; and the first system comprises:

a second non-transitory memory storage comprising second instructions;

a second hardware processor in communication with the second non-transitory memory storage, wherein the second hardware processor executes the second instructions to:

send a second message to the first network node, wherein the second message comprises identification information of the terminal device, and wherein the identification information of the terminal device is in association with context information of the terminal device that is stored at the first network node;

and wherein the first hardware processor executes the first instructions to:

retrieve, based on the identification information of the terminal device, the context information of the terminal device; and, replace the original cell radio network temporary identifier with a new cell radio network temporary identifier allocated by the first network node for the context information of the terminal device, wherein the new cell radio network temporary identifier is allocated by the first network node after the original cell radio network temporary identifier was allocated by the first network node.

7. The communication system according to claim 6, wherein the first message is a radio resource control connection re-establishment request message, and the radio resource control connection re-establishment request message is included in an F1 interface application layer message.

8. The communication system according to claim 6, wherein the first hardware processor executes the first instructions to:

send second indication information to the first system, wherein the second indication information comprises the new cell radio network temporary identifier allocated by the first network node for the terminal device, and the second indication information is included in an F1 interface application layer message.

9. The communication system according to claim 6, wherein that the new cell radio network temporary identifier for the terminal device is allocated, before the first network node sends the first message to the first system, by the first network node during a random access procedure initiated by the terminal device.

10. The communication system according to claim 6, wherein the first hardware processor executes the first instructions implementing functions comprising a Radio Link Control protocol layer function, a Media Access Control protocol layer function, and a physical layer protocol function, and wherein the second hardware processor executes the second instructions implementing functions comprising a Radio Resource Control protocol layer function and a Packet Data Convergence Protocol layer function; and wherein the first network node and the first system are included in a base station.

* * * * *